(12) United States Patent
Umerley et al.

(10) Patent No.: US 12,381,447 B2
(45) Date of Patent: *Aug. 5, 2025

(54) ELECTRIC DRIVE MODULE CONFIGURED AS A BEAM AXLE

(71) Applicant: American Axle & Manufacturing, Inc., Detroit, MI (US)

(72) Inventors: Matthew A. Umerley, Shelby Township, MI (US); Frederick E. Zink, Capac, MI (US); Jonathan P. Prichard, Harrison Township, MI (US); James P. Downs, South Lyon, MI (US); Gregory A. Marsh, Waterford, MI (US); Matthew T. Blakeman, Newport, MI (US); Steven Grider, Grosse Pointe Park, MI (US); Paul J. Valente, Berkley, MI (US)

(73) Assignee: AMERICAN AXLE & MANUFACTURING, INC., Detroit, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/240,238

(22) Filed: Aug. 30, 2023

(65) Prior Publication Data

US 2023/0412046 A1    Dec. 21, 2023

Related U.S. Application Data

(62) Division of application No. 17/790,254, filed as application No. PCT/US2022/020286 on Mar. 15, 2022, now Pat. No. 11,750,063.

(Continued)

(51) Int. Cl.
*H02K 11/33* (2016.01)
*B60K 1/02* (2006.01)
(Continued)

(52) U.S. Cl.
CPC .............. *H02K 7/116* (2013.01); *B60K 1/02* (2013.01); *H02K 9/19* (2013.01); *H02K 11/33* (2016.01)

(58) Field of Classification Search
CPC .......... H02K 7/116; H02K 11/33; H02K 9/19; B60K 1/02
(Continued)

(56) References Cited

U.S. PATENT DOCUMENTS 4,418,777 A   12/1983   Stockton
5,522,476 A   6/1996    Holman
(Continued)

FOREIGN PATENT DOCUMENTS

CN   2541230 Y     3/2003
CN   103496320 A   1/2014
(Continued)

OTHER PUBLICATIONS

Chinese Office Action for CN Patent Application 202280035350.4 dated May 8, 2024 (6 pages).
(Continued)

*Primary Examiner* — Hau V Phan
(74) *Attorney, Agent, or Firm* — DICKINSON WRIGHT PLLC

(57) ABSTRACT

An electrically-operated electric drive module for use in a vehicle framework that is configured for a powertrain that includes an internal combustion engine. The electrically-operated electric drive module permits the vehicle to be converted to an electrically propelled vehicle in a manner that is cost-effective and which is relatively low in weight.

27 Claims, 43 Drawing Sheets

Related U.S. Application Data

(60) Provisional application No. 63/220,204, filed on Jul. 9, 2021, provisional application No. 63/178,985, filed on Apr. 23, 2021, provisional application No. 63/161,218, filed on Mar. 15, 2021.

(51) Int. Cl.
*H02K 7/116* (2006.01)
*H02K 9/19* (2006.01)

(58) Field of Classification Search
USPC .......................................................... 180/65.1
See application file for complete search history.

(56) References Cited

U.S. PATENT DOCUMENTS

| | | | |
|---|---|---|---|
| 6,820,707 | B1 | 11/2004 | Cantemir |
| 6,978,853 | B2 | 12/2005 | Bennett |
| 7,610,979 | B1 | 11/2009 | Dykowski et al. |
| 8,561,735 | B2 | 10/2013 | Morrow et al. |
| 8,640,800 | B2 | 2/2014 | Armbruster et al. |
| 8,640,801 | B2 | 2/2014 | Hennings et al. |
| 9,030,063 | B2 | 5/2015 | Rawlinson et al. |
| 9,527,382 | B2 | 12/2016 | Smetana |
| 9,625,021 | B2 | 4/2017 | Knoblauch et al. |
| 9,630,482 | B2 | 4/2017 | Raymond |
| 10,036,458 | B2 | 7/2018 | Littlefield et al. |
| 10,371,254 | B2 | 8/2019 | Fukui et al. |
| 10,381,901 | B2 | 8/2019 | Zhou et al. |
| 10,518,627 | B2 | 12/2019 | Nagpal et al. |
| 10,525,810 | B2 | 1/2020 | Jegebris et al. |
| 10,532,650 | B2 | 1/2020 | Lee et al. |
| 10,622,869 | B2 | 4/2020 | Kiyokami et al. |
| 11,338,660 | B2 | 5/2022 | Laforce et al. |
| 11,750,063 | B2 * | 9/2023 | Umerley ............. F16H 57/0441 180/65.1 |
| 2013/0001002 | A1 | 1/2013 | Platt et al. |
| 2013/0019707 | A1 | 1/2013 | Ebihara et al. |
| 2013/0119793 | A1 * | 5/2013 | Hofkirchner .......... H02K 5/203 310/54 |
| 2014/0097060 | A1 | 4/2014 | Hoshinoya et al. |
| 2015/0083505 | A1 | 3/2015 | Pearce, Jr. et al. |
| 2018/0076681 | A1 | 3/2018 | Iketaka et al. |
| 2018/0297401 | A1 | 10/2018 | Liu et al. |
| 2018/0345786 | A1 | 12/2018 | Kucharski |
| 2019/0081537 | A1 | 3/2019 | Kiyokami et al. |
| 2019/0315216 | A1 | 10/2019 | Ziech |
| 2020/0106344 | A1 * | 4/2020 | Okuhata ................ H02K 11/33 |
| 2020/0108706 | A1 | 4/2020 | Devreese et al. |
| 2020/0124161 | A1 | 4/2020 | Ogasawara et al. |
| 2020/0219955 | A1 | 7/2020 | Bai |
| 2020/0240512 | A1 * | 7/2020 | Yashiro .................... F01M 5/00 |
| 2020/0244143 | A1 | 7/2020 | Kiyooka et al. |
| 2020/0328652 | A1 | 10/2020 | Miki et al. |
| 2022/0263383 | A1 | 8/2022 | Yu et al. |

FOREIGN PATENT DOCUMENTS

| | | |
|---|---|---|
| CN | 108206610 A | 6/2018 |
| CN | 108859731 A | 11/2018 |
| CN | 109474127 A | 3/2019 |
| CN | 110729856 A | 1/2020 |
| DE | 10339425 A1 | 3/2005 |
| JP | 2002135907 A | 5/2002 |
| JP | 2005265167 A | 9/2005 |
| JP | 2010268633 A | 11/2010 |
| JP | 2012246795 A | 12/2012 |
| WO | WO/2020/219955 | 10/2020 |

OTHER PUBLICATIONS

English Translation of Substantial Part of Chinese Office Action for CN Patent Application 202280035350.4 dated May 8, 2024 (2 pages).
PCT International Search Report dated Jun. 22, 2022 for corresponding PCT application No. PCT/US2022/020286, filed Mar. 15, 2022.
Japanese Office Action for Japanese Application No. 2023-556854 dated Oct. 15, 2024 (5 pages).
English Translation of Japanese Office Action for Japanese Application No. 2023-556854 dated Oct. 15, 2024 (5 pages).
European Search Report for European Patent Application No. 22772014.1 dated Feb. 14, 2025 (11 Pages).

* cited by examiner

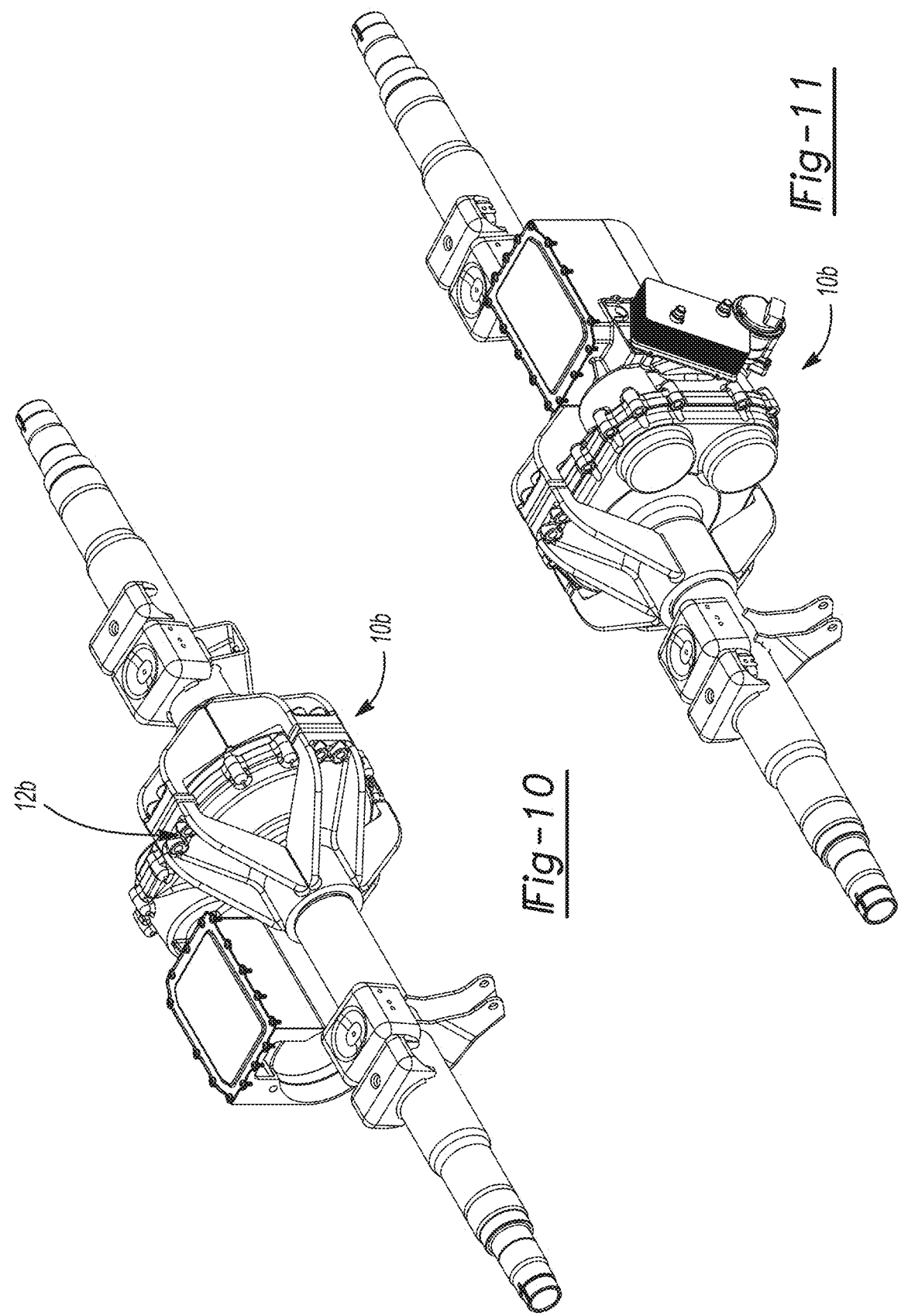

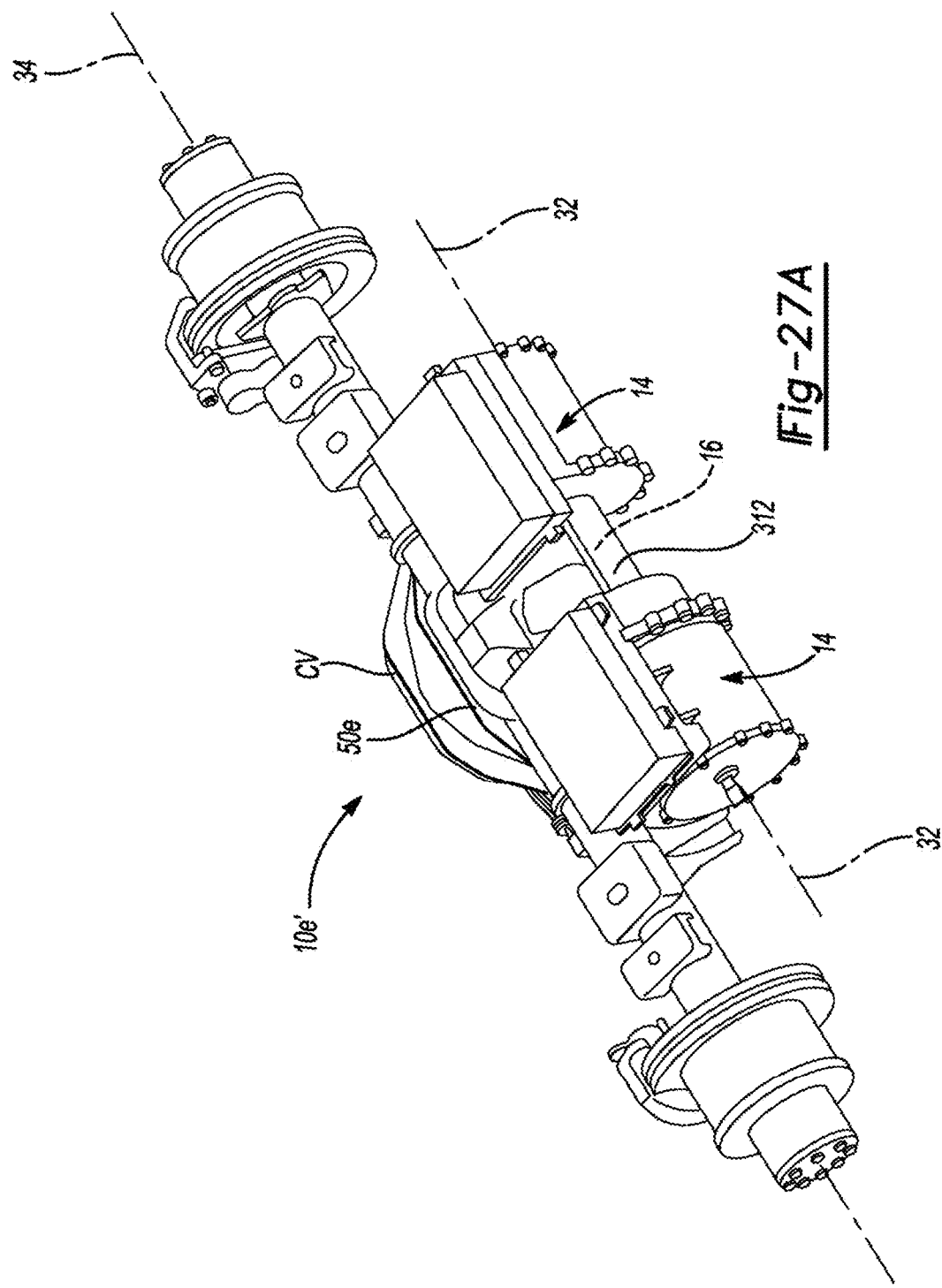

ELECTRIC DRIVE MODULE CONFIGURED AS A BEAM AXLE

CROSS-REFERENCE TO RELATED APPLICATIONS

This application is a division of U.S. application Ser. No. 17/790,254 filed Jun. 30, 2022, which is a U.S. national phase entry of International Patent Application No. PCT/US2022/020286 filed Mar. 15, 2022, which claims the benefit of U.S. Provisional Patent Application No. 63/161,218 filed Mar. 15, 2021, U.S. Provisional Patent Application No. 63/178,985 filed Apr. 23, 2021, and U.S. Provisional Patent Application No. 63/220,204 filed Jul. 9, 2021. The disclosure of each of the above-referenced applications is incorporated by reference as if fully set forth in detail herein.

FIELD

The present disclosure relates to an electric drive module that is configured as a beam axle.

BACKGROUND

This section provides background information related to the present disclosure which is not necessarily prior art.

There is increasing demand for electrically-powered commercial delivery vehicles. One challenge that vehicle manufacturers face is the integration of electric propulsion into a vehicle framework that was developed for and continues to support a powertrain that includes an internal combustion engine. While various solutions have been proposed, none of these solutions has been met with widespread commercial acceptance.

SUMMARY

This section provides a general summary of the disclosure, and is not a comprehensive disclosure of its full scope or all of its features.

In one form, the present disclosure provides an electric drive module that includes a housing, a pair of axle tubes, an electric motor, a transmission, a first bearing, and a differential. The housing has a motor mount and a pair of axle tube mounts. The motor mount defines a motor output shaft axis. The axle tube mounts are disposed along an output axis that is parallel to and offset from the motor output shaft axis. The axle tubes are received into the axle tube mounts and are fixedly coupled to the housing. The electric motor has a motor output shaft and is mounted to the motor mount such that the motor output shaft is rotatable about the motor output shaft axis. The transmission is received in the housing and includes a pinion gear, which is coupled to the motor output shaft for rotation therewith, a pair of first compound gears, and a transmission output gear that is rotatable about the output axis. Each of the first compound gears has a first gear, which is meshingly engaged to the pinion gear, and a second gear that is fixedly coupled to the first gear. The first compound gears transmit rotary power between the pinion gear and the transmission output gear. The first bearing is coupled to the housing and the transmission output gear and supports the transmission output gear axially along the output axis and radially about the output axis. The differential has a differential input member, which is fixedly coupled to the transmission output gear, and a pair of differential output members that are rotatable relative to the differential input member about the output axis.

In another form, the present disclosure provides an electric drive module that includes a motor assembly, an output gear, a differential assembly, a transmission assembly, a housing assembly, and a heat exchanger. The motor assembly has a stator, a rotor, a motor output shaft and a motor controller. The rotor is received in the stator and is rotatable relative to the stator about a motor output shaft axis. The motor output shaft is coupled to the rotor for rotation therewith. The motor controller is configured to control a rotational speed of the rotor relative to the stator. The motor controller includes an inverter. The output gear is rotatable about an output axis. The differential assembly has a differential input member and a pair of differential output members. The differential input member is coupled to the output gear for rotation therewith about the output axis. Each of the differential output members is rotatable about the output axis relative to the differential input member. The transmission is configured to transmit rotary power between the motor output shaft and the output gear. The housing assembly has a first housing portion and a second housing portion. The transmission is at least partly housed in the first housing portion. The second housing portion has a first axial end and a heat exchanger mount. The first axial end of the second housing portion is removably mounted to the first housing portion. The second housing portion houses the stator, the rotor, and at least a portion of the motor controller that includes the inverter. The housing assembly defines a sump, a pump mount, and a filter mount. The sump is configured to hold a first liquid that is employed in the electronic drive module to lubricate the motor assembly, the differential assembly and the transmission and to cool the motor assembly. The heat exchanger is mounted to the heat exchanger mount on the second housing portion. The heat exchanger has a heat exchanger inlet and at least one heat exchanger outlet. The pump mount is in fluid communication with the sump. A first internal gallery in the housing assembly fluidly couples the pump mount to an inlet on the filter mount. A second internal gallery in the housing assembly fluidly couples an outlet on the filter mount to the heat exchanger inlet. A third internal gallery in the housing assembly is fluidly coupled directly to the at least one heat exchanger outlet. A first portion of the first fluid that is transmitted through the third internal gallery is directed into the at least one of the stator and the rotor for cooling the motor assembly. A second portion of the first fluid that is transmitted through the third internal gallery is directed into the first housing portion for lubricating at least one of the transmission and the differential assembly.

In another form, the present disclosure provides an electric drive module that includes a motor assembly, an output gear, a differential assembly, a transmission, a housing assembly, a pump, and a heat exchanger. The motor assembly has a stator, a rotor, a motor output shaft and a motor controller. The rotor is received in the stator and is rotatable relative to the stator about a motor output shaft axis. The motor output shaft is coupled to the rotor for rotation therewith. The motor controller is configured to control a rotational speed of the rotor relative to the stator. The motor controller including an inverter. The output gear is rotatable about an output axis. The differential assembly has a differential input member and a pair of differential output members. The differential input member is coupled to the output gear for rotation therewith about the output axis. Each of the differential output members is rotatable about the output axis relative to the differential input member. The transmission is configured to transmit rotary power between the motor output shaft and the output gear. The housing assembly has a first housing portion, a second housing portion and a cover. The transmission is at least partly housed in the first housing portion. The second housing portion has a first axial end and a heat exchanger mount. The first axial end of the second housing portion is removably mounted to the first housing portion. The second housing portion houses the stator, the rotor, and at least a portion of the motor controller that includes the inverter. The cover closes an end of the second housing portion that is opposite the first housing portion. The housing assembly defines a sump that is configured to hold a first liquid. The first liquid is employed in the electronic drive module to lubricate the motor assembly, the differential assembly and the transmission and to cool the motor assembly. The pump is coupled to the housing assembly and such that the pump is fluidly coupled to the sump to receive the first liquid therefrom. The pump is configured to discharge a flow of the first fluid. The heat exchanger is mounted to the heat exchanger mount on the second housing portion. The heat exchanger has a heat exchanger inlet, a first heat exchanger outlet and a second heat exchanger outlet. A first internal gallery is formed in the housing assembly. The first gallery receives at least a portion of the flow of the first fluid. The first internal gallery is fluidly coupled directly to the heat exchanger inlet such that the first fluid that is discharged from the first internal gallery is received into the heat exchanger. A second internal gallery is formed in the housing assembly. The second internal gallery is fluidly coupled directly to the first heat exchanger outlet such that a first portion of the first fluid that is discharged from the heat exchanger is received into the second internal gallery. The first portion of the first fluid is directed into the first housing portion for lubricating at least one of the transmission and the differential assembly. A third internal gallery is formed in the cover. The third internal gallery is fluidly coupled directly to the second heat exchanger outlet such that a second portion of the first fluid that is discharged from the heat exchanger is directed into the cover. The first fluid that exits the cover is directed into the at least one of the stator and the rotor for cooling the motor assembly.

In another form, the present disclosure provides an electric drive module that includes a beam axle housing, a differential assembly, a pair of axle shafts, a multi-phase electric motor and a transmission. The beam axle housing has a central portion and a pair of axle tubes that are fixedly coupled to and extend laterally from opposite lateral sides of the central portion. The differential assembly is received in the central portion and has a differential input member, which is rotatable about an output axis relative to the central portion, and a pair of differential output members that are rotatable relative to the differential input member about the output axis. Each of the axle shafts is received in an associated one of the axle tubes and is coupled to an associated one of the differential output members for rotation therewith about the output axis. The multi-phase motor assembly has a motor housing, a stator, a rotor and an inverter. The motor housing is fixedly coupled to the central portion of the beam axle housing. The stator has a stator core and a plurality of field windings that are wound about the stator core. Each of the field windings is associated with a different electrical phase. The stator is received into and is fixedly coupled to the motor housing. The rotor is rotatable relative to the stator about a motor output shaft axis. The rotor has a motor output shaft. The inverter is housed in the motor housing and is electrically coupled to the field windings. The inverter is configured to control a supply of electrical power to each of the field windings. The transmission is received in the central portion and transmits rotary power between the motor output shaft and the differential input member.

In another form, the present disclosure provides an electric drive module that includes a carrier housing, a pair of axle tubes, a differential assembly, a first transmission housing, a first motor assembly, a first transmission and a pair of axle shafts. The carrier housing defines a pair of axle tube apertures. Each of the axle tubes is received into an associated one of the axle tube apertures and is fixedly coupled to the carrier housing. The differential assembly is rotatably mounted to the carrier housing and includes a pair of differential output members. The first transmission housing is removably coupled to the carrier housing. The first motor assembly has a first motor housing and a first electric motor with a first stator and a first rotor. The first motor housing is coupled to the first transmission housing. The first stator is fixedly coupled to the first motor housing. The first rotor is received in the first stator and has a first motor output shaft that is rotatable about a first motor output shaft axis. The first transmission is received in the first transmission housing and transmits rotary power between the first motor output shaft and the differential assembly. Each of the axle shafts extends through an associated one of the axle tubes and is driving engaged to a corresponding one of the differential output members.

In a further form, the present disclosure provides an electric drive module that includes a beam axle housing, a differential assembly, a pair of axle shafts, a pair of multi-phase motor assemblies and a pair of transmissions. The beam axle housing has a central portion and a pair of axle tubes. The central portion includes two clam-shell halves, each of which defining an axle tube aperture. Each of the axle tubes is received into the axle tube aperture of and is fixedly coupled to an associated one of the clam-shell halves such that the axle tubes extend laterally from opposite lateral sides of the central portion. The differential assembly is received in the central portion and has a differential input member, which is rotatable about an output axis relative to the central portion, and a pair of differential output members that are rotatable relative to the differential input member about the output axis. Each of the axle shafts is received in an associated one of the axle tubes and is coupled to an associated one of the differential output members for rotation therewith about the output axis. Each multi-phase motor assembly has a motor housing, a stator, a rotor and an inverter. The motor housing is fixedly coupled to the central portion of the beam axle housing. The stator has a stator core and a plurality of field windings that are wound about the stator core. Each of the field windings is associated with a different electrical phase. The stator is received into and is fixedly coupled to the motor housing. The rotor is rotatable relative to the stator about a motor output shaft axis and includes a motor output shaft. The inverter is housed in the motor housing and is electrically coupled to the field windings. The inverter is configured to control a supply of electrical power to each of the field windings. Each transmission is received in the central portion and transmits rotary power between an associated one of the motor axle shafts and the differential input member.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 10 is a front perspective view of a third exemplary electric drive module constructed in accordance with the teachings of the present disclosure;

FIG. 11 is a rear perspective view of the electric drive module of FIG. 10;

FIG. 27A is a perspective view of an electric drive module that is similar to that of FIG. 23 but which employs two electric drive assemblies;

FIG. 39 is a section view taken along the line 39-39 of FIG. 36;

Corresponding reference numerals indicate corresponding parts throughout the several views of the drawings.

DETAILED DESCRIPTION

Figure 1:
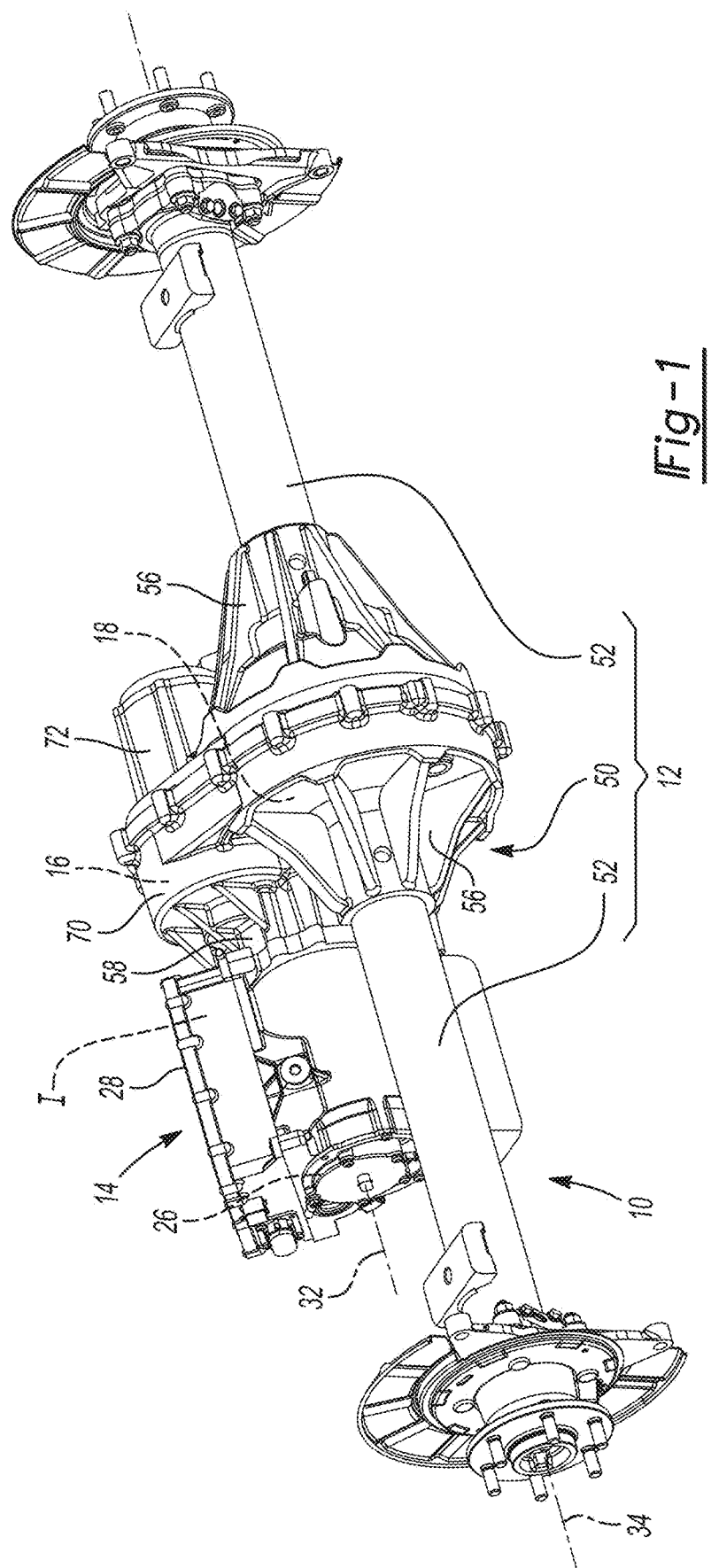
FIG. 1 is a front perspective view of an exemplary electric drive module constructed in accordance with the teachings of the present disclosure.
Figure 2:
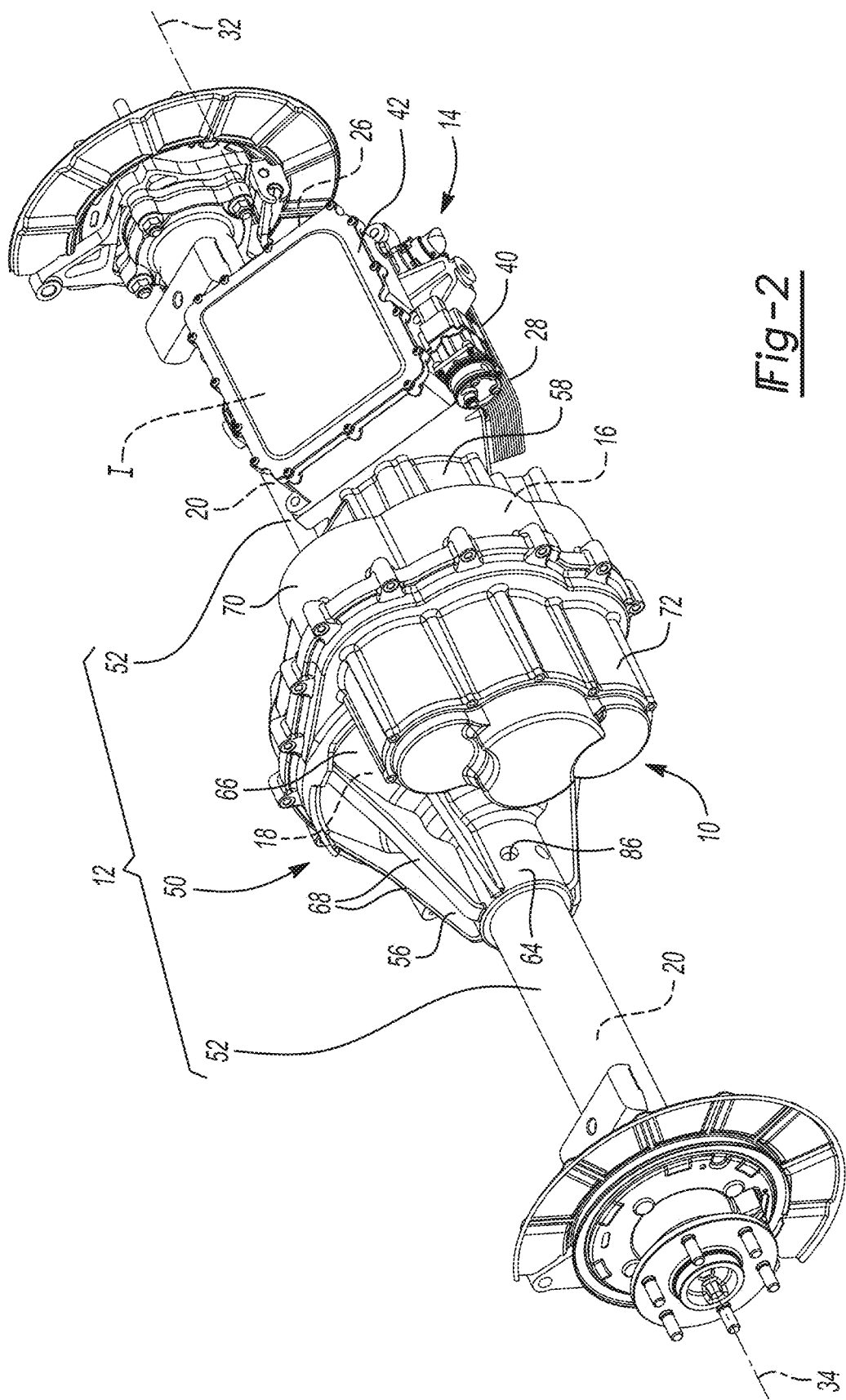
FIG. 2 is a rear perspective view of the electric drive module of FIG. 1.
Figure 3:
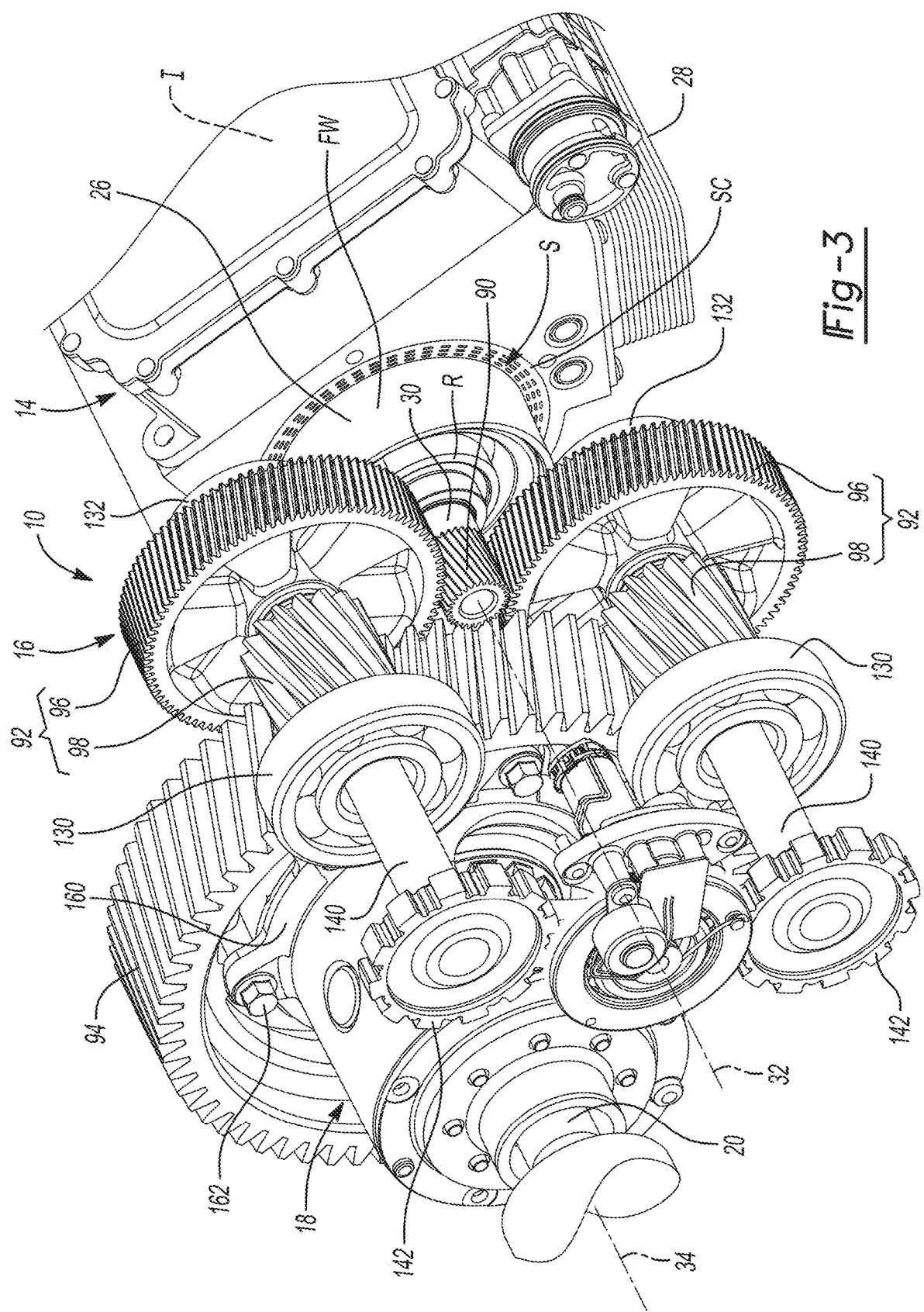
FIG. 3 is a perspective view of a portion of the electric drive module of FIG. 1 in which a portion of a housing assembly is removed to better illustrate a transmission, a differential assembly and a portion of an electric motor assembly.

With reference to FIGS. 1 through 3, an exemplary electric drive module constructed in accordance with the teachings of the present disclosure is generally indicated by reference numeral 10. The electric drive module 10 can include a housing assembly 12, an electric motor assembly 14, a transmission 16, a differential 18, and a pair of axle shaft assemblies 20. The electric motor assembly 14 can be similar to that which is described in International Patent Application Publication No. WO 2020/219955 published on Oct. 29, 2020 and International Patent Application No. PCT/US2020/062541 filed on Nov. 30, 2020, the disclosures of which are incorporated by reference as if set forth in detail herein. Briefly, the electric motor assembly 14 comprises an electric motor 26 and a lubrication and cooling system 28. The electric motor 26 is a multi-phase electric motor and includes a stator S, which can have a stator core SC and a plurality of field windings FW, an inverter I and a rotor R having a motor output shaft 30 (FIG. 3) that is rotatable about a motor output shaft axis 32 that is parallel to an output axis 34 of the electric drive module 10. Each of the field windings FW is wound about the stator core SC and is associated with a different phase of electrical power. The inverter I is electrically coupled to the field windings FW and is configured to control a supply of electrical power to each of the field windings FW. The inverter I is mounted in a motor housing that houses the stator S and the rotor R. The lubrication and cooling system 28 comprises a pump 40 (FIG. 2), a cooling system heat exchanger 42 (FIG. 2), and other components (not specifically shown) that direct and control the flow of a fluid through the electric motor 26, the transmission 16 and the differential 18 for purposes of cooling and/or lubricating various components of the electric motor assembly 14, the transmission 16 and the differential 18.

Figure 4:
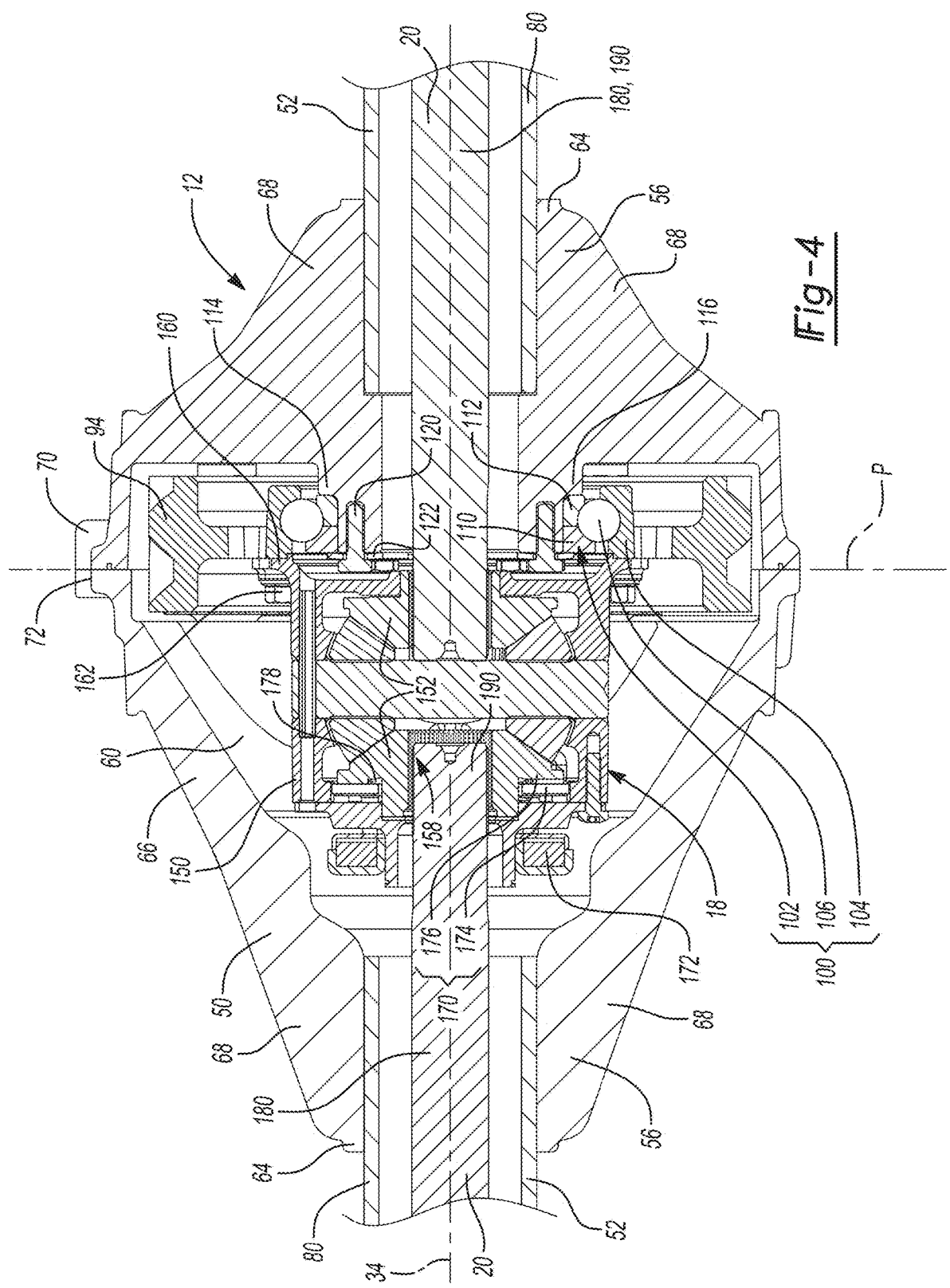
FIG. 4 is a section view of a portion of the electric drive module of FIG. 1.

With reference to FIGS. 2 and 4, the housing assembly 12 is a beam axle and can include a central portion or carrier housing 50 and a pair of axle tube assemblies 52. The carrier housing 50 can be formed as two or components that are assembled to one another and can define a pair of axle tube mounts 56, a motor mount 58, and an internal cavity 60 into which the transmission 16 and the differential 18 can be received. Each of the axle tube mounts 56 can comprise a tubular portion 64 that is fixedly coupled (e.g., unitarily and integrally formed with) a wall portion 66. One or more gussets 68 can be coupled to the tubular portion 64 and the wall portion 66. The tubular portions 64 can be disposed concentrically about the output axis 34. The electric motor assembly 14 is fixedly coupled to the motor mount 58 such that the motor output shaft 30 (FIG. 3) is disposed within the internal cavity 60.

In the particular example provided, the carrier housing 50 comprises a first housing member 70 and a second housing member 72 that are configured as mating clam shell halves. The first and second housing members 70 and 71 are secured to one another via a plurality of threaded fasteners (not specifically shown). The first and second housing members 70 and 72 are split from one another about a plane P that intersects the output axis 34. As shown, the plane P is perpendicular to the output axis 34, but it will be appreciated that the plane P could be oriented differently. The motor mount 58 is disposed on the first housing member 70 in the example shown.

Figure 5:
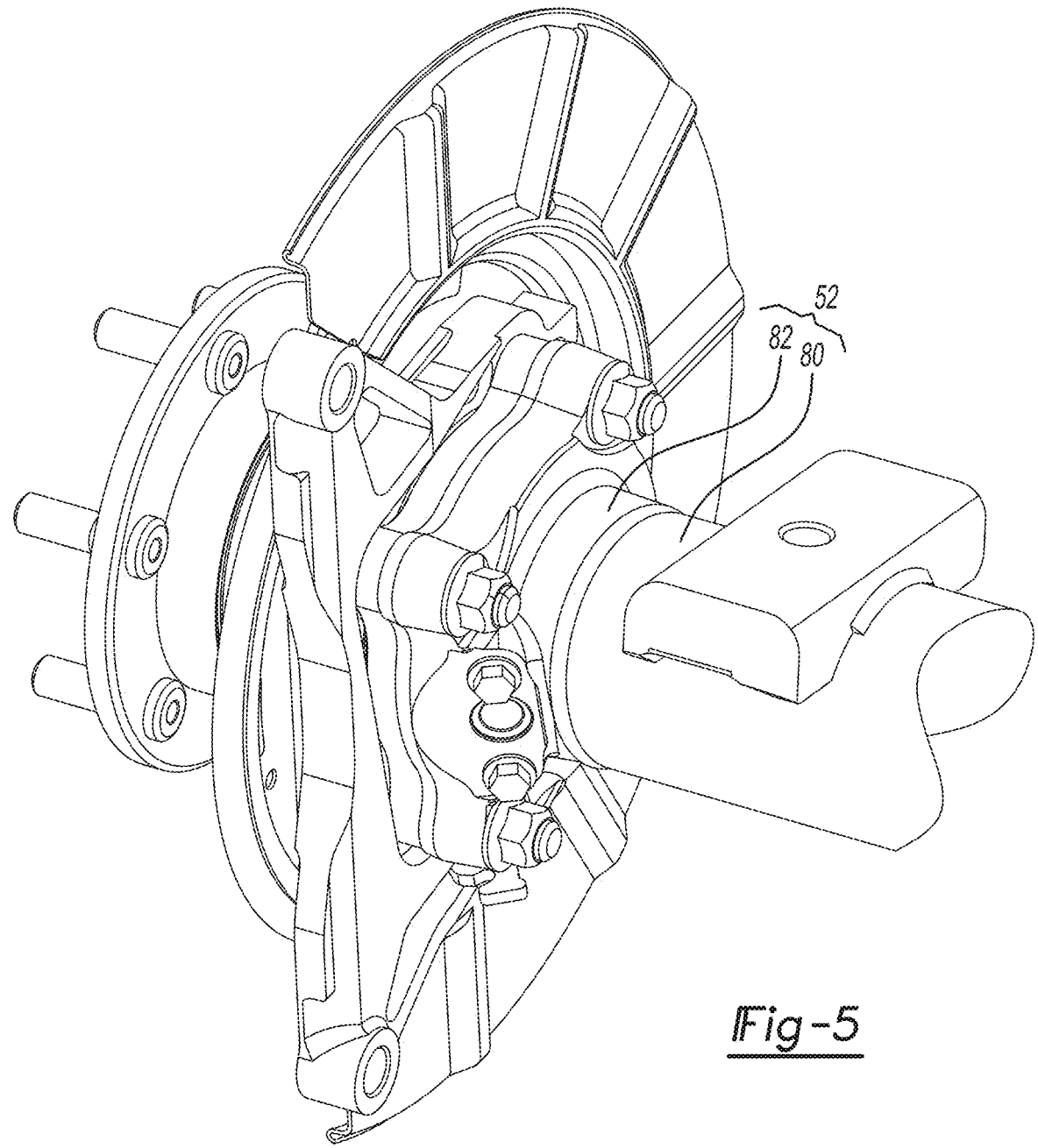
FIG. 5 is a perspective view of a portion of the electric drive module of FIG. 1 illustrating the configuration of an axle tube assembly.
Figure 6:
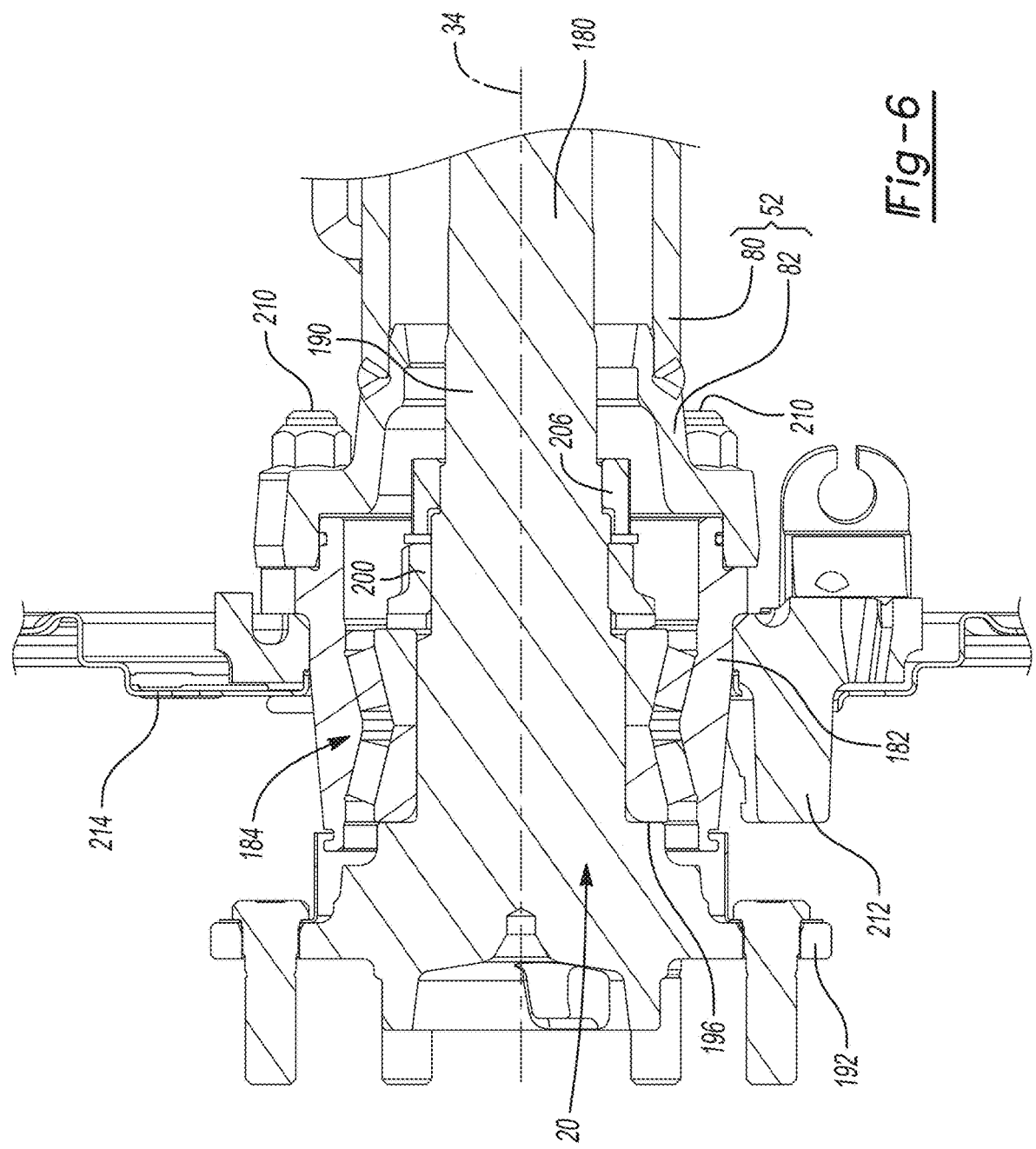
FIG. 6 is a section view of a portion of the electric drive module of FIG. 1 taken through the axle tube assembly and a wheel mount on an axle shaft.

With reference to FIGS. 4 through 6, each of the axle tube assemblies 52 can include an axle tube 80 and an axle tube flange 82. Each axle tube 80 can be received into the tubular portion 64 of an associated one of the axle tube mounts 56 and can be fixedly coupled to the carrier housing 50 in any desired manner. In the example provided, the axle tubes 80 engage the tubular portions 64 of the axle tube mounts 56 with an interference fit so that bending loads are transmitted through the axle tubes 80 into the carrier housing 50. One or more slug welds 86 (FIG. 2) can be employed to inhibit movement of the axle tubes 80, both rotationally about the output axis 34 and axially along the output axis 34 relative to the carrier housing 50. The axle tube flange 82 can be formed as a separate piece and can be coupled in any desired manner to an end of the axle tube 80 that is opposite the carrier housing 50. In the example provided, the axle tube flange 82 is friction welded to the axle tube 80.

With reference to FIG. 3, the transmission 16 can include a pinion gear 90, a pair of compound gears 92 and a transmission output gear 94. The pinion gear 90 can be coupled to the motor output shaft 30 for rotation therewith. Each of the compound gears 92 can include a first gear 96, which is meshed to the pinion gear 90, and a second gear 98 that is rotationally coupled to the first gear 96. The transmission output gear 94 is disposed concentrically about the output axis 34 and is meshingly engaged with the second gears 98. In the example provided, each of the pinion gear 90, the first gears 96, the second gears 98, and the transmission output gear 94 are helical gears, but it will be appreciated that other types of gear tooth profiles, such as spur gears, could be employed in the alternative for some or all of the gears of the transmission 16.

With reference to FIG. 4, a first bearing 100 can be employed to support the transmission output gear 94 axially along the output axis 34 and radially about the output axis 34 relative to the carrier housing 50. In the example provided, the first bearing 100 is a four-point angular contact bearing having a first race 102, which is disposed on the carrier housing 50, a second race 104, which is disposed on the transmission output gear 94, and a plurality of rolling elements 106 that are disposed between the first and second races 102 and 104. The first race 102 can comprise a pair of race members 110 and 112 that can be received onto a tubular segment 114 formed on the first housing member 70. The race member 112 can be abutted against a shoulder 116 on the first housing member 70. A plurality of threaded fasteners 120 and Belville spring washers 122 can be employed to secure the race members 110 and 112 to the first housing member 70 and to apply a pre-load force onto the first bearing 100. The second race 104 can be fully or partly formed directly on the transmission output gear 94.

Returning to FIG. 3, each of the compound gears 92 can be supported by a second bearing 130 and a third bearing 132. Each second bearing 130 is configured to support its compound gear 92 relative to the second housing member 72 (FIG. 4) axially along the rotational axis of the compound gear 92 and radially about the rotational axis of the compound gear 92. Each third bearing 132 is configured to support its compound gear 92 relative to the first housing member 70 radially about the rotational axis of the compound gear 92.

A shaft 140 can be non-rotatably coupled to each of the compound gears 92 and can extend from the second gear 98 in a direction away from the first gear 96. If desired, the shaft 140 can be integrally and unitarily formed with the second gear 98. A park lock gear 142 can be non-rotatably coupled to each of the shafts 140. The park lock gears 142 can be engaged by a parking pawl (not shown) to inhibit rotation of the transmission output gear 94. In the example shown, the second bearings 130 are disposed along the rotational axes of the compound gears at locations that are between the park lock gears 142 and the second gears 98.

Returning to FIG. 4, the differential 18 can include a differential input member 150, which is coupled to the transmission output gear 94 for rotation therewith, and a pair of differential output members 152 that are rotatable about the output axis 34 relative to the differential input member 150. In the example provided, the differential input member 150 is a differential case, the differential 18 includes a differential gearset 158, and the differential output members 152 are gears in the differential gearset 158. The differential case can have a flange 160 that is abutted against the transmission output gear 94. A plurality of threaded fasteners 162 are received through the flange 160 and are threaded into the transmission output gear 94 to fixedly couple the differential input member 150 to the transmission output gear 94. The threaded fasteners 162 that are fitted through the flange 160 are disposed radially outwardly of the threaded fasteners 120 that secure the first race 102 of the first bearing 100 to the first housing member 70. Configuration in this manner permits the transmission 16, the first bearing 100, the Belleville spring washers 122 and the threaded fasteners 120 to be assembled to the first housing member 70 and thereafter the differential 18 to be assembled to the transmission output gear 94.

Optionally, the differential 18 can include a limited slip or locking mechanism. In the example shown, the differential 18 is an electronic locking differential having a dog clutch 170 and an electromagnet 172. The dog clutch 170 includes a first dog 174, which is axially slidably but non-rotatably coupled to the differential input member 150, and a second dog 176 that is non-rotatably coupled to one of the differential output members 152. The electromagnet 172 can be operated to drive the first dog 174 along the output axis 34 into engagement with the second dog 176 to thereby inhibit speed differentiation between the differential output members 152. A spring 178 can be disposed between the first and second dogs 174 and 176 and can urge the first dog 174 apart from the second dog 176 when the electromagnet 172 is not operated.

While a first bearing 100 has been described as directly supporting the transmission output gear 94 for rotation on the housing assembly 12 to thereby indirectly support the differential 18 for rotation relative to the housing assembly 12, it will be appreciated that the electric drive module 10 could be constructed somewhat differently. For example, the differential input member 150 could be supported on a pair of bearings that are mounted on the housing assembly in the manner that is shown in FIGS. 10-13.

In FIGS. 4 and 6, each of the axle shaft assemblies 20 can include an axle shaft 180, a bearing mount 182 and a bearing set 184. The axle shaft 180 has a shaft member 190, which is non-rotatably coupled to an associated one of the differential output members 152, and a wheel mount 192. The bearing mount 182 can be received coaxially about the shaft member 190. The bearing set 184 is disposed on the shaft member 180 against a shoulder 196 that is formed on the shaft member 190. The bearing set 184 is disposed radially between the shaft member 190 and the bearing mount 182. In the example shown, the bearing set 184 comprises a pair of tapered roller bearings and the outer bearing races of the tapered roller bearings is unitarily and integrally formed with the bearing mount 182. A wedding ring 200 can be fitted to the shaft member 190 to inhibit axial movement of the inner bearing races of the tapered roller bearings along the shaft member 190. A tone ring 206 can be mounted to the shaft member 190. Threaded fasteners 210 can be employed to secure the bearing mount 182 to the axle tube flange 82. In the example provided, the threaded fasteners 210 also secure a caliper mount 212 and a dust shield 214 to the bearing mount 182 and the axle tube flange 82.

Figure 7:
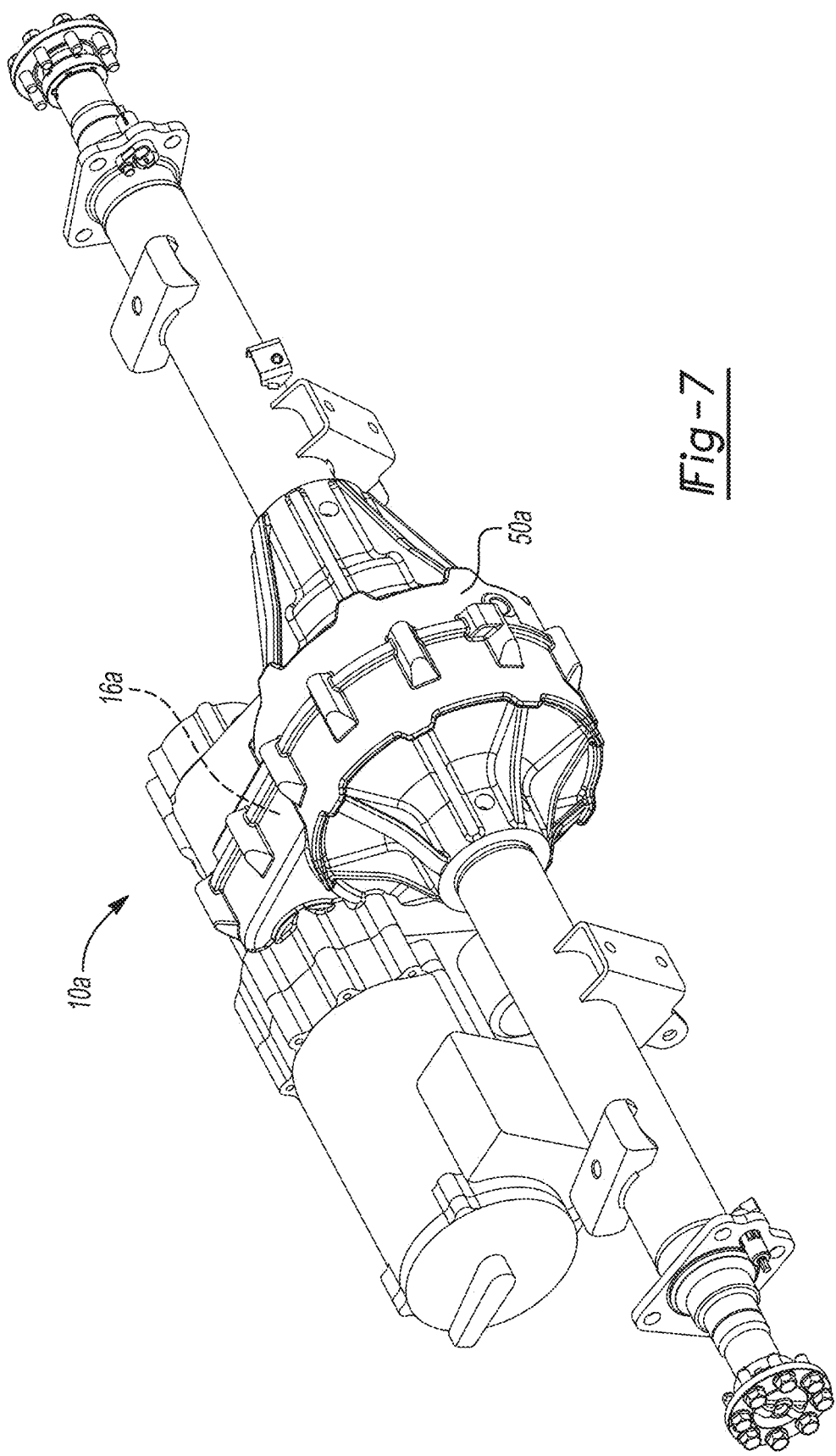
FIG. 7 is a front perspective view of a second exemplary electric drive module constructed in accordance with the teachings of the present disclosure.
Figure 8:
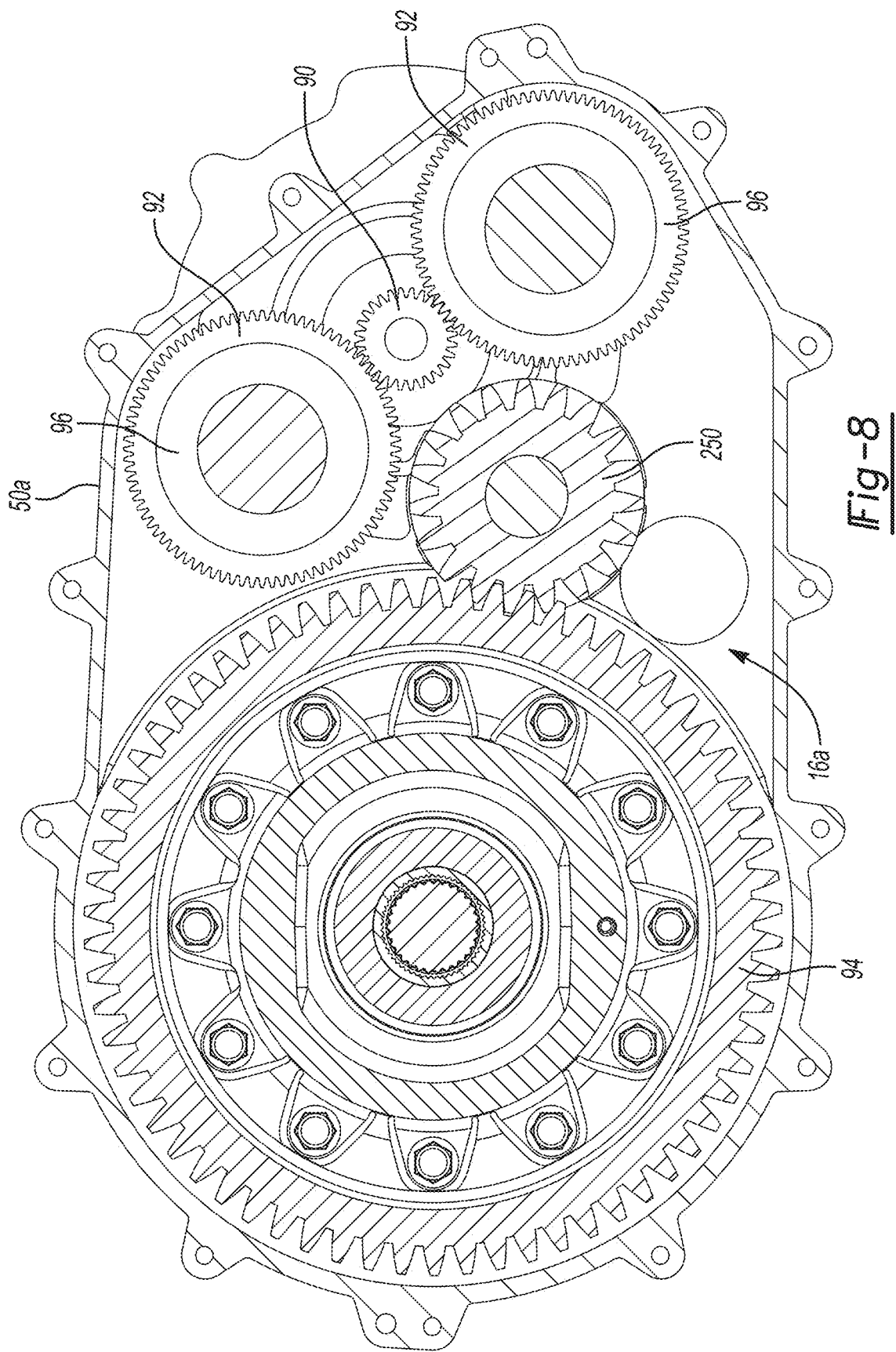
FIGS. 8 and 9 are section views taken through the electric drive module of FIG. 7 and illustrating a transmission.
Figure 9:
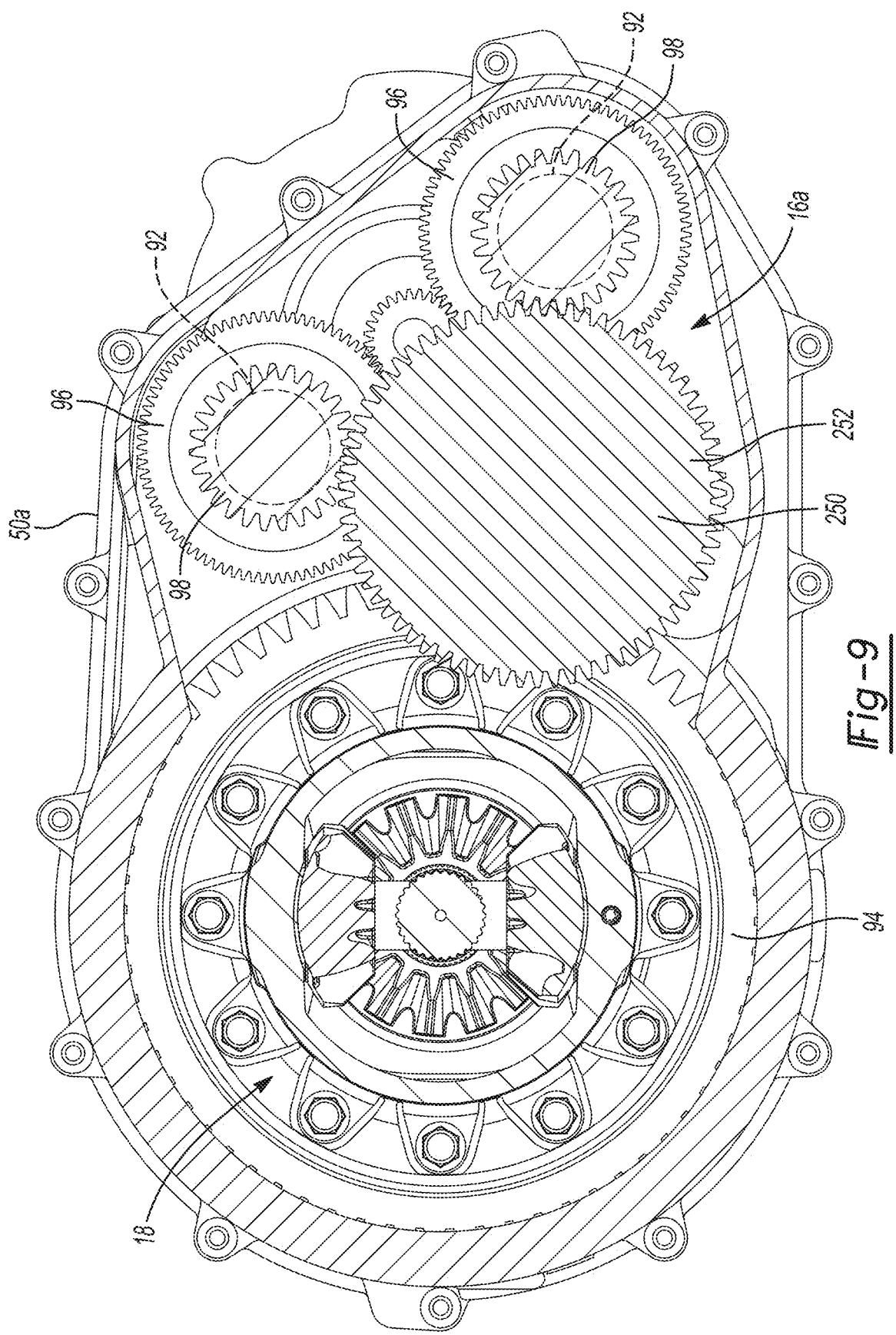
Figure 12:
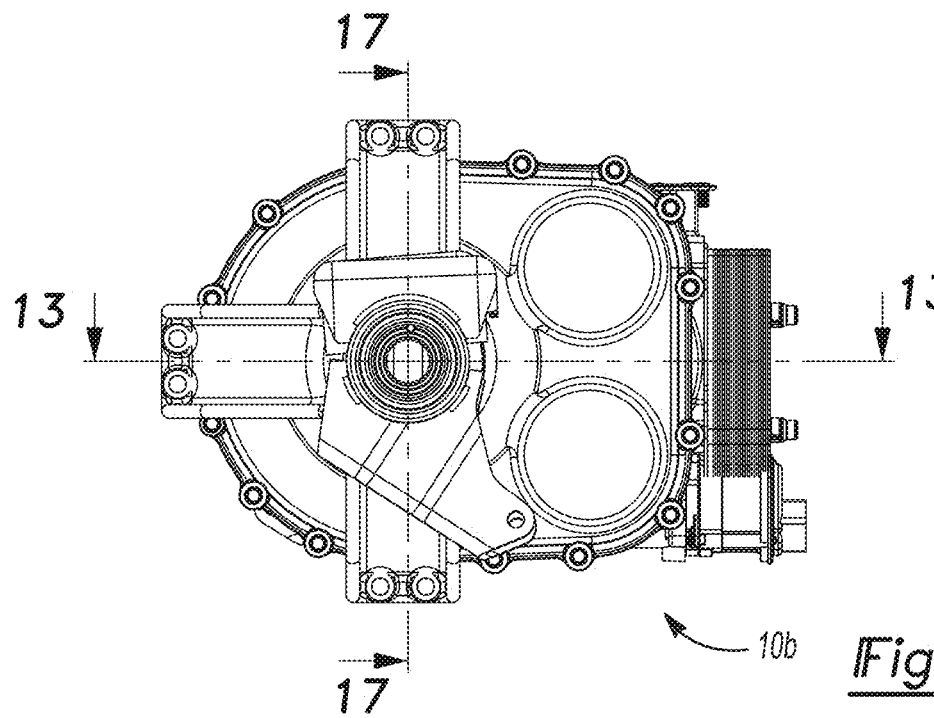
FIG. 12 is a side elevation view of the electric drive module of FIG. 10.
Figure 13:
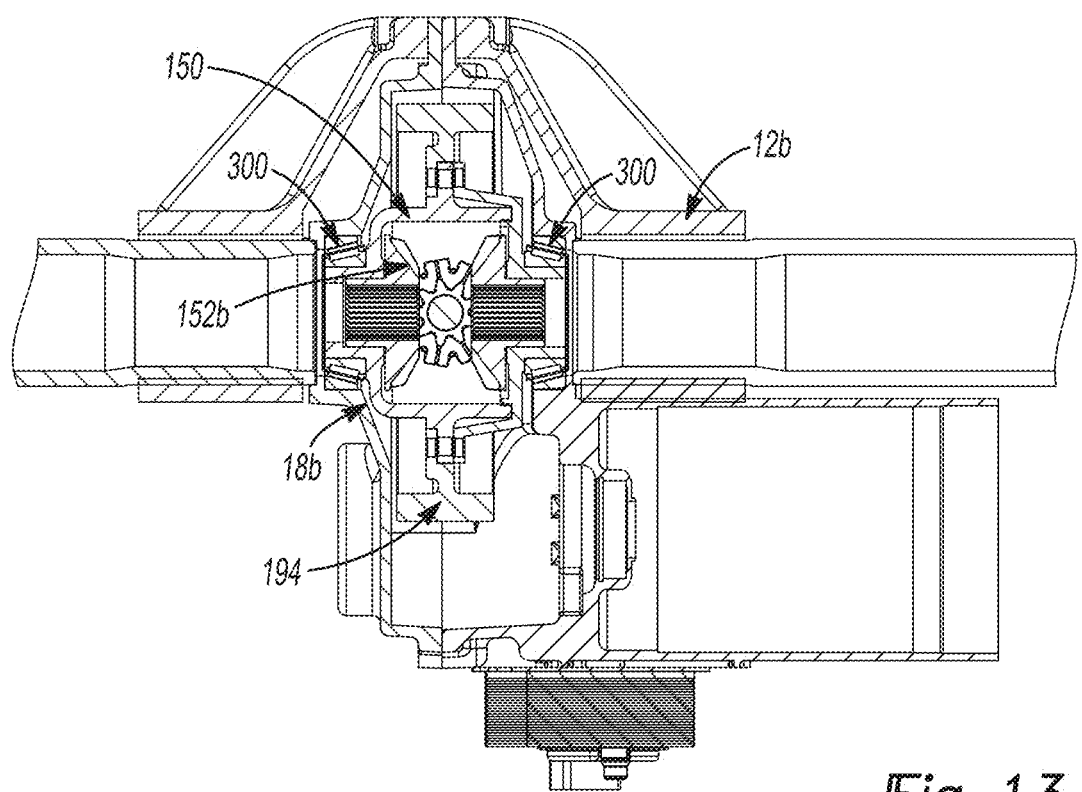
FIG. 13 is a section view of a portion of the electric drive module of FIG. 10.
Figure 14:
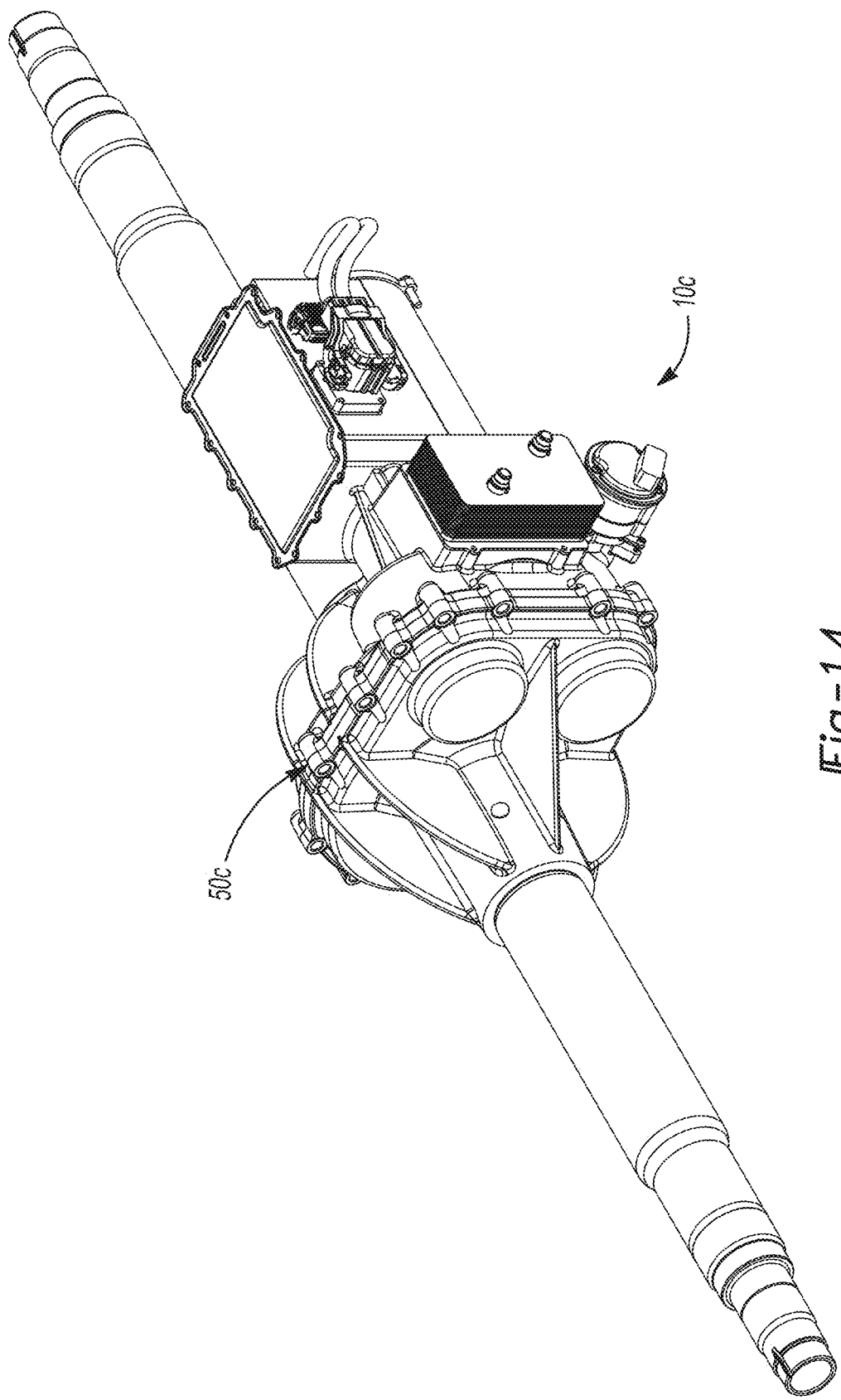
FIGS. 14 and 15 are rear perspective views of a fourth exemplary electric drive module constructed in accordance with the teachings of the present disclosure.
Figure 15:
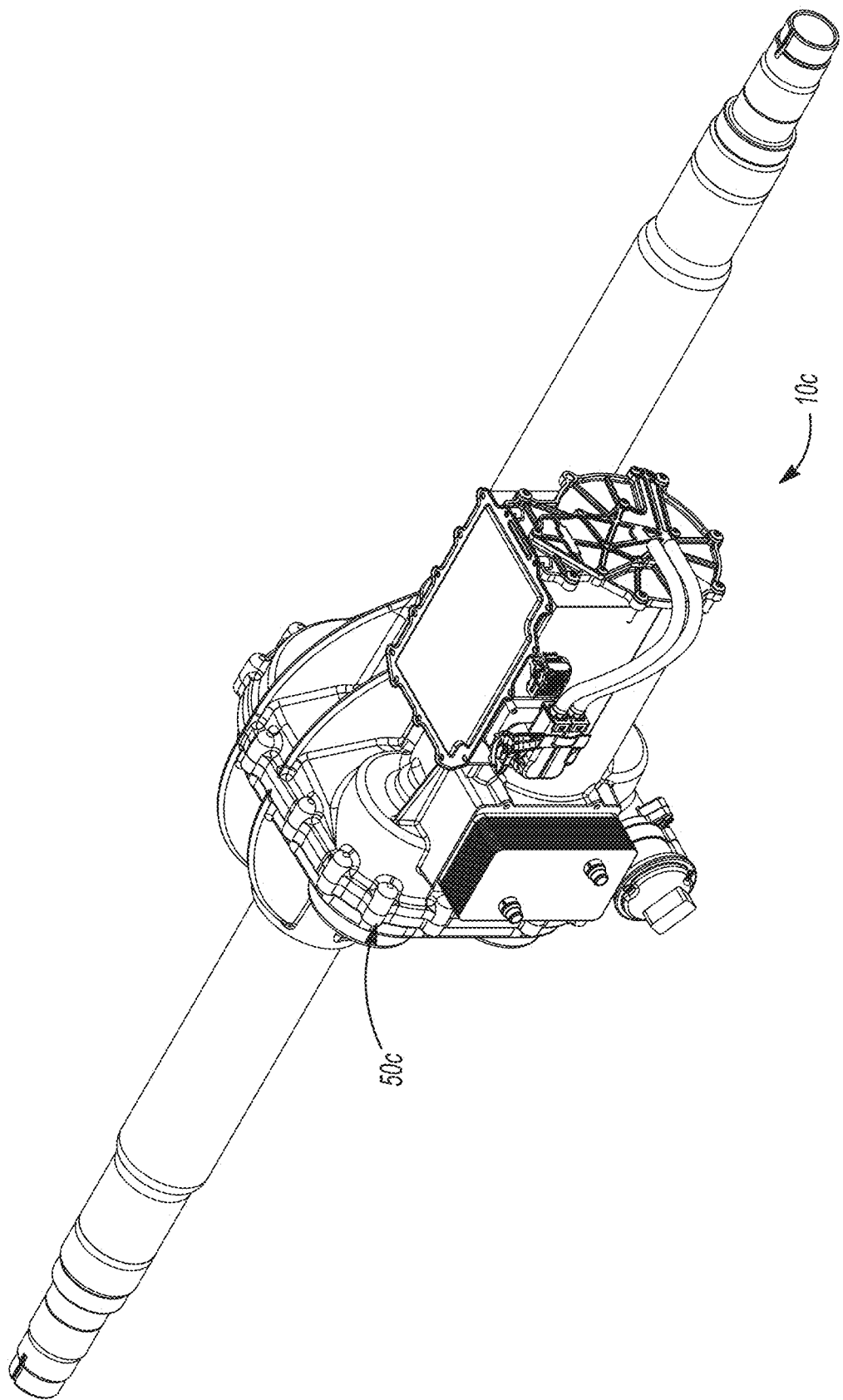
Figure 16:
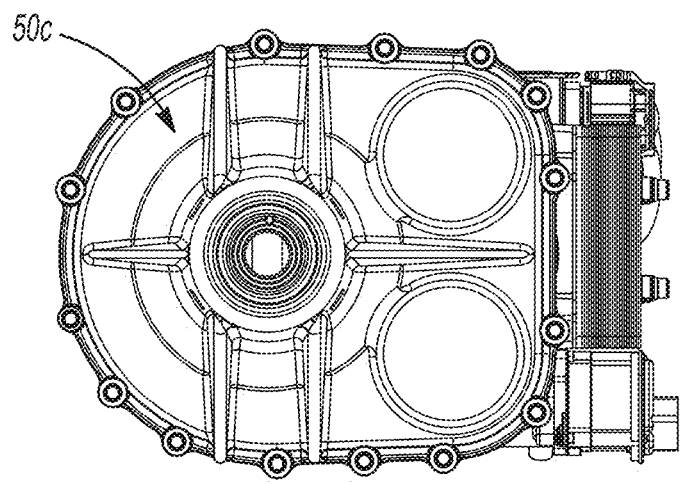
FIG. 16 is a side elevation view of the electric drive module of FIG. 14.
Figure 17:
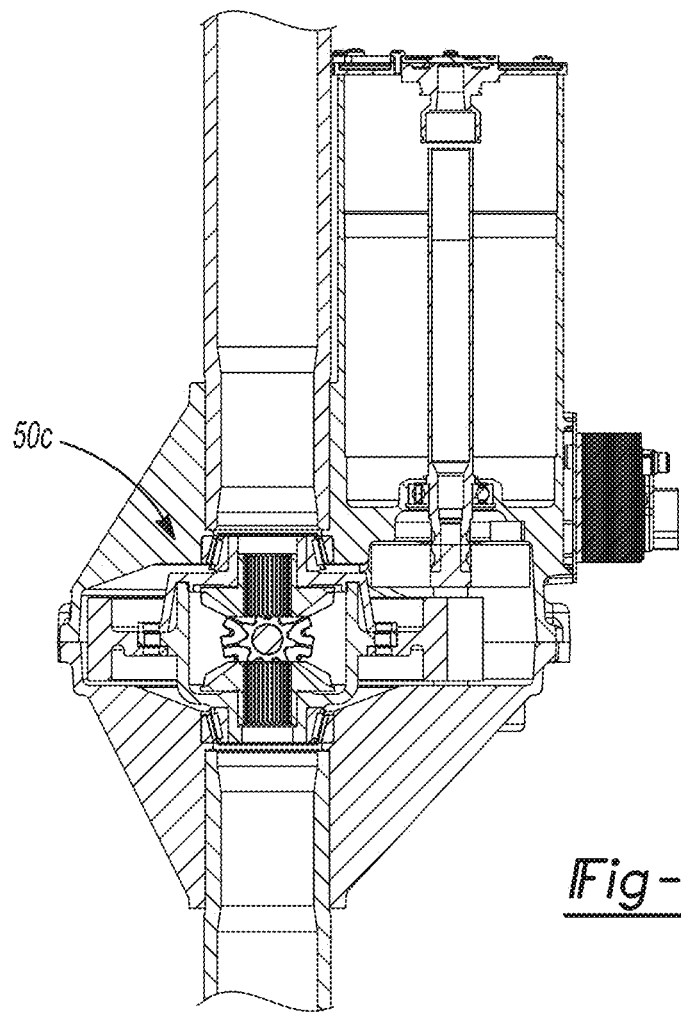
FIG. 17 is a section view of a portion of the electric drive module of FIG. 14.
Figure 18:
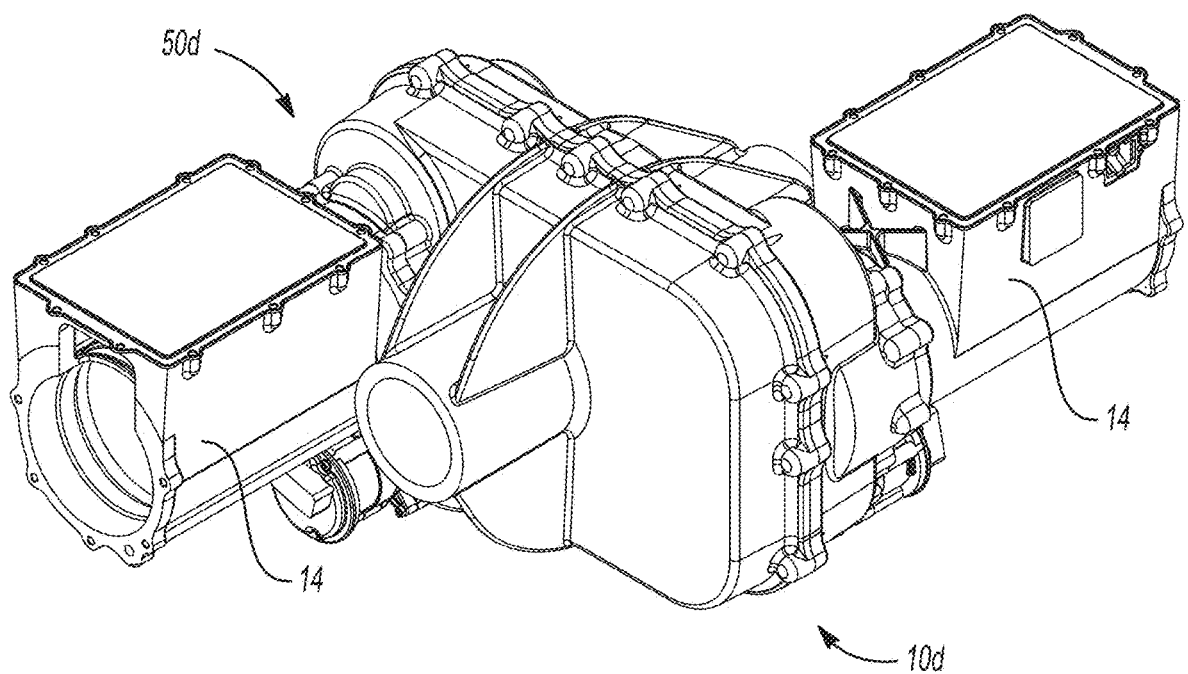
FIG. 18 is a front perspective view of a portion of a fifth exemplary electric drive module constructed in accordance with the teachings of the present disclosure.
Figure 19:
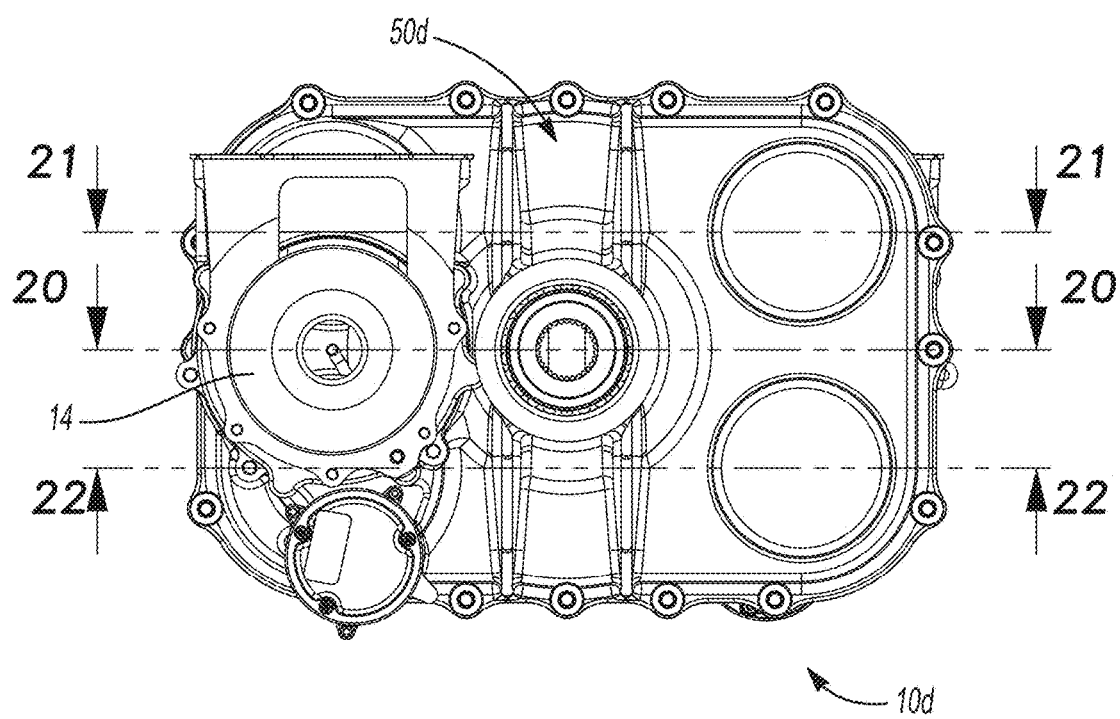
FIG. 19 is a side elevation view of the electric drive module of FIG. 18.
Figure 20:
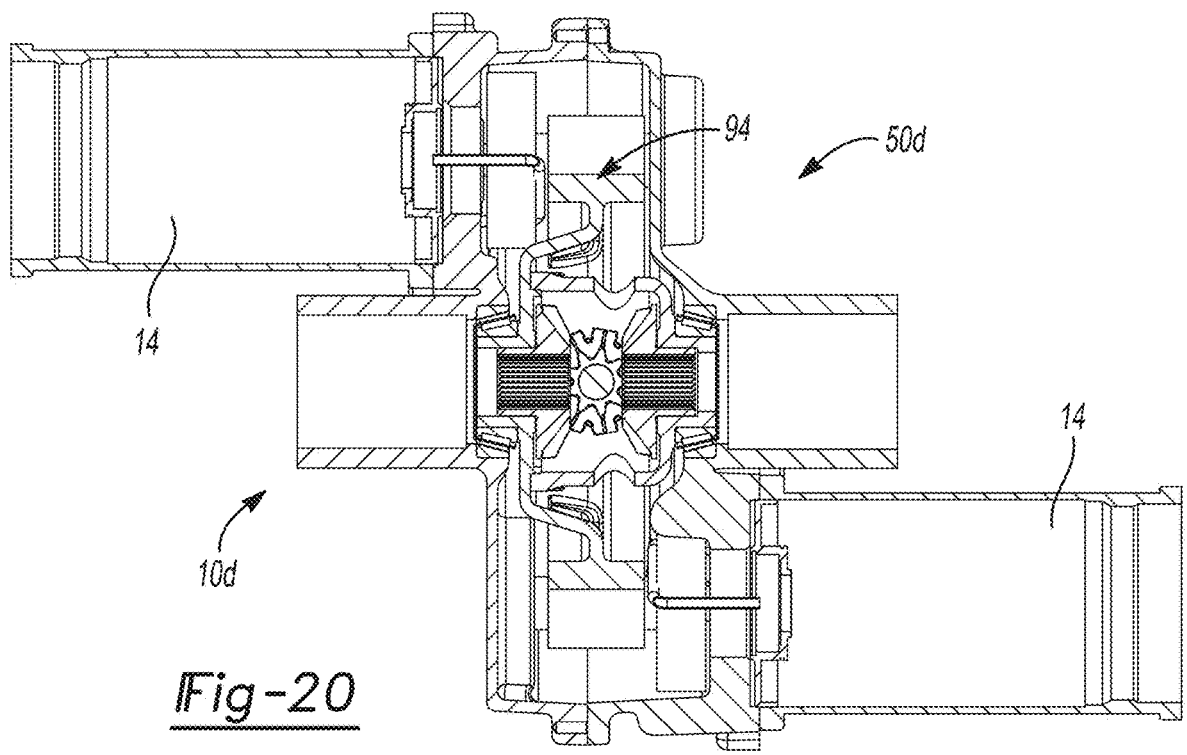
FIG. 20 is a section view taken along the line 20-20 of FIG. 19.
Figure 21:
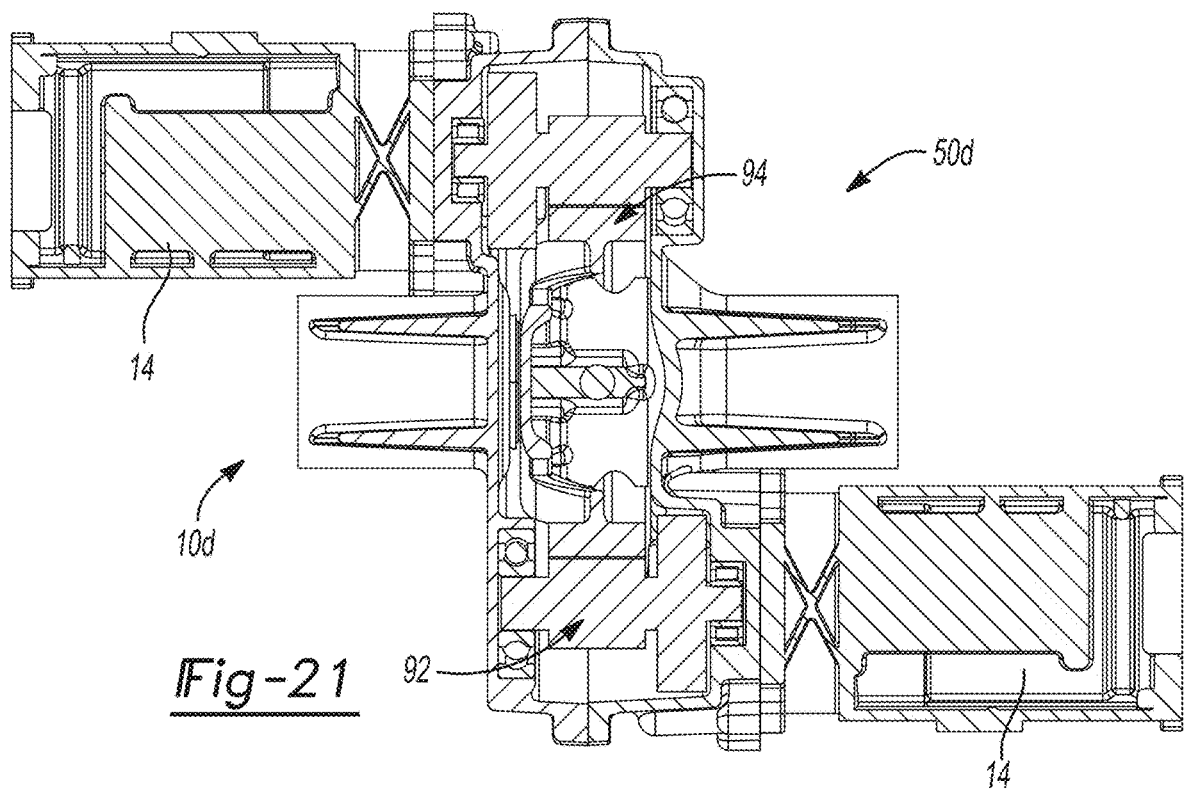
FIG. 21 is a section view taken along the line 21-21 of FIG. 19.
Figure 22:
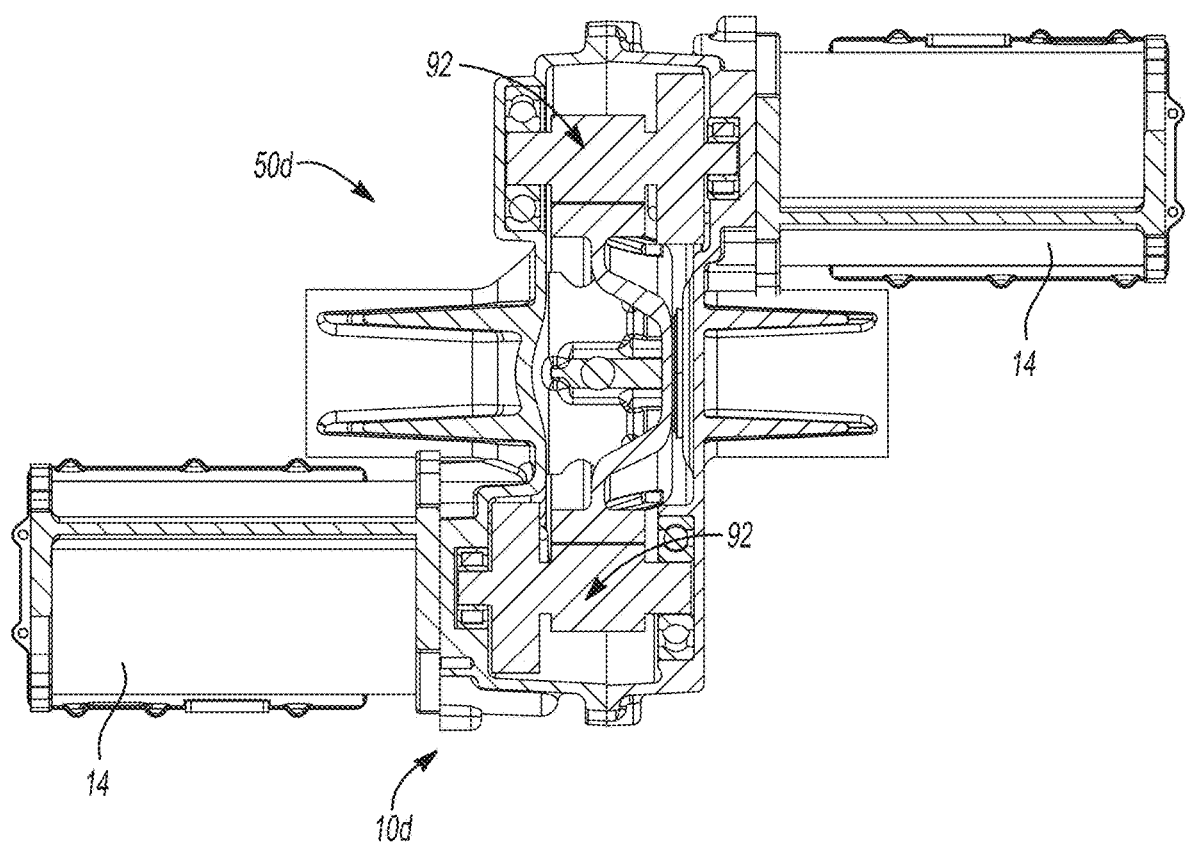
FIG. 22 is a section view taken along the line 22-22 of FIG. 19.

With reference to FIGS. 7 through 9, another electric drive module constructed in accordance with the teachings of the present disclosure is generally indicated by reference numeral 10a. The electric drive module 10a is generally similar to the electric drive module 10 (FIG. 1) that is described in detail above, except for the configuration of the transmission 16a and for modifications to the carrier housing 50a to accommodate the transmission 16a. The transmission 16a employs a further reduction between the second gears 98 and the transmission output gear 94 so that the second gears 98 do not directly mesh with the transmission output gear 94. More specifically, the transmission 16a includes a second compound gear 250, which has a third gear 252, which is meshingly engaged to the second gears 98 of the compound gears 92, and a fourth gear 254 that is non-rotatably coupled to the third gear 252 and meshingly engaged with the transmission output gear 94. Fourth and fifth bearings (not shown), which can be similar to the second and third bearings 130 and 132 (FIG. 3), can be employed to axially and rotationally support the compound gear 250 relative to the carrier housing 50a.

With reference to FIGS. 10-13, another exemplary electric drive module constructed in accordance with the teachings of the present disclosure is generally indicated by reference numeral 10b. The electric drive module 10b can be generally similar to the electric drive module 10 (FIG. 1), except for the configuration of the housing assembly 12b and the differential 18b. More specifically, the differential 18b can include a differential input member 150 that can be configured as a differential case that can housing a plurality of differential pinions (not specifically shown) and a pair of side gears 152b that serve as differential output members. The differential input member 150 is fixedly coupled to the transmission output gear 94. A pair of bearings 300 support the differential input member 150 relative to the housing assembly 12b. In the example provided, the bearings 300 comprise tapered roller bearings, but it will be appreciated that the bearings 300 could be configured differently, for example as angular contact bearings. The tapered roller bearings can be pre-loaded in respective axial directions in any desired manner, such as with shims. Optionally, a bearing adjuster arrangement is employed to axially pre-load one of the bearings 300. The bearing adjuster arrangement includes a threaded adjustment bushing having threads that are threaded into housing threads formed in the housing assembly. The adjustment bushing is tightened against the outer bearing race of a respective one of the bearings 300 to apply a desired clamping force to the respective one of the bearings 300. A clip, which is coupled to the housing assembly with a threaded fastener, is engaged to the adjustment bushing to inhibit rotation of the adjustment bushing relative to the housing assembly. Optionally, a speed sensor can be employed to sense a rotational speed of the differential input member 150. In the example illustrated, the speed sensor includes a sensor target, which is coupled to the differential input member 150 for rotation therewith, and a sensor that senses the sensor target as the sensor target rotates. In the example provided, the sensor is a Hall-effect sensor and is mounted to the housing assembly.

FIGS. 14-17 depict an electric drive module 10c that is similar to that of FIGS. 10-13, except for the configuration of the carrier housing 50c.

FIGS. 18-22 depict yet another electric drive module 10d constructed in accordance with the teachings of the present disclosure. The electric drive module 10d is similar to that of FIGS. 14-17, except that the carrier housing 50d is configured to accommodate two electric motor assemblies 14 and two transmissions 16. It will be appreciated that each of the electric motor assemblies 14 can drive a respective pinion gear (not specifically shown), which can in turn drive a pair of compound gears 92. However, the two transmissions 16 have a single or common transmission output gear 94 that is engaged by the two pairs of compound gears 92.

In the particular example provided, the motor output shaft axes 32 are parallel to one another and the output axis 34 is disposed between the motor output shaft axes 32.

FIGS. 23-27 depict another electric drive module 10e that is generally similar to the electric drive module 10d of FIGS. 18-22 except for the configuration of the carrier housing 50e. In this example, the carrier housing 50e includes a center section 310, and a pair of end covers 312. The center section 310 defines the axle tube mounts 56, as well as first and second flanges (not specifically shown), respectively, that are parallel to and spaced apart from the output axis. Each of the end covers defines an associated motor mount 58, which is configured to receive an associated one of the electric motor assemblies 14 therein, and is configured to house the pinion gear 90 and the pair of compound gears 92 of a respective one of the transmissions 16. The end covers 312 cooperate with the center section 310 to form the internal cavity 60 into which the differential (not specifically shown) and the single or common transmission output gear (not specifically shown) are received.

Figure 23:
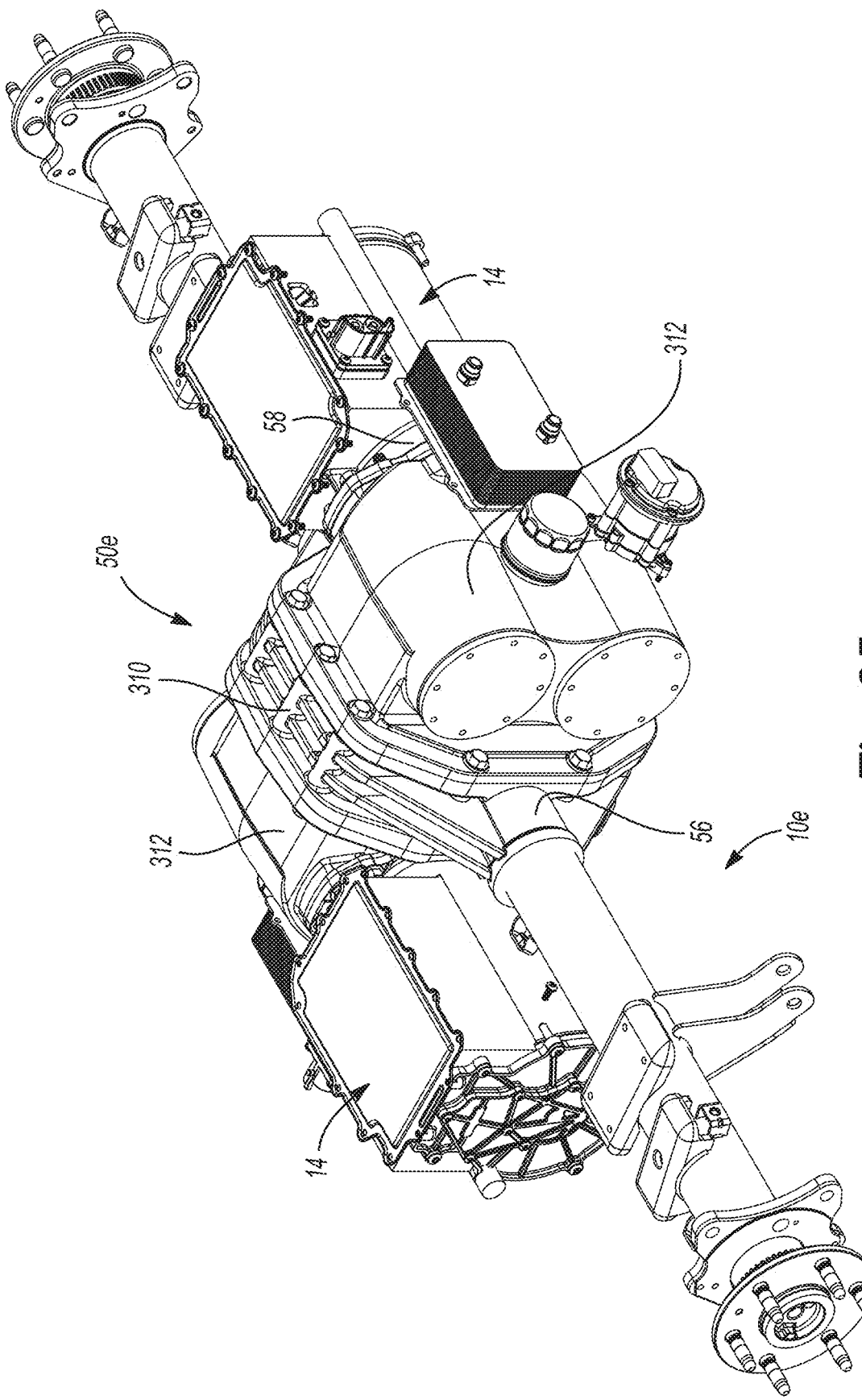
FIGS. 23 and 24 are rear perspective views of a sixth exemplary electric drive module constructed in accordance with the teachings of the present disclosure.
Figure 24:
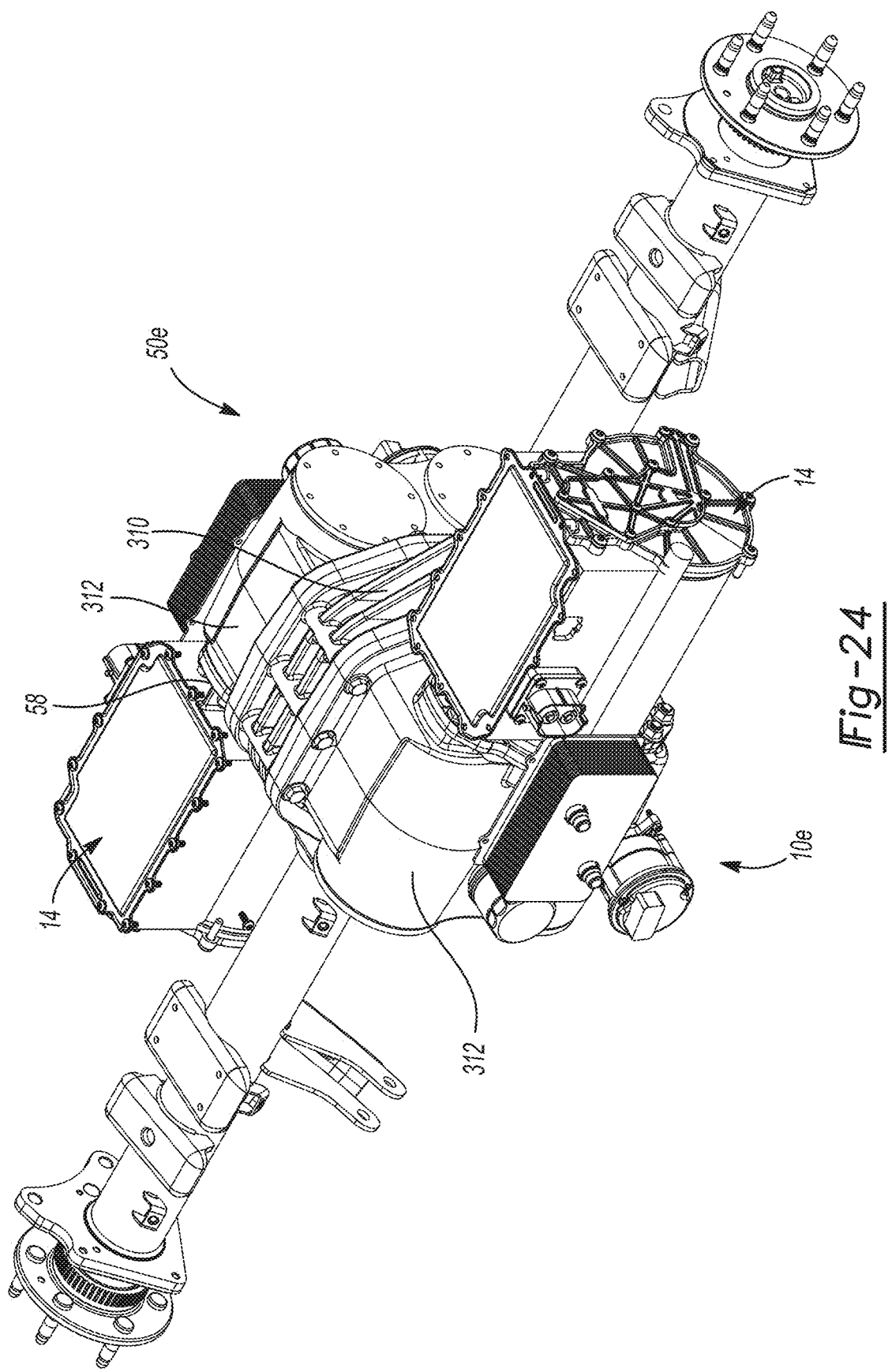
Figure 25:
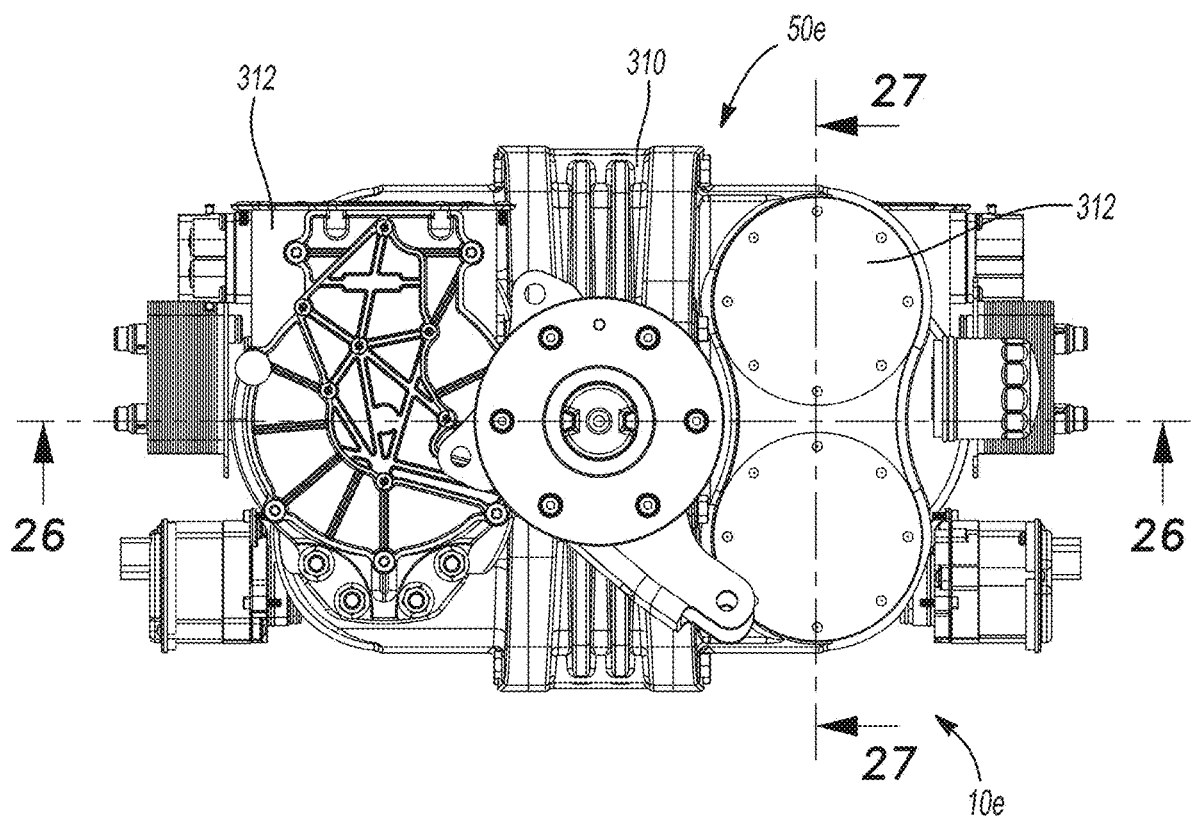
FIG. 25 is a side elevation view of the electric drive module of FIG. 23.
Figure 26:
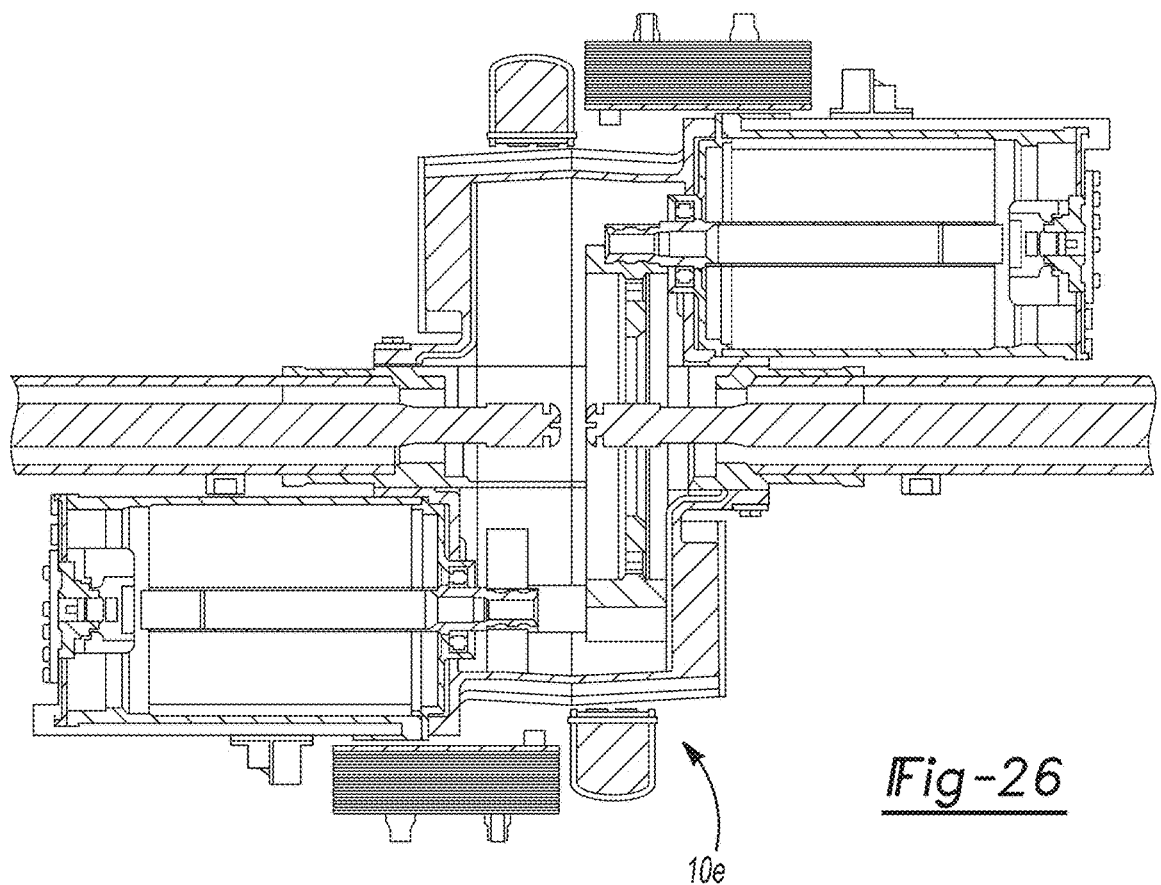
FIG. 26 is a section view taken along the line 26-26 of FIG. 25.
Figure 27:
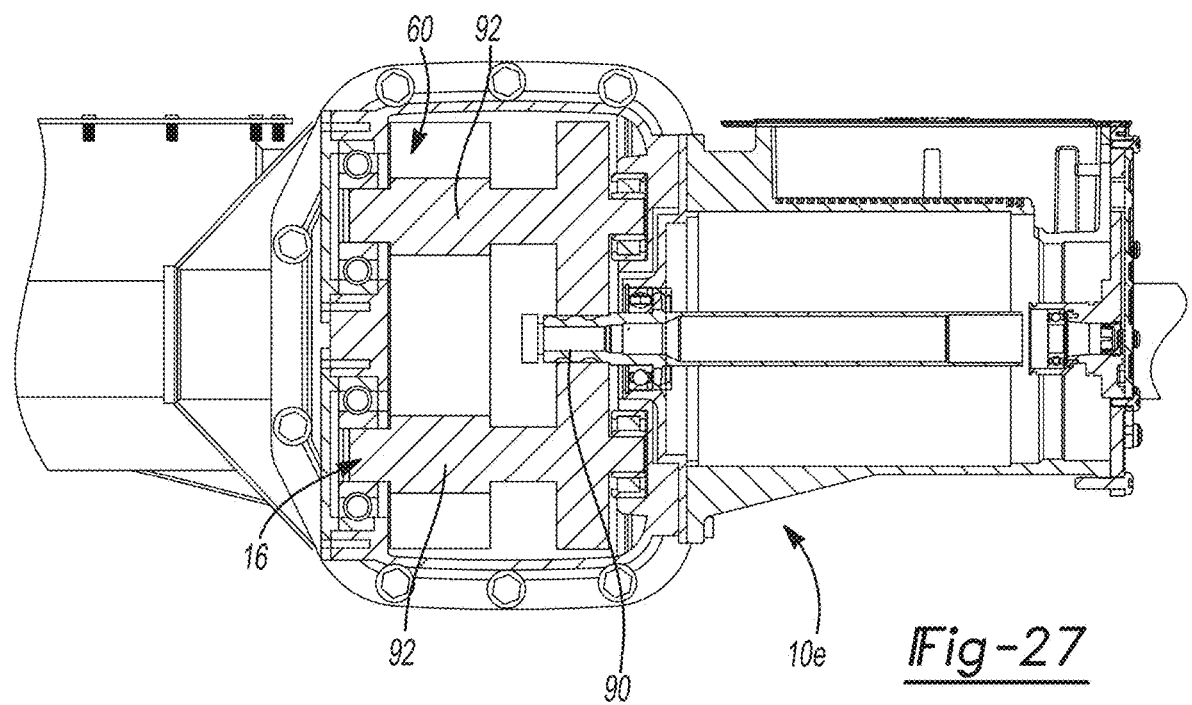
FIG. 27 is a section view taken along the line 27-27 of FIG. 25.
Figure 28:
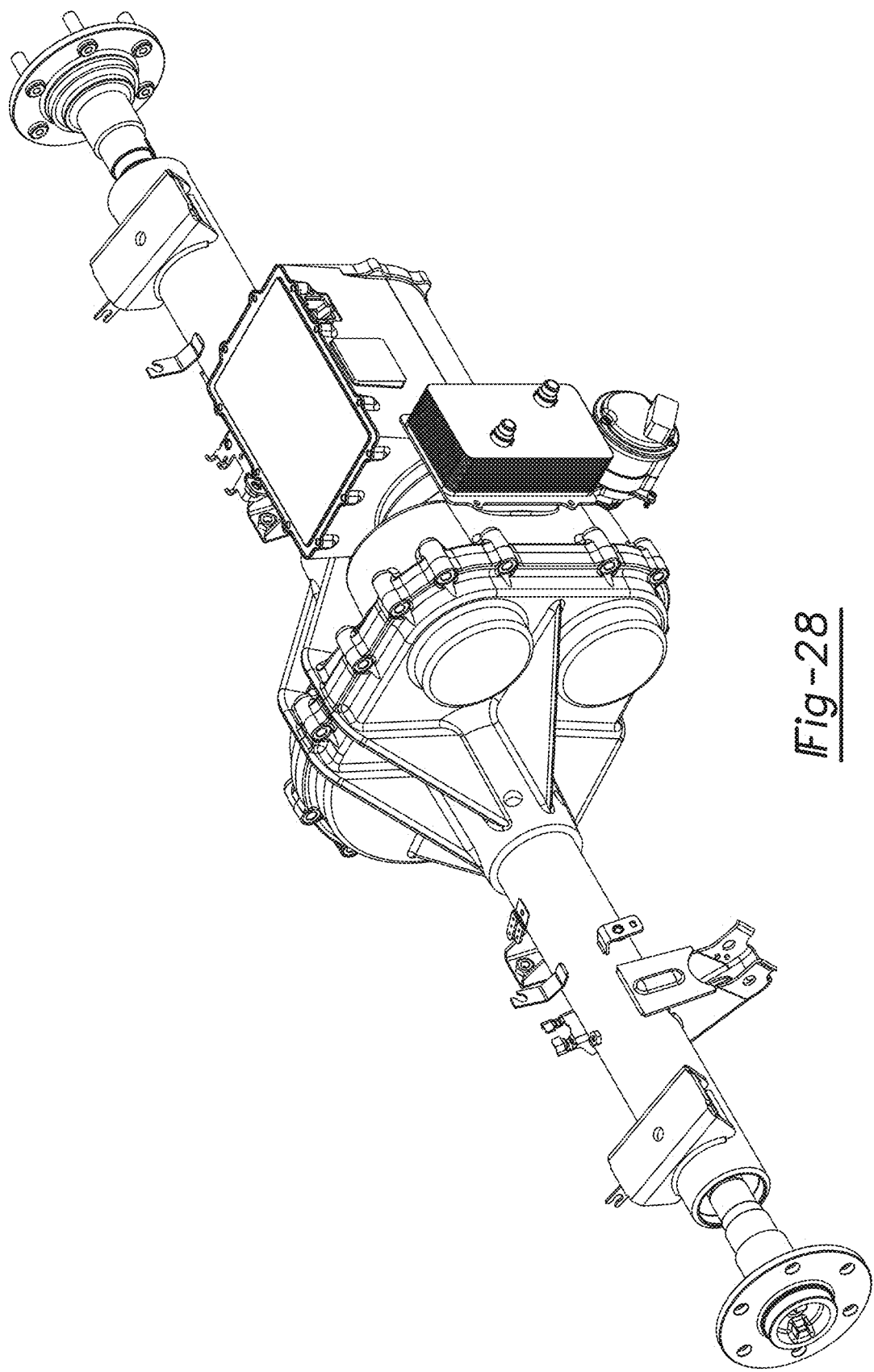
FIGS. 28 and 29 are rear perspective views of a seventh exemplary electric drive module constructed in accordance with the teachings of the present disclosure.
Figure 29:
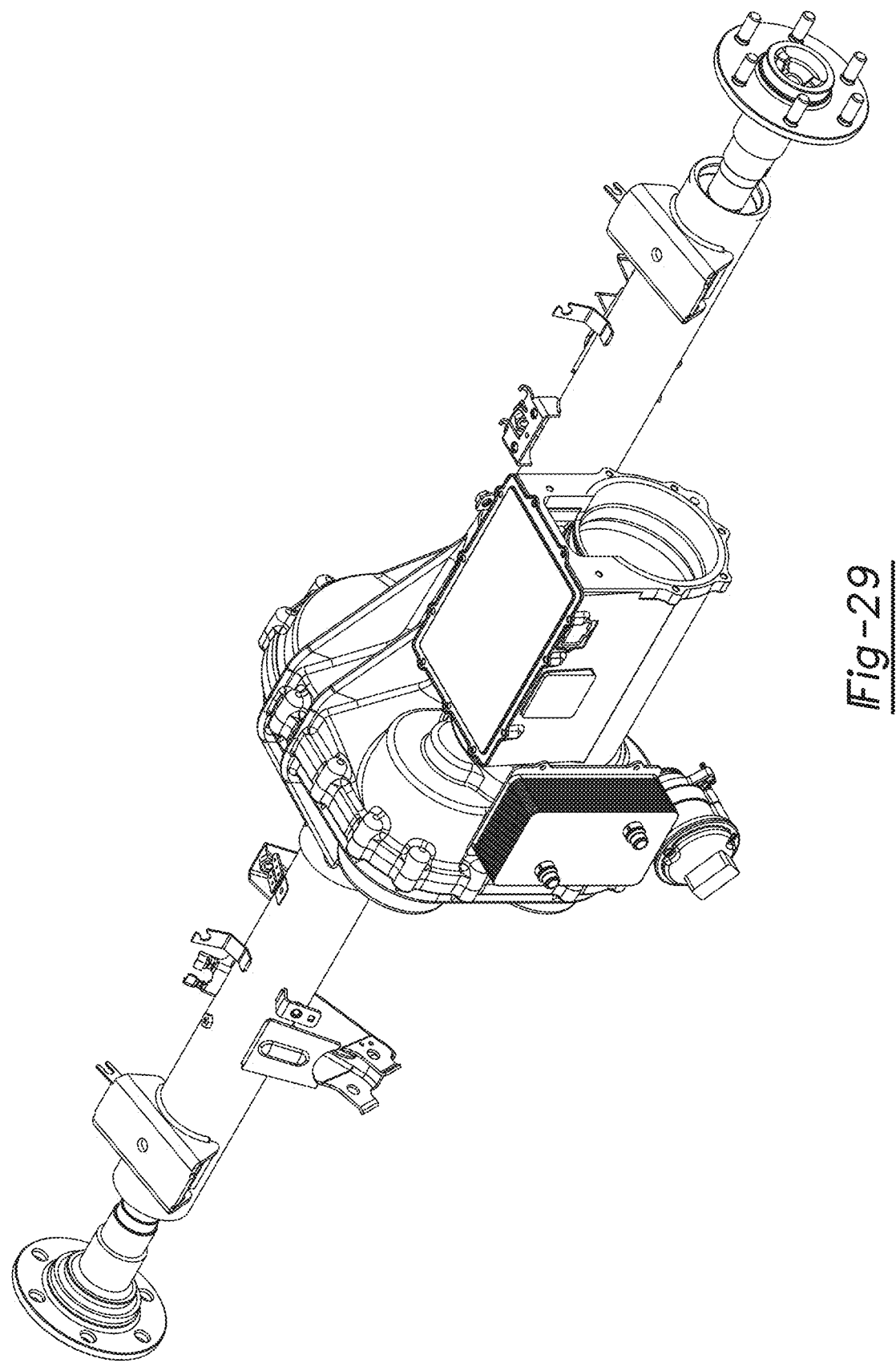
Figure 30:
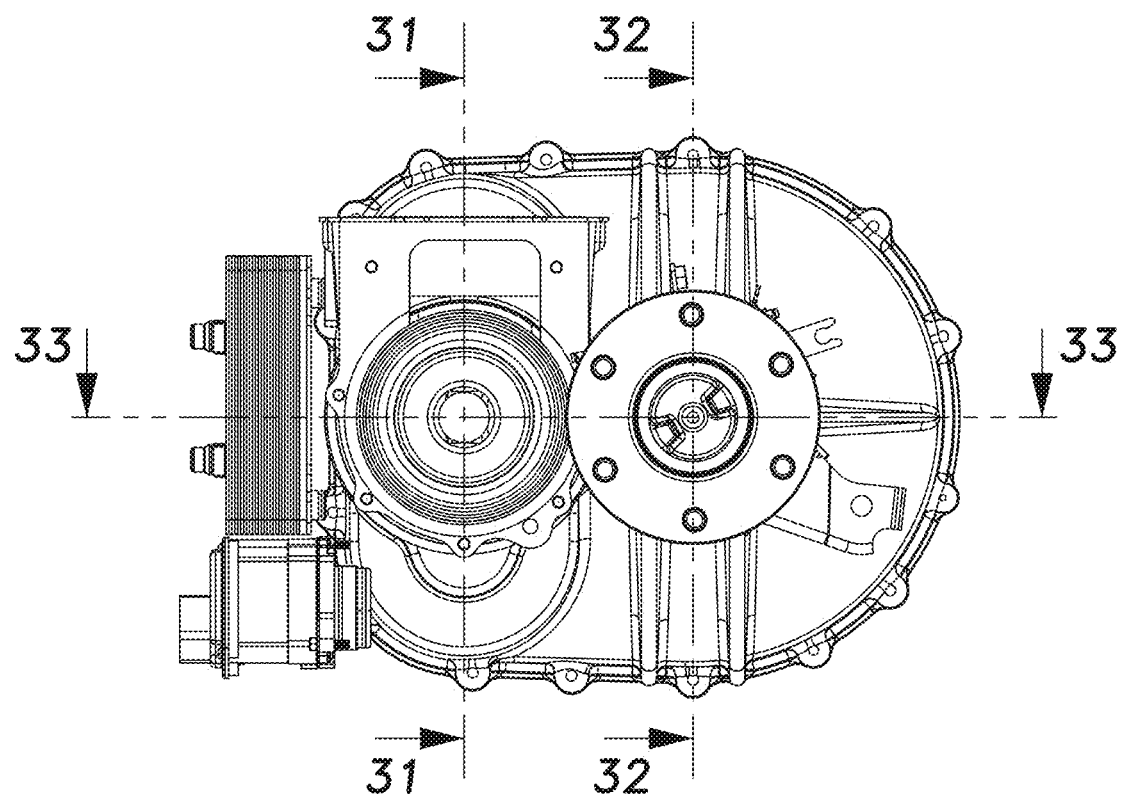
FIG. 30 is a side elevation view of the electric drive module of FIG. 28.
Figure 31:
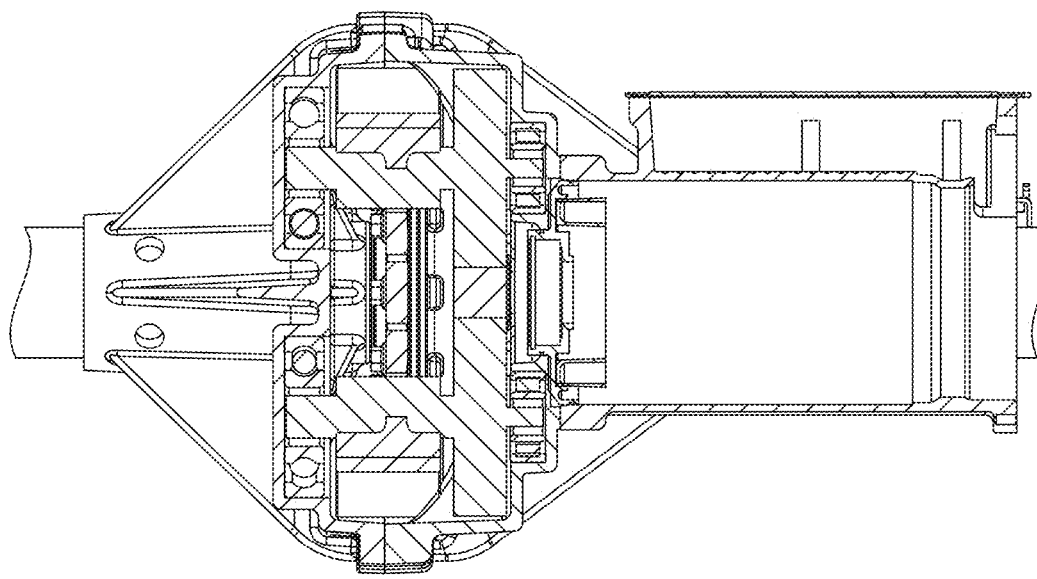
FIG. 31 is a section view taken along the line 31-31 of FIG. 30.
Figure 32:
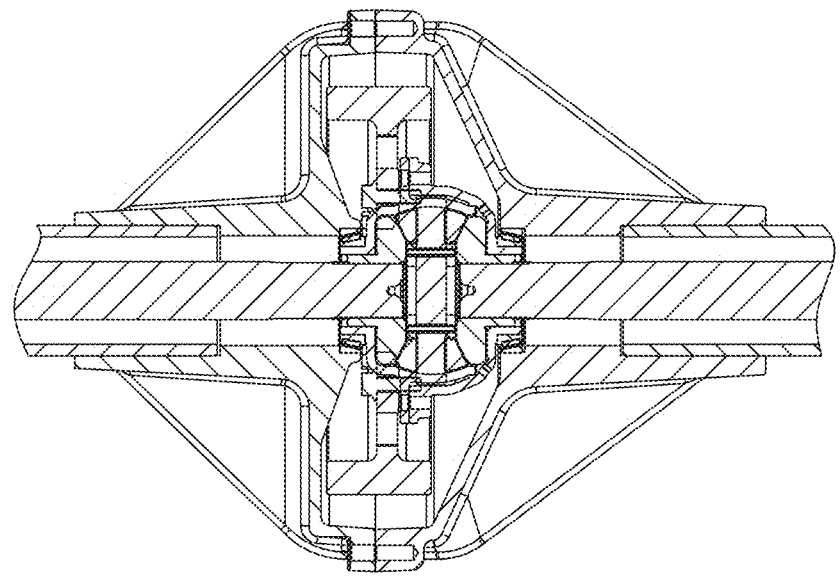
FIG. 32 is a section view taken along the line 32-32 of FIG. 30.
Figure 33:
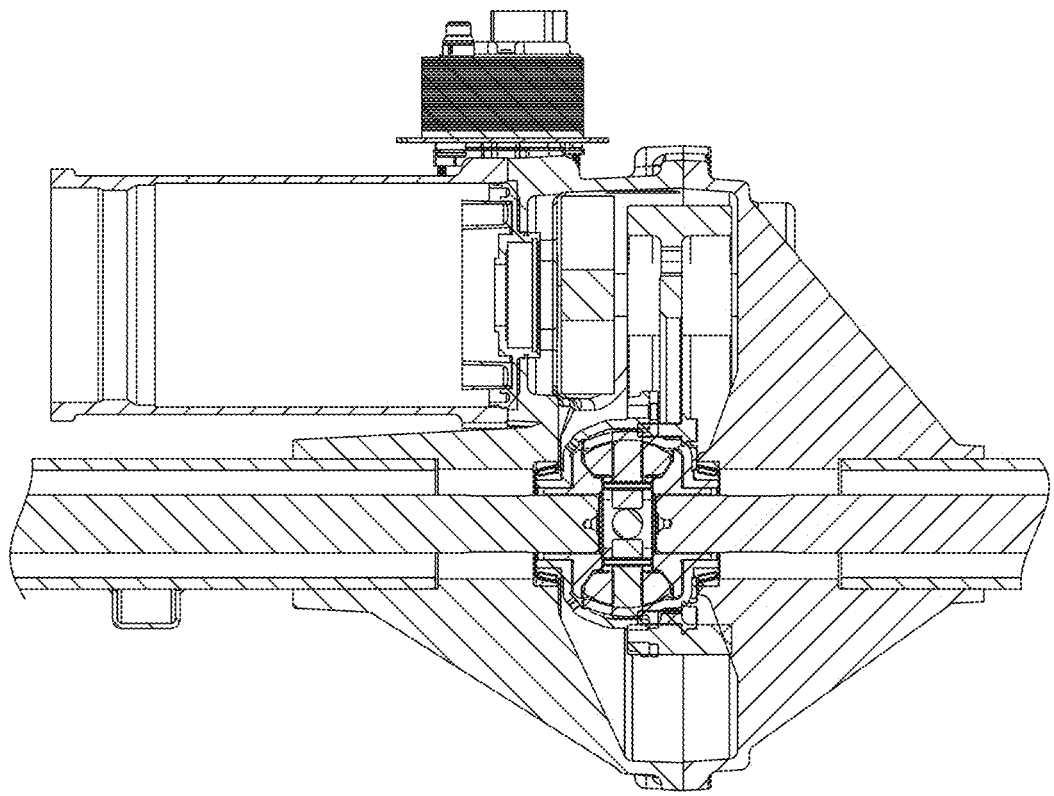
FIG. 33 is a section view taken along the line 33-33 of FIG. 30.
Figure 34:
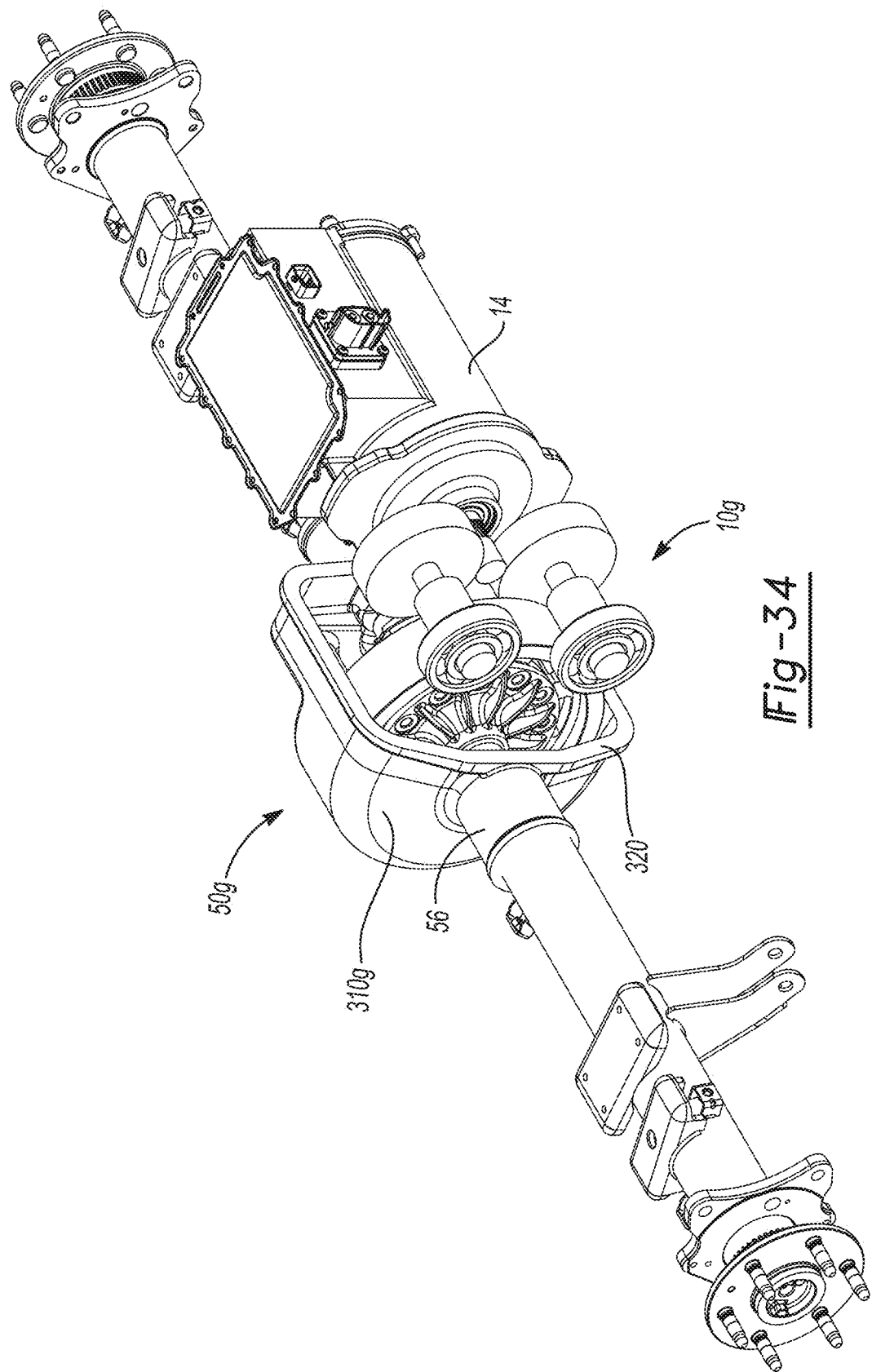
FIGS. 34 and 35 are rear perspective views of a portion of an eighth exemplary electric drive module constructed in accordance with the teachings of the present disclosure.
Figure 35:
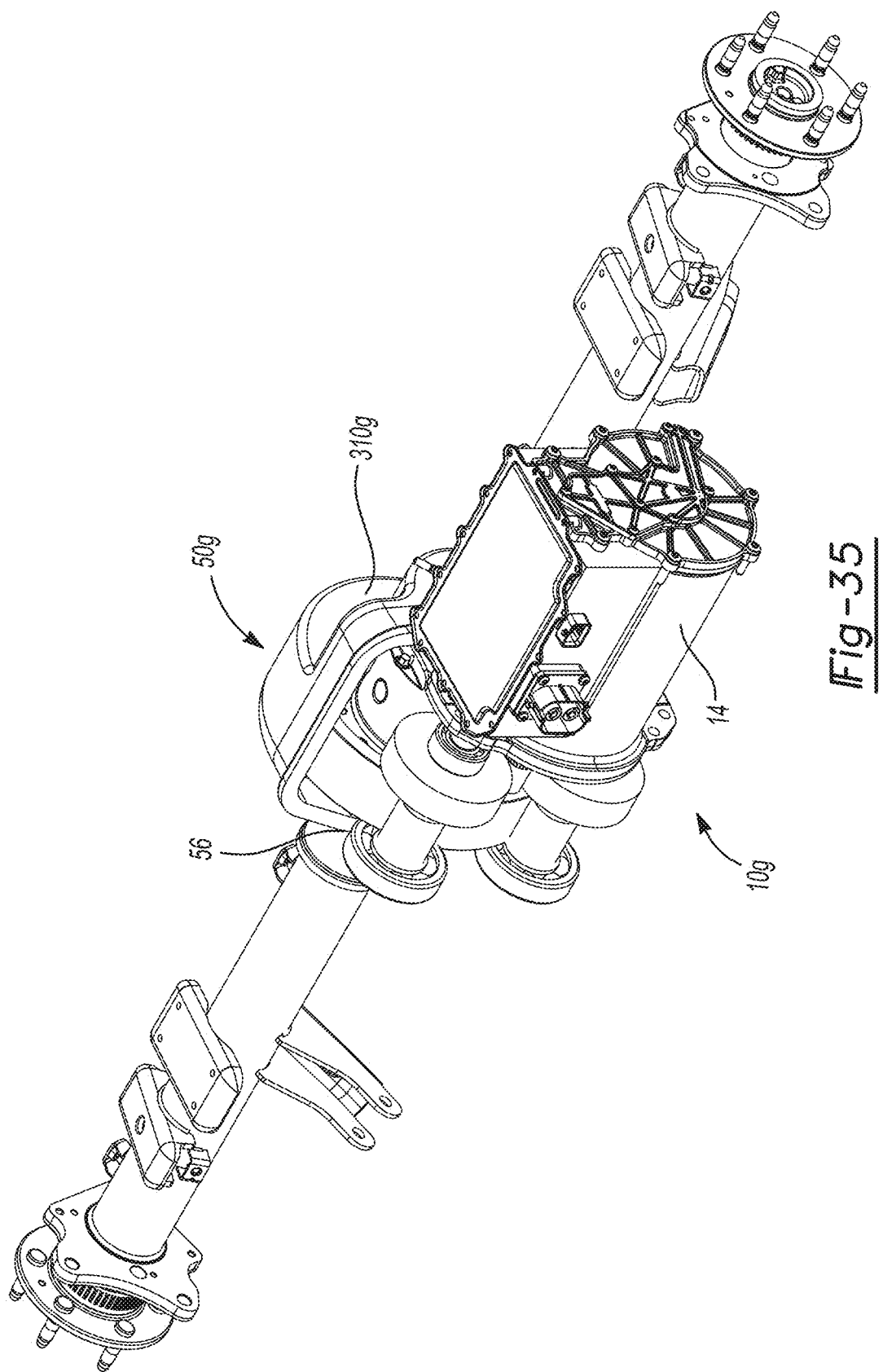
Figure 36:
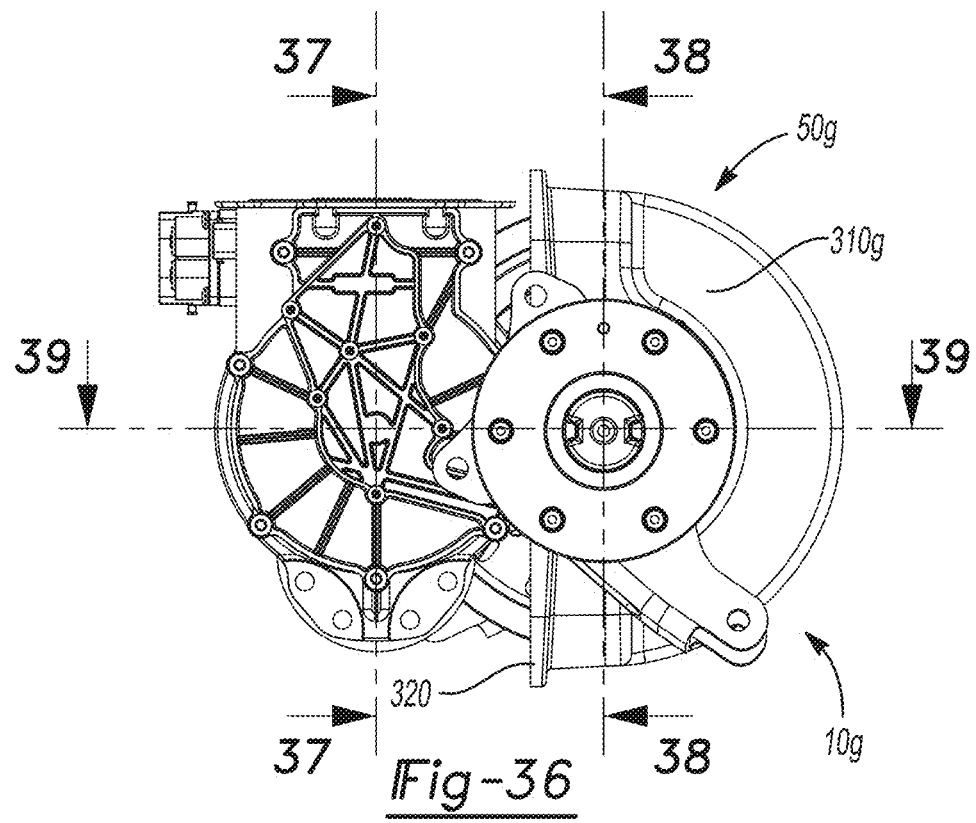
FIG. 36 is a side elevation view of the electric drive module of FIG. 34.
Figure 37:
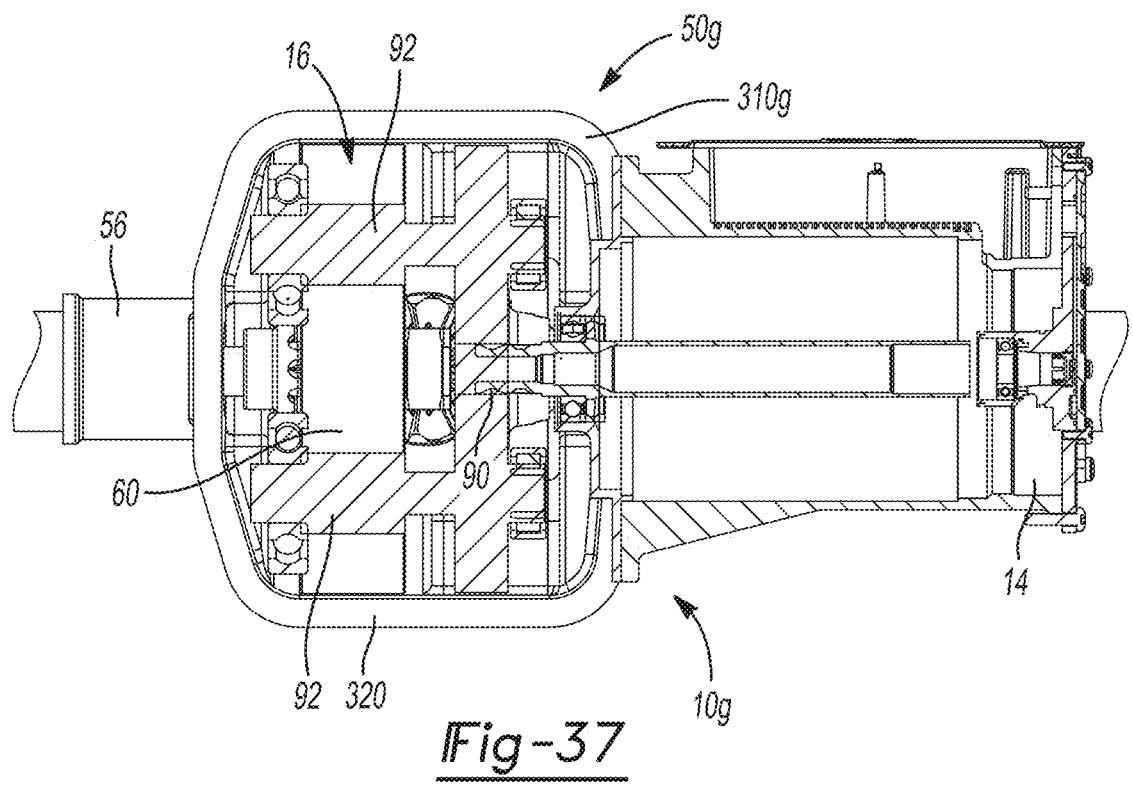
FIG. 37 is a section view taken along the line 37-37 of FIG. 36.
Figure 38:
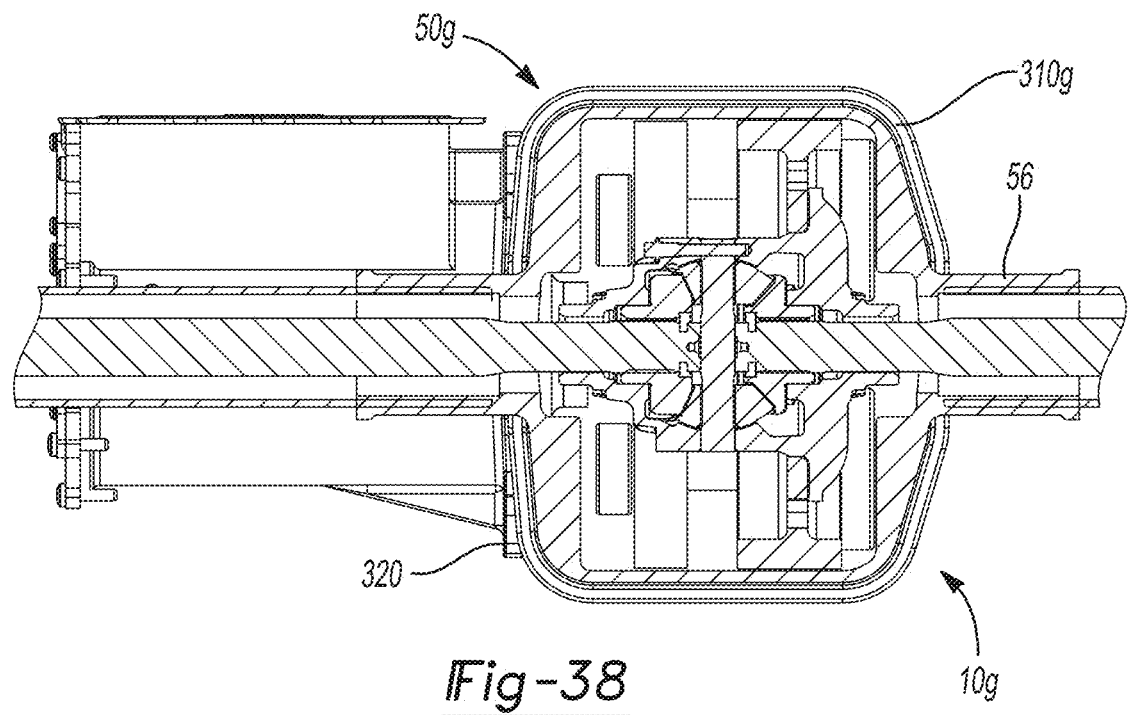
Figure 39:
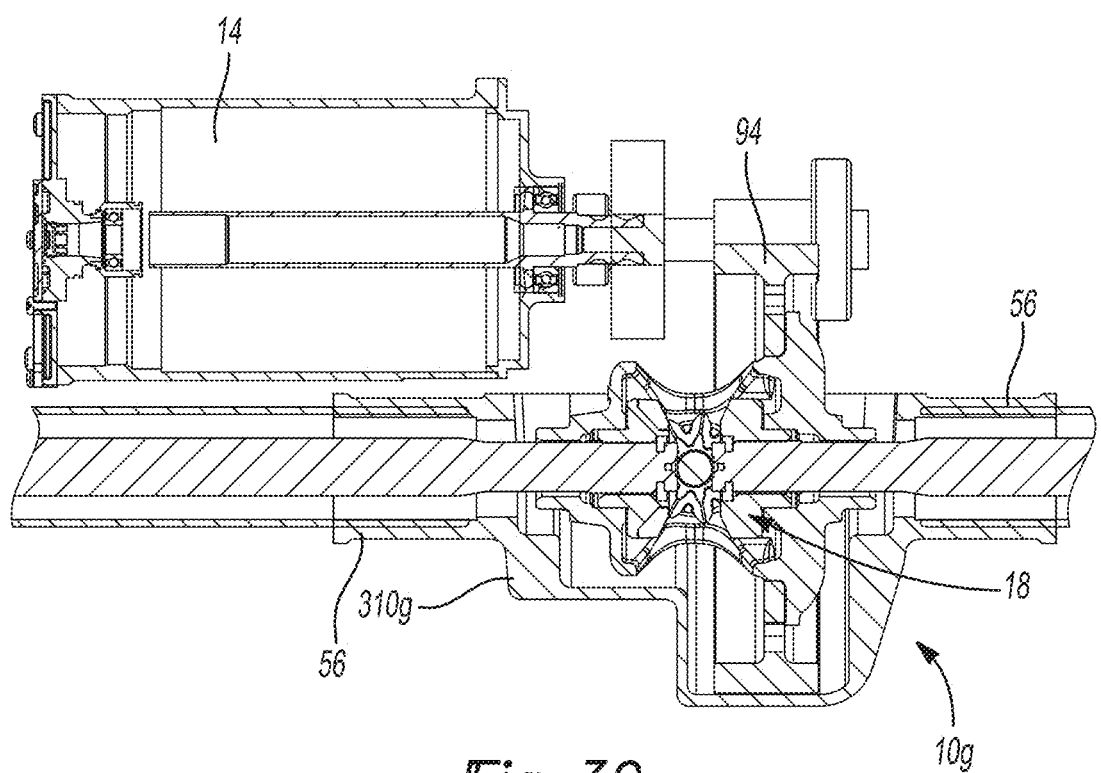
FIG. 39 is a section view taken along the line 38-38 of FIG. 36.
Figure 40:
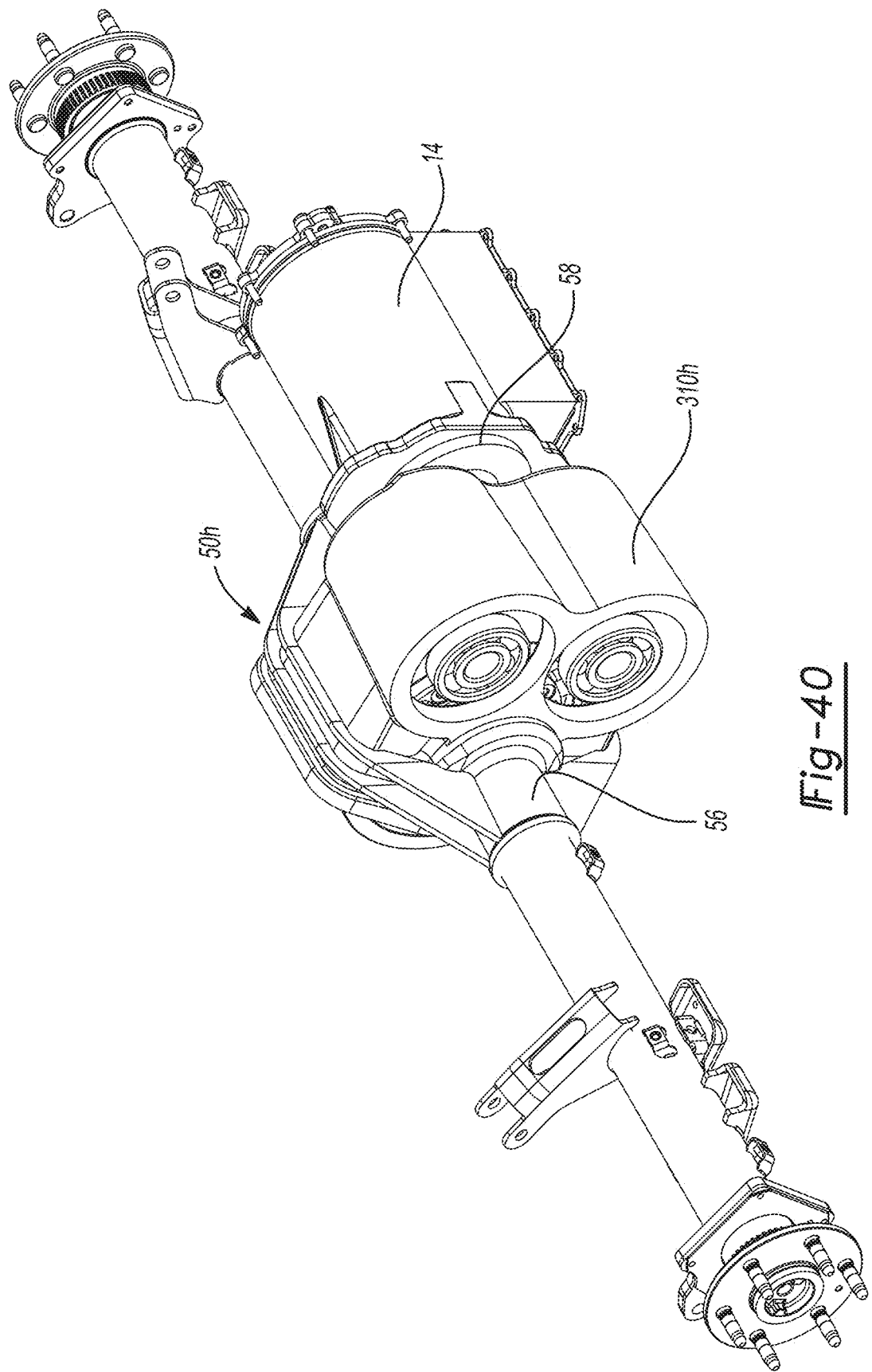
FIG. 40 is a rear perspective view of a portion of a ninth exemplary electric drive module constructed in accordance with the teachings of the present disclosure.
Figure 41:
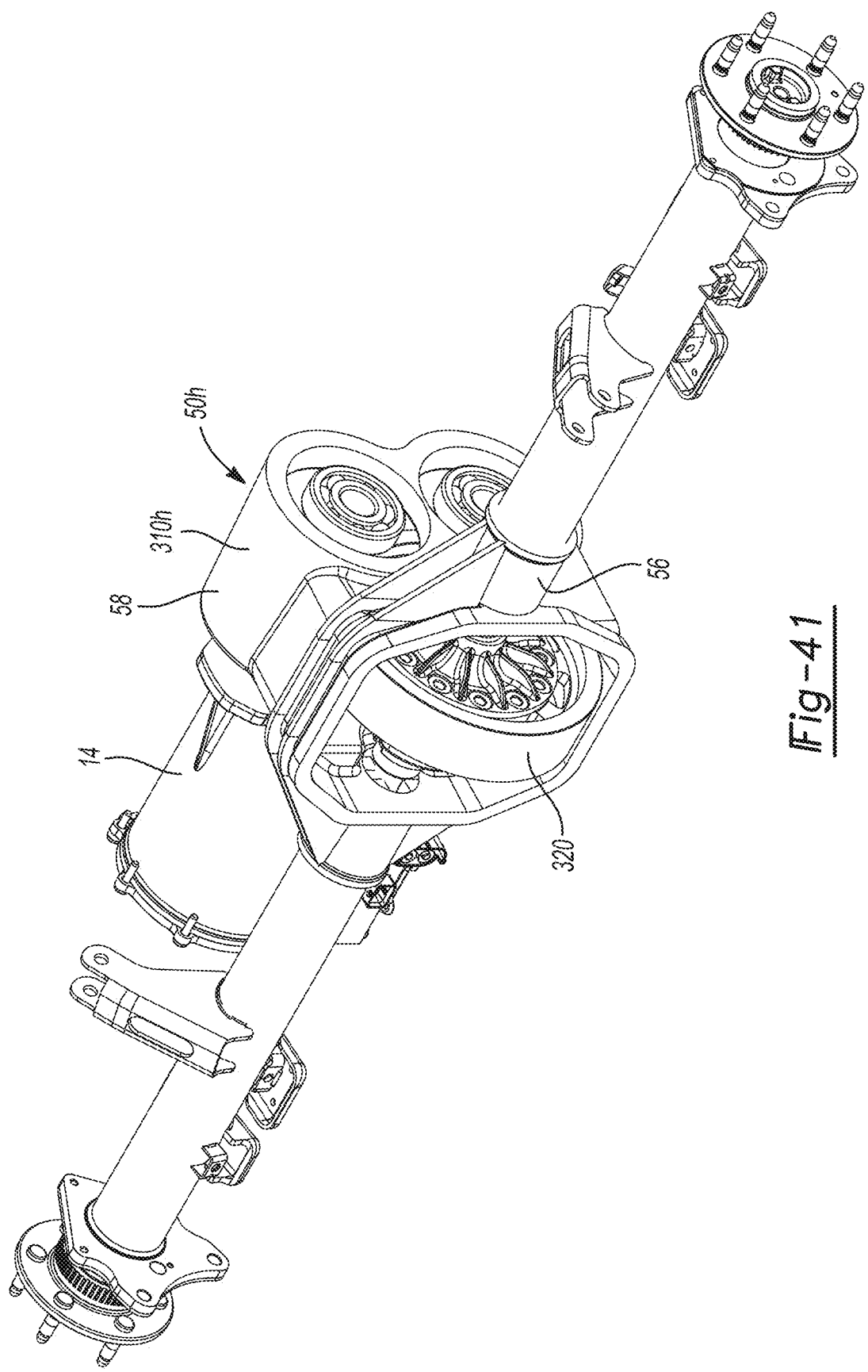
FIG. 41 is a front perspective view of a portion of the electric drive module of FIG. 40.
Figure 42:
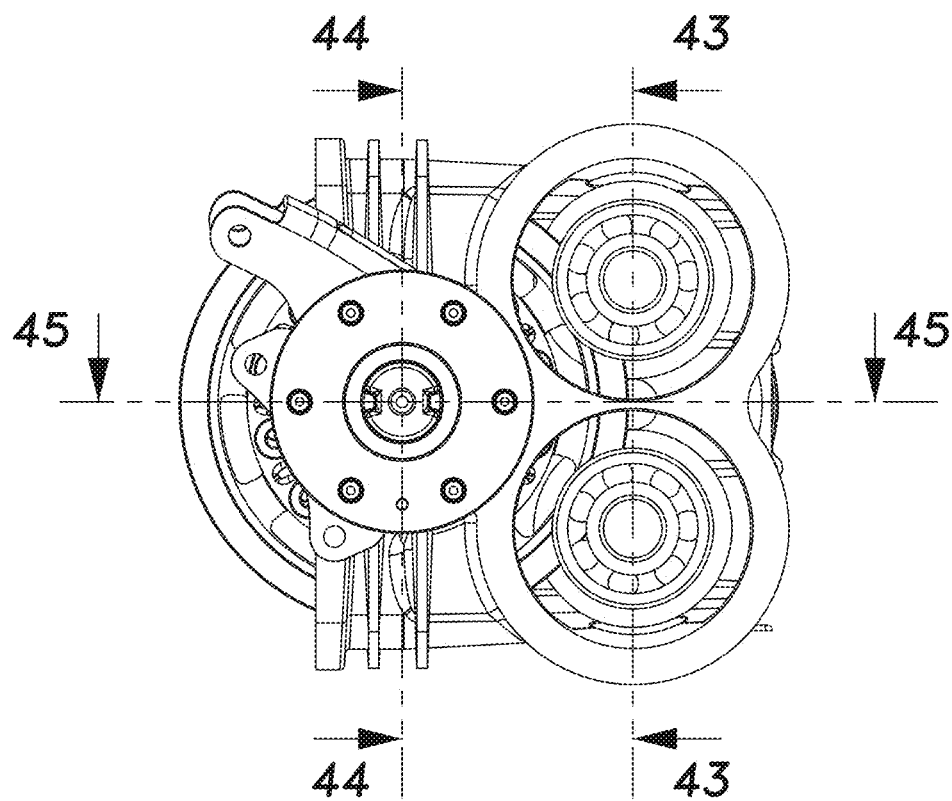
FIG. 42 is a side elevation view of the electric drive module of FIG. 40.
Figure 43:
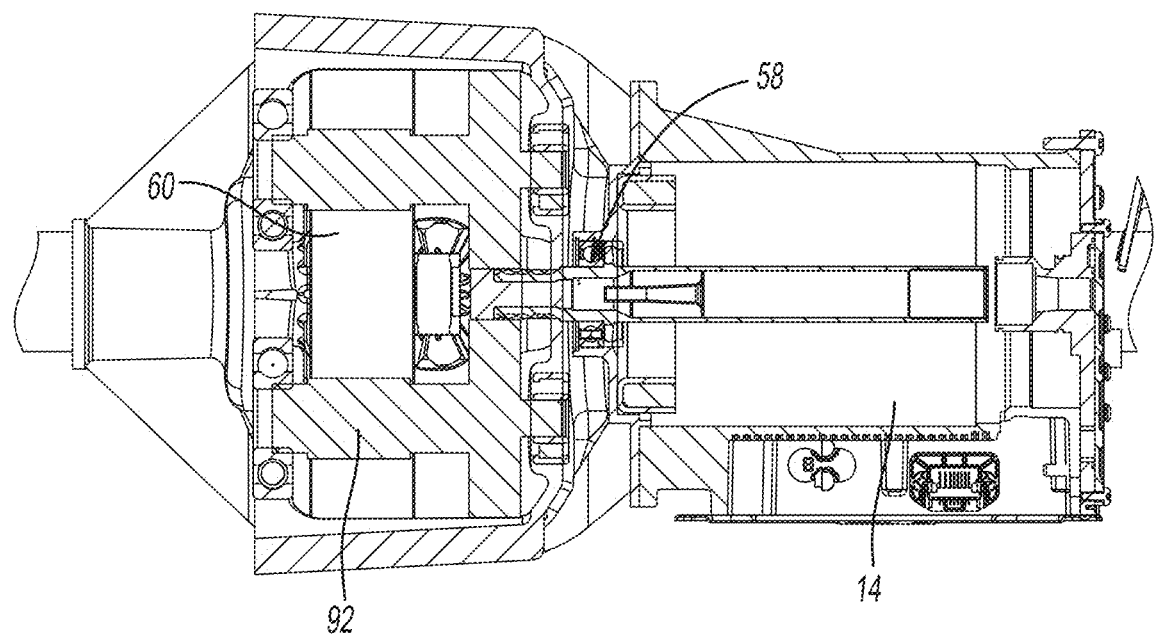
FIG. 43 is a section view taken along the line 43-43 of FIG. 42.
Figure 44:
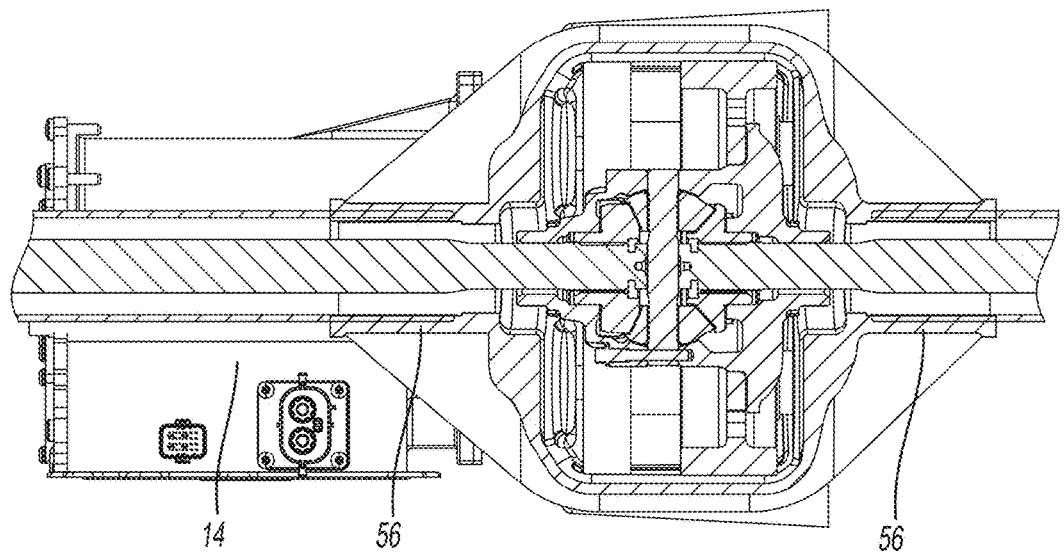
FIG. 44 is a section view taken along the line 44-44 of FIG. 42.
Figure 45:
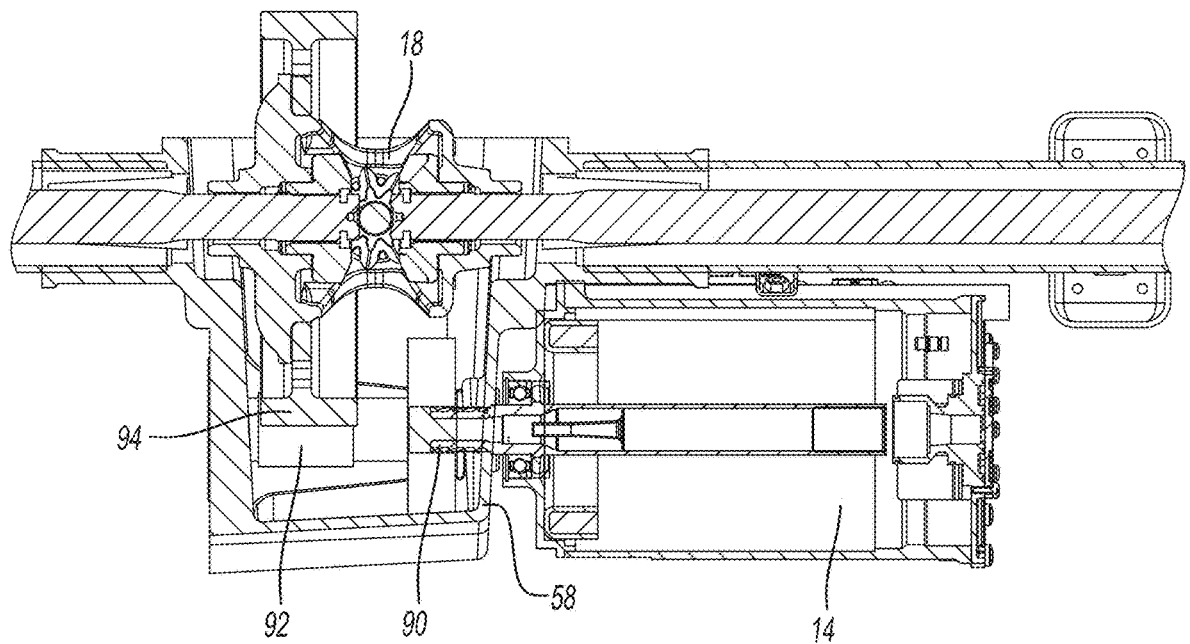
FIG. 45 is a section view taken along the line 45-45 of FIG. 42.
Figure 46:
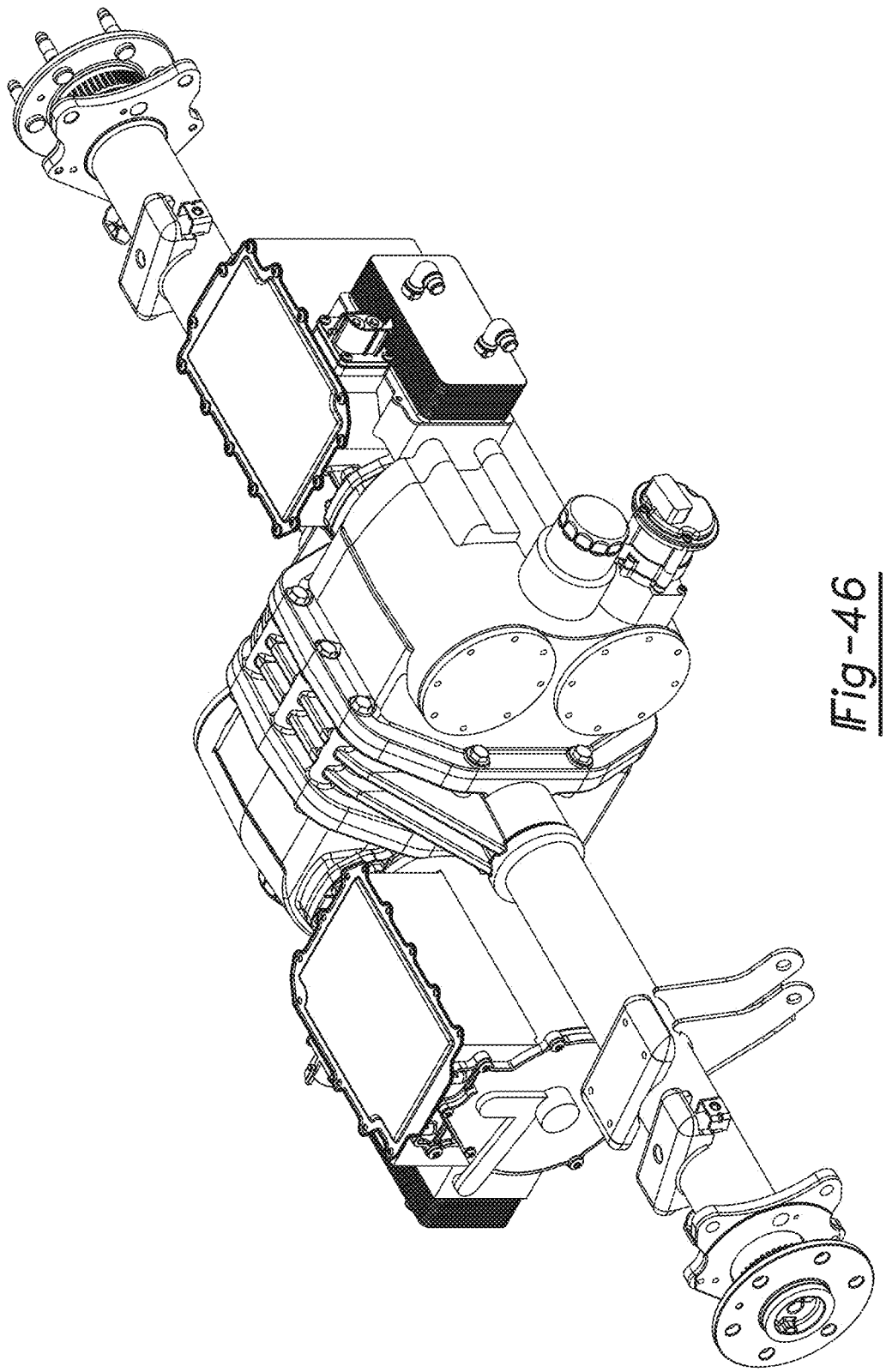
FIGS. 46 and 47 are rear perspective views of a portion of a tenth exemplary electric drive module constructed in accordance with the teachings of the present disclosure.
Figure 47:
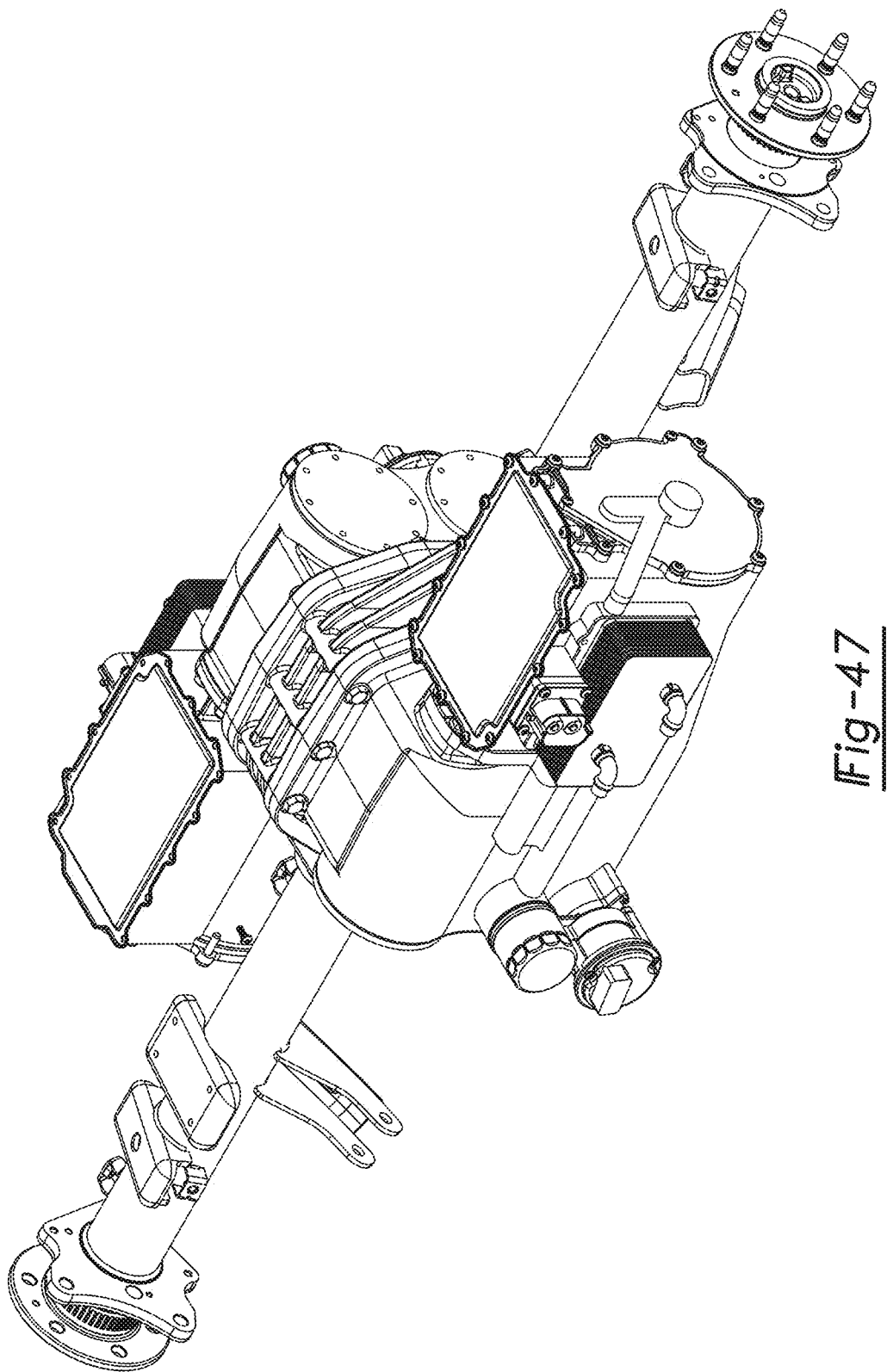
Figure 48:
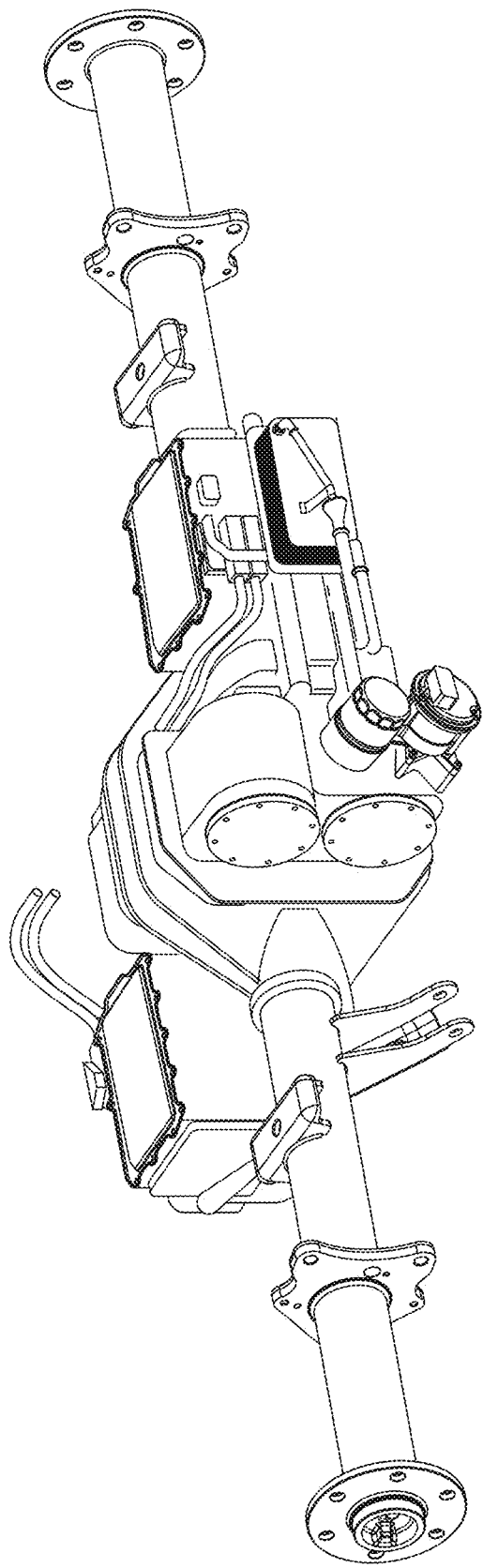
FIGS. 48 and 49 are front perspective views of a portion of the electric drive module of FIG. 46.
Figure 49:
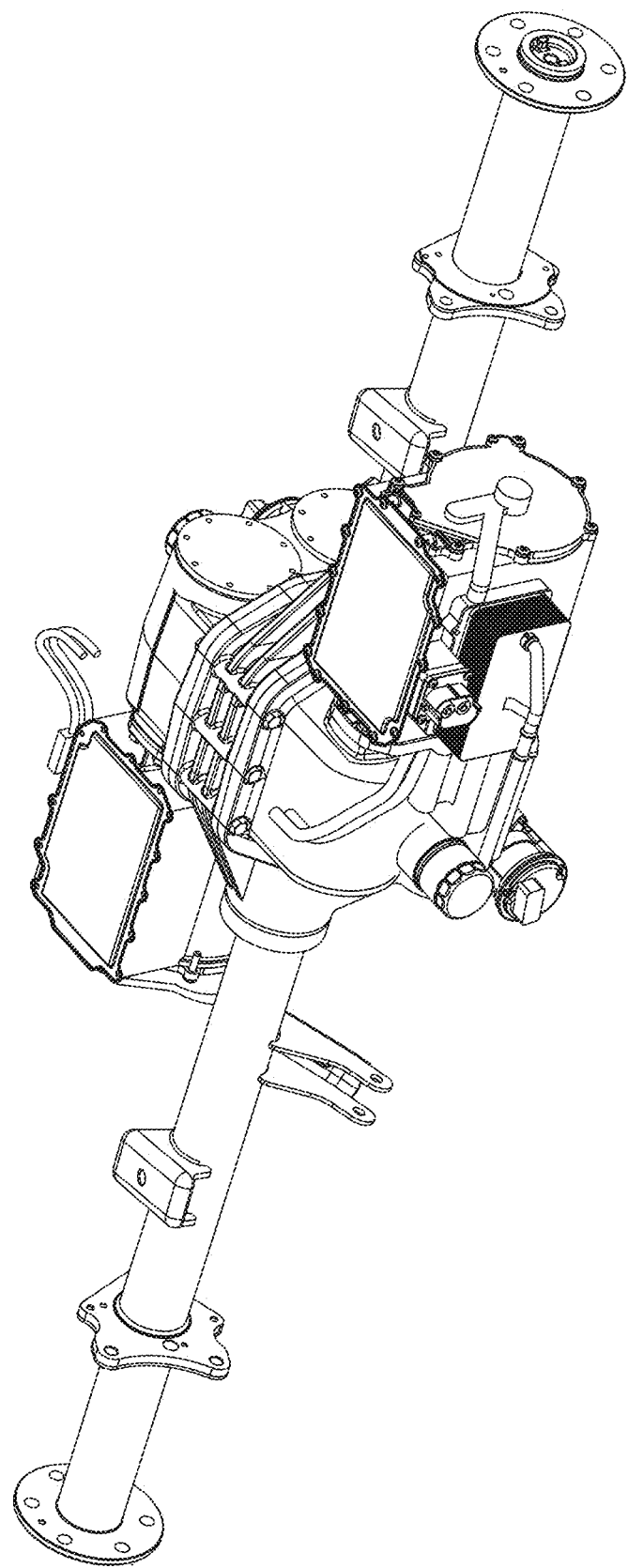

FIG. 27A depicts an electric drive module 10e' that is similar to that of FIG. 23, except that the two electric motor assemblies 14 are arranged on a common side of the carrier housing 50e and are mounted to the opposite lateral sides of a single end cover 312'. In this regard, the motor axes 32 are coincident with one another and are disposed on a common side of the output axis 34. The electric motor assemblies 14 can each be employed to drive a respective transmission 16, or could be employed to drive a transmission that is common to both of the electric motor assemblies 14. A cover CV can be employed to close the carrier housing 50e on a side of the carrier housing 50e that is opposite the end cover 312'. Alternatively, the end cover 312' or the cover CV could be unitarily and integrally formed with the carrier housing 50e.

FIGS. 28-33 depict an example of an electric drive module that is generally similar to the embodiment that is depicted in FIGS. 14-17.

FIGS. 34-39 depict a further example of an electric drive module constructed in accordance with the teachings of the present disclosure. The electric drive module 10g has a carrier housing 50g that includes a center section 310g, and an end cover (not specifically shown). The center section 310g defines the axle tube mounts 56, as well as a flange 320 that is parallel to and spaced apart from the output axis. The end cover defines an associated motor mount, which is configured to receive the electric motor assembly 14 therein, and is configured to house the pinion gear 90 and the pair of compound gears 92 of the transmission 16. The end cover cooperates with the center section 310g to form the internal cavity 60 into which the differential 18 and the transmission output gear 94 are received.

FIGS. 40-45 depict an example of an electric drive module that is generally similar to the embodiment that is depicted in FIGS. 34-39 except that the carrier housing 50h is configured such that the center section 310h defines the axle tube mounts 56, the motor mount 58 and the flange 320. The motor mount 58 is configured to receive the electric motor assembly 14 therein, and is configured to house the pinion gear 90 and the pair of compound gears 92 of the transmission 16. The flange 320 is parallel to and spaced apart from the output axis. The end cover (not shown) is configured as a conventional axle cover and mounts to the flange 320 to close the interior cavity 60.

FIGS. 46 through 49 depict an electric drive module that is similar to that of FIGS. 23-27, but which positions a stacked plate-type heat exchanger directly on the motor housing of each of the electric motor assemblies. Two elbows projecting from each of the heat exchangers and are employed to route a cooling fluid into and out of each heat exchanger. A pump mount, to which a pump can be mounted, and a filter mount, to which a filter can be mounted, can be incorporated into one or both of the end covers. The pump can draw fluid from a sump that can be located in an associated one of the end covers, and optionally in the carrier housing and optionally in the opposite end cover. The pump can discharge pressurized fluid that can be routed to the filter through galleries that are internal to the end cover. Pressurized fluid exiting the filter can be routed to the heat exchanger(s) through galleries that are internal to the housing assembly. In the example shown, internal galleries are formed in the end cover and the motor housing that fluidly connect the filter to the heat exchanger. The pressurized fluid is cooled in the heat exchanger and is routed through the inverter and other portions of the electric motor assemblies that are housed in the motor housing.

Figure 50:
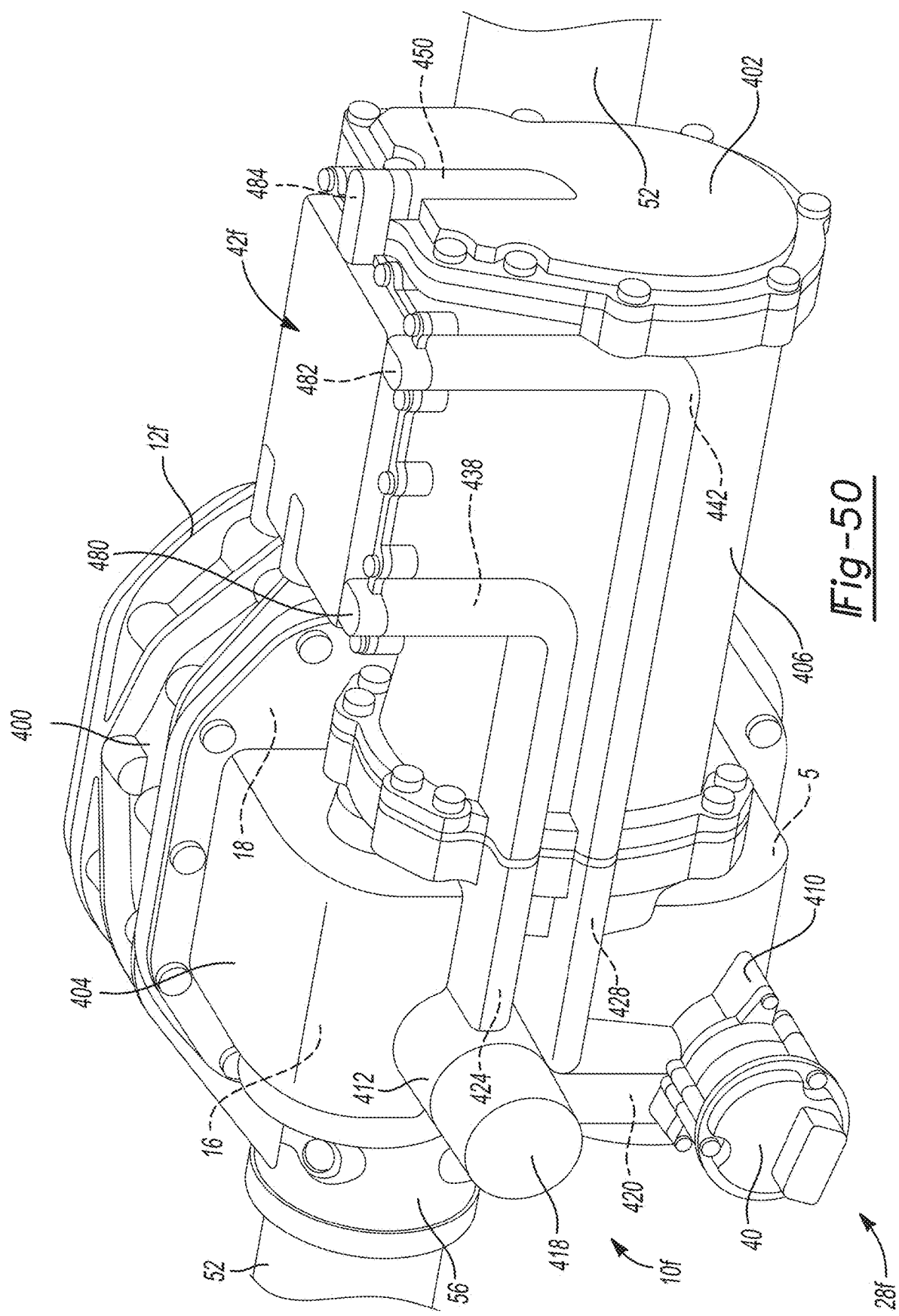
FIGS. 50 and 51 are rear perspective views of a portion of an eleventh exemplary electric drive module constructed in accordance with the teachings of the present disclosure.
Figure 51:
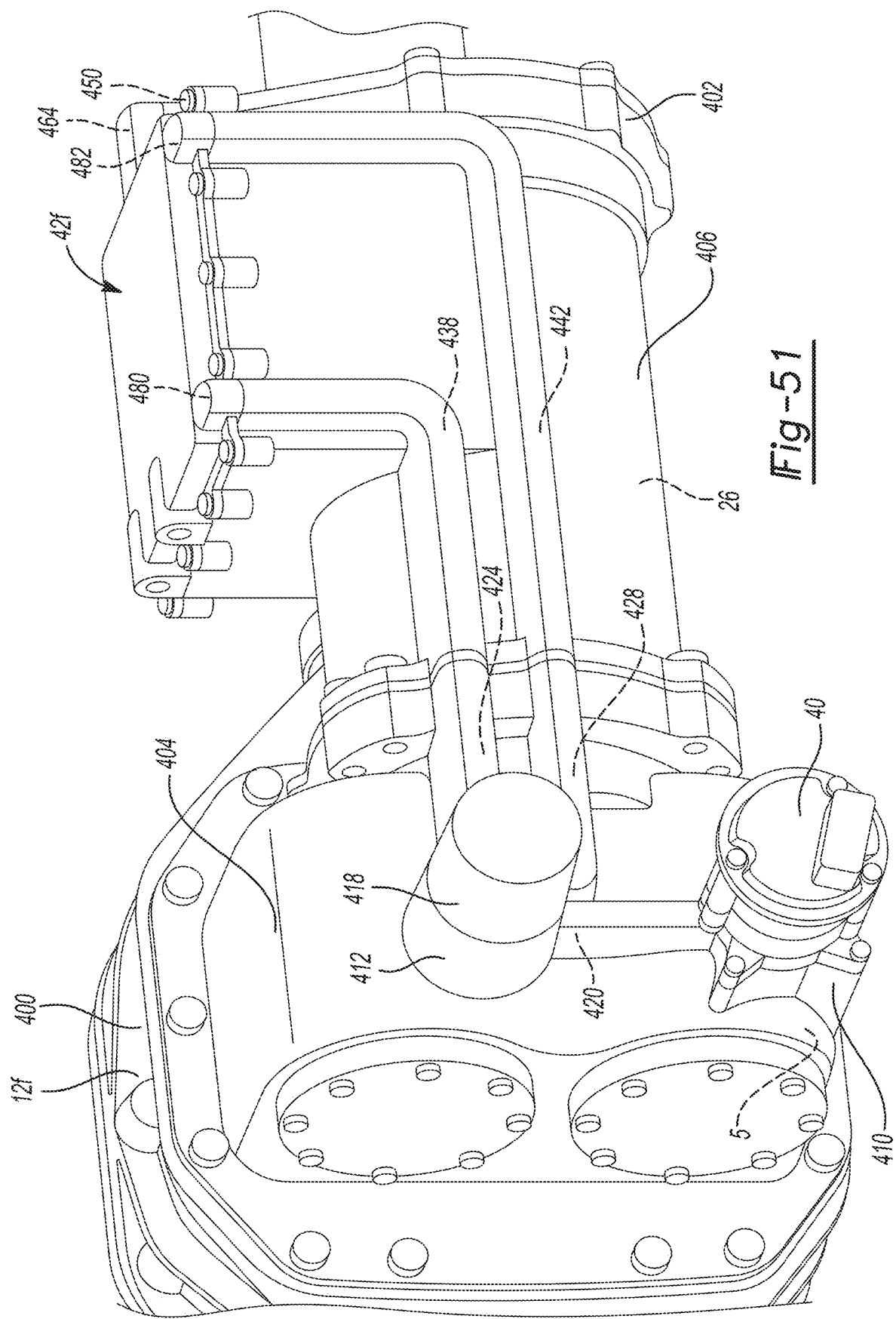
Figure 52:
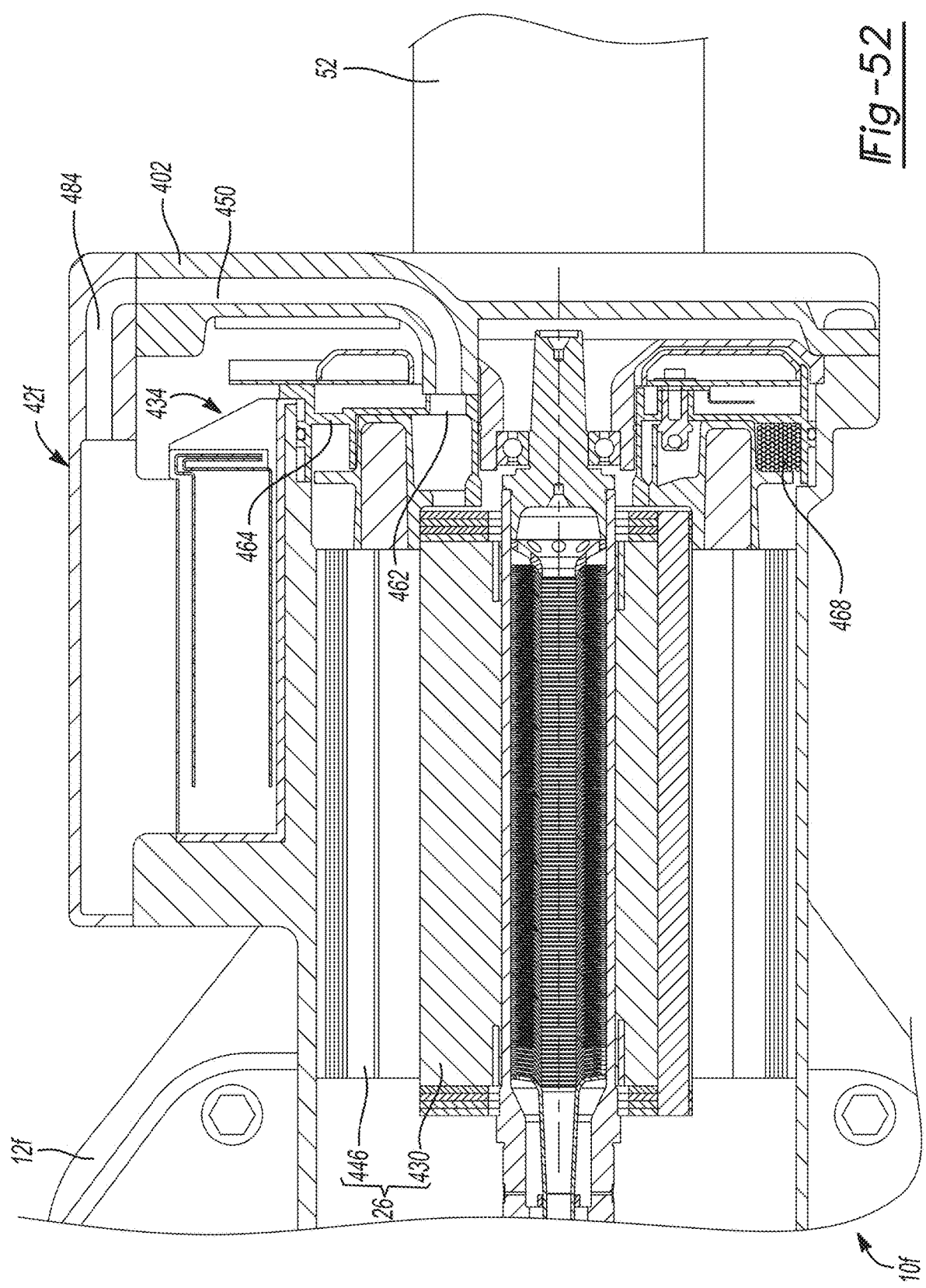
FIG. 52 is a section view of a portion of the electric drive module of FIG. 50.

With reference to FIGS. 50 through 52, yet another vehicle drive component 10f that is constructed in accordance with the teachings of the present disclosure is illustrated. The vehicle drive component 10f is generally similar to the vehicle drive component 10 (FIG. 1) except for the configuration of the housing assembly 12f and the lubrication and cooling system 28f.

The housing assembly 12f comprises a carrier housing 50f that includes a carrier housing 400, a cover 402, a transmission housing 404 and a motor housing 406. The carrier housing 400 is configured to house the differential 18 (FIG. 4) and includes the axle tube mounts 56 that receive the axle tube assemblies 52. As in the example of FIG. 1, at least one bearing 100 (FIG. 4) is mounted to the housing assembly 12f to directly support one of the differential 18 (FIG. 4) and the differential input member 150 (FIG. 4) for rotation relative to the housing assembly 12f about the output axis 34 (FIG. 4). The cover 402 is mounted to a first side of the carrier housing 400 and can close a first side of the internal cavity (not specifically shown) that is formed by the carrier housing 400. The transmission housing 404 can be mounted to a second side of the carrier housing 400 that is opposite the first side and can close a second side of the internal cavity. The transmission housing 404 is configured to house various components of the transmission 16 (FIG. 3), such as the pinion gear 90 (FIG. 3) and the compound gears 92 (FIG. 3). The transmission housing 404 is also unitarily and integrally configured with both a pump mount 410 and a filter mount 412. The pump 40 is configured to mount to the pump mount 410. The pump mount 410 fluidly couples a suction side of the pump 40 to a sump (not shown) to permit the pump 40 to draw fluid from the sump S. A filter 418 is configured to mount to the filter mount 412. High pressure fluid discharged by the pump 40 is transmitted through an outlet formed in the pump mount 410, then to a first internal gallery 420 in the transmission housing 404, and then to an inlet in the filter mount 412, which directs the pressurized fluid into an inlet of the filter 418. Fluid passes through the filter 418, is discharged from the filter 418 into an outlet of the filter mount 412, and passes into a second internal gallery 424 that is unitarily and integrally formed with the transmission housing 404. The transmission housing 404 further defines a third internal gallery 428 that is integrally and unitarily formed with the transmission housing 404 and which is configured to receive fluid that is employed to lubricate and/or cool various components of the transmission 16 (FIG. 3), the differential 18 (FIG. 4) and the electric motor 26, such as the rotor 430 of the electric motor 26.

The motor housing 406 is fixedly coupled to the transmission housing 404 and extends generally parallel to one of the axle tube assemblies 52. The motor housing 406 houses the electric motor assembly 14, including the electric motor 26 and an inverter 434. Fourth and fifth internal galleries 438 and 442, respectively, are unitarily and integrally formed with the motor housing 406. The fourth internal gallery 438 is coupled in fluid communication to the second internal gallery 424 in the transmission housing 404, while the fifth internal gallery 442 is coupled in fluid communication to the third internal gallery 428 in the transmission housing 404. One or more gaskets or seals can be employed to seal between the transmission housing 404 and the motor housing 406, as well as to seal between the second and fourth internal galleries 424 and 438, and to seal between the third and fifth internal galleries 428 and 442.

The motor housing cover 402 is configured to close an end of the motor housing 406 that is opposite the transmission housing 404 and to direct fluid into the electric motor assembly 14 to cool and/or lubricate the electric motor assembly 14 (e.g., the field windings FW of the stator 446 of the electric motor 26 and the inverter 434). The motor housing cover 402 can define a sixth internal gallery 450 that can be coupled in fluid communication to a coolant intake conduit 462 formed on an inverter mount 464 of the inverter 434. Fluid directed through the coolant intake conduit in the inverter mount 464 can be directed to cool a plurality of power semiconductors 468 in the inverter 434, as well as to various cooling channels 470 formed longitudinally through a body or core of the stator 446. One or more gaskets and/or seals (not specifically shown) can seal between the motor housing 406 and the motor housing cover 402, and optionally between the sixth internal gallery 450 and the coolant intake conduit 462.

The cooling system heat exchanger 42f can be mounted to the motor housing 406 and can close an open portion of the motor housing 406 in which the inverter 434 is housed. The cooling system heat exchanger 42f can have a first fluid inlet 480, which can be coupled in fluid communication to the fourth internal gallery 438 in the motor housing 406, a first fluid outlet 482, which can be coupled in fluid communication to the fifth internal gallery 442, and a second fluid outlet 484, which can be coupled in fluid communication to the sixth internal gallery 450. One or more gaskets and/or seals (not specifically shown) can seal between the motor housing 406 and the cooling system heat exchanger 42f, as well as between the first fluid inlet 480 and the fourth internal gallery 438, the first fluid outlet 482 and the fifth internal gallery 442, and the second fluid outlet 484 and the sixth internal gallery 450.

In operation, the pump 40 can draw fluid from the sump S. Pressurized fluid exiting the pump 40 can be communicated through the first internal gallery 420 to the filter mount 412, where at least a portion of the pressurized fluid can be transmitted through the filter 418. Fluid exiting the filter 418 is transmitted through the second and fourth internal galleries 424 and 438 to the first fluid inlet 480 in the cooling system heat exchanger 42f. This fluid is circulated through the cooling system heat exchanger 42f, permitting heat in the fluid to be rejected to a cooling fluid that is also circulated through the cooling system heat exchanger 42f. Cooled (pressurized, filtered) fluid can exit the cooling system heat exchanger 42f through the first fluid outlet 482 and the second fluid outlet 484. Fluid passing through the first fluid outlet 482 is transmitted through the fifth and third internal galleries 442 and 428, while fluid passing through the second fluid outlet 484 is transmitted through the sixth internal gallery 450.

Figure 53:
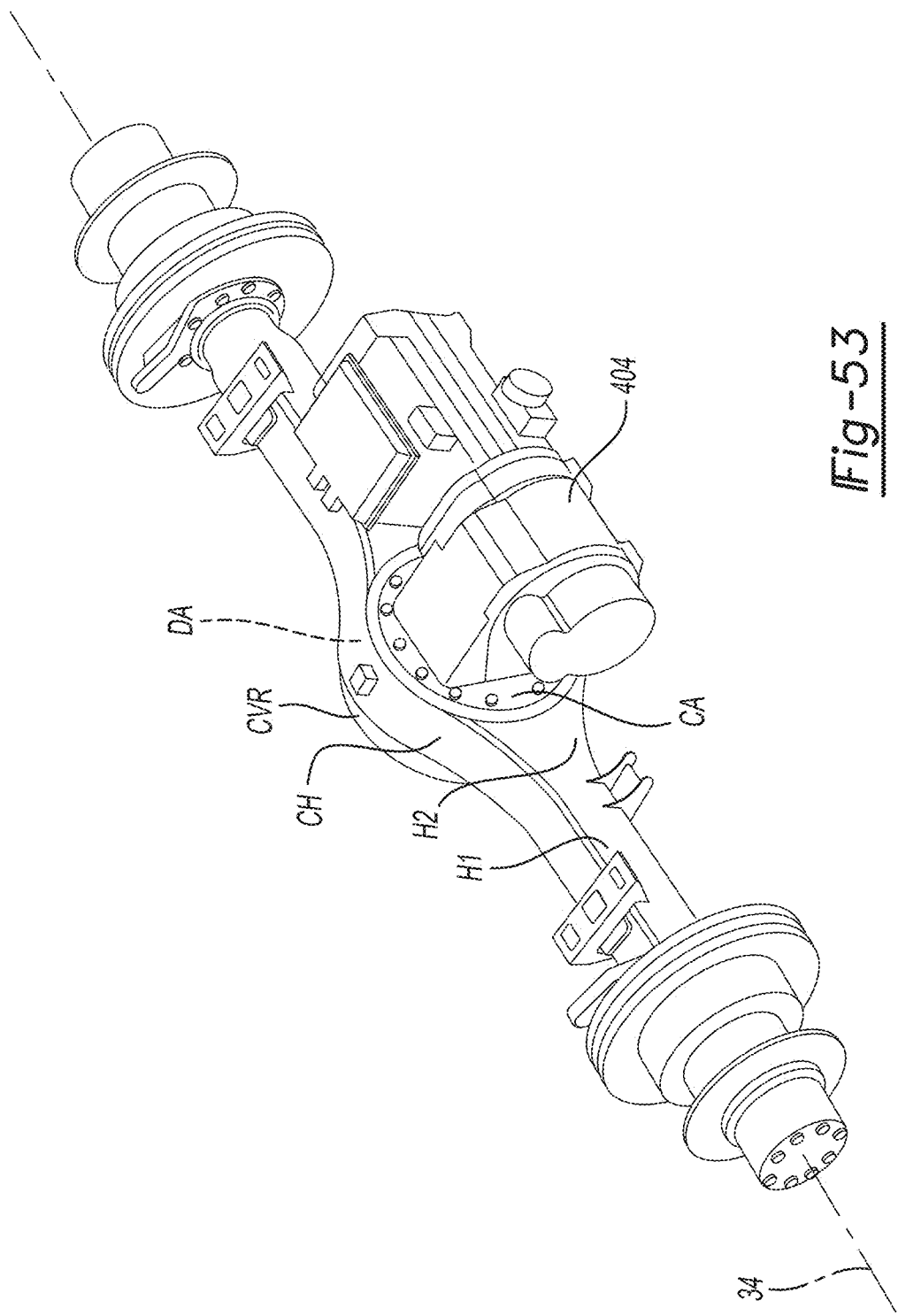
FIG. 53 is a perspective view of an electric drive module similar to that of FIG. 50 but which employs a Banjo housing.

The example of FIG. 53 is similar to that of the example of FIGS. 50-52, except that the housing assembly is fashioned as a Banjo housing. In this regard, the carrier housing CH is formed from two housing segments H1, H2 that are mated along a plane that includes the output axis 34 and bisects the carrier housing CH into generally symmetrical upper and lower halves. A cover CVR is fixedly coupled to a rear end of the carrier housing CH, and a carrier CA is fixedly coupled to a front end of the carrier housing CH. The differential assembly DA is rotatably mounted to an interior side of the carrier CA, while the transmission housing 404 is mounted to an exterior side of the carrier CA.

Figure 54:
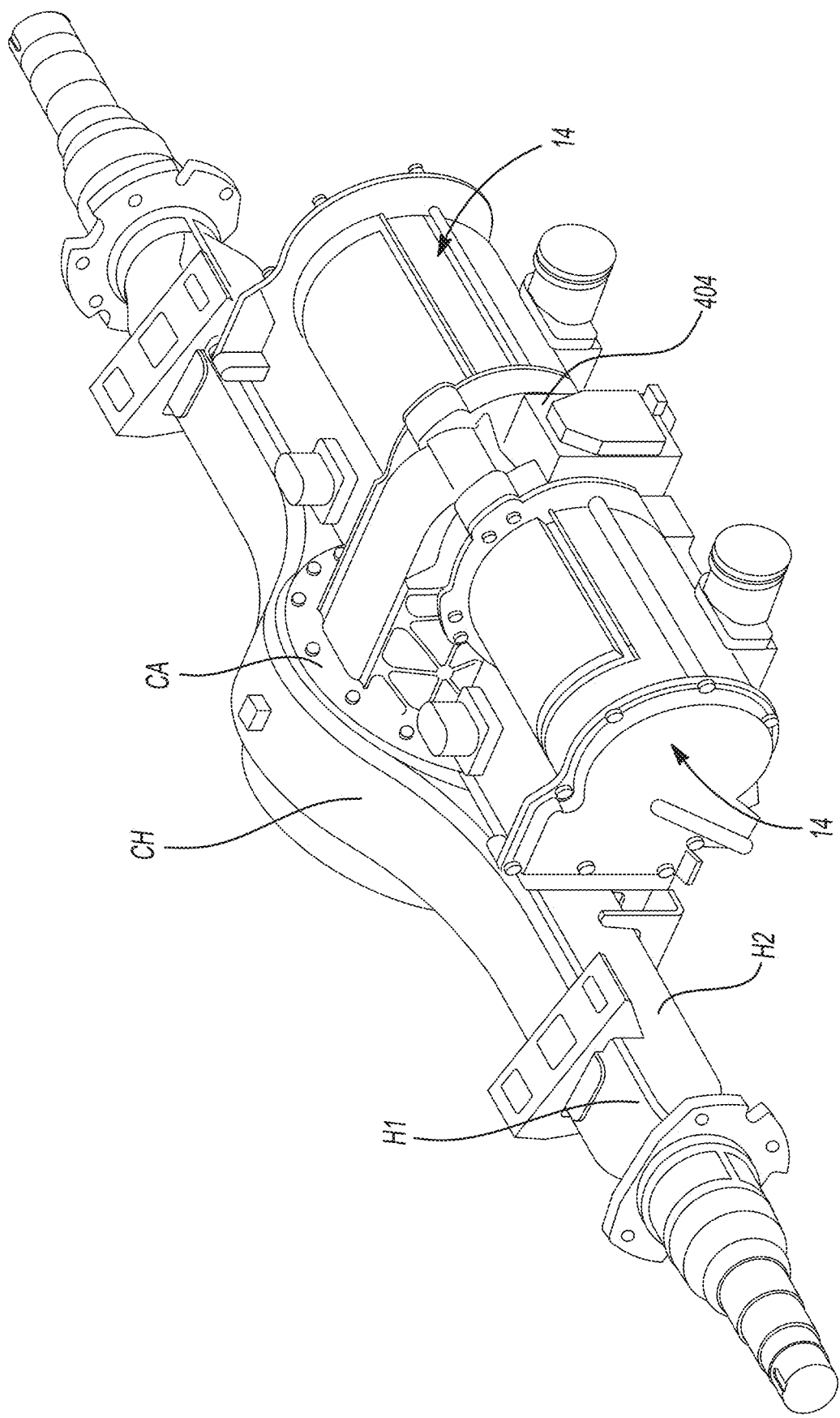
FIG. 54 is a perspective view of another electric drive module similar to that of FIG. 53 but employing two motor assemblies.

The example of FIG. 54 is similar to the example of FIG. 53, but employs two electric motor assemblies 14 that are mounted to the exterior side of the carrier CA.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An electric drive module comprising:
   a housing assembly that defines an output axis, the housing assembly having a carrier housing and a pair of axle tubes, the carrier housing having a pair of carrier housing members that are mated to one another across a first plane that intersects the output axis at a point, the carrier housing defining a carrier cavity, each of the axle tubes being fixedly coupled to a corresponding one of the carrier housing members;
   a differential assembly received in the carrier cavity, the differential assembly having a differential input member, which is supported by the carrier housing for rotation about the output axis, and a pair of differential output members;
   a pair of output shafts, each of the output shafts being received in a corresponding one of the axle tubes and being coupled for rotation with a corresponding one of the differential output members;
   a first electric motor mounted to the exterior of a first one of the carrier housing members, the first electric motor having a first motor shaft that extends through the first one of the carrier housing members into the carrier cavity and couples with a pinion gear;
   a first transmission received in the carrier cavity, the first transmission transmitting rotary power between the first motor shaft and the differential input member, wherein the first transmission further comprises:
      a compound gear having a first gear rotatably engaged with the pinion gear and a second gear rotatably engaged with a transmission output gear;
      an additional compound gear having a first gear rotatably engaged with the pinion gear and a second gear rotatably engaged with the transmission output gear;
   a first inverter mounted to the first electric motor;
   a first heat exchanger mounted to the first one of the carrier housing members;

a first coolant pump coupled to the housing assembly, the first coolant pump being configured to pump a cooling fluid through a first cooling circuit that fluidly couples the first heat exchanger and the first electric motor.

2. The electric drive module of claim 1, wherein the first cooling circuit passes through the first inverter.

3. The electric drive module of claim 1, wherein the transmission output gear is mounted on a bearing, and wherein the bearing supports the transmission output gear for rotation about the output axis relative to the carrier housing.

4. The electric drive module of claim 3, wherein the bearing includes an outer bearing race, which is assembled onto the transmission output gear, and an inner bearing race that is received on an annular shoulder formed on the carrier housing.

5. The electric drive module of claim 4, wherein the annular shoulder is formed on the first one of the carrier housing members.

6. The electric drive module of claim 1, wherein the housing assembly further includes a pair of axle tube flanges and a pair of bearing mounts, each of the axle tube flanges being fixedly coupled to an end of an associated one of the axle tubes that is opposite the carrier housing, each of the bearing mounts being removably coupled to an associated one of the axle tube flanges, and wherein a pair of axle shaft bearings are received into each of the bearing mounts, each pair of axle shaft bearings supporting an associated one of the output shafts for rotation about the output axis relative to the housing assembly.

7. The electric drive module of claim 6, wherein each pair of axle shaft bearings has a pair of outer bearing races that are unitarily and integrally formed with a corresponding one of the bearing mounts.

8. The electric drive module of claim 1, further comprising:
a second electric motor mounted to the exterior of the second one of the carrier housing members, the second electric motor having a second motor shaft that extends through the second one of the carrier housing members into the carrier cavity; and
a second transmission received in the carrier cavity, the second transmission transmitting rotary power between the second motor shaft and the differential input member.

9. The electric drive module of claim 8, further comprising:
a second inverter mounted to the second electric motor;
a second heat exchanger mounted to the second one of the carrier housing members;
a second coolant pump coupled to the housing assembly, the second coolant pump being configured to pump a second cooling fluid through a second cooling circuit that fluidly couples the second heat exchanger and the second electric motor.

10. The electric drive module of claim 9, wherein the second cooling circuit passes through the second inverter.

11. The electric drive module of claim 8, wherein the first motor and the second motor are disposed on opposite sides of a second plane, the output axis being disposed in the second plane, the second plane being perpendicular to the first plane.

12. The electric drive module of claim 11, wherein a rotational axis of the first motor shaft, a rotational axis of the second motor shaft and the output axis are disposed in a third plane that is orthogonal to the first and second planes.

13. The electric drive module of claim 8, wherein the first transmission and the second transmission output rotary power through a common transmission output gear.

14. The electric drive module of claim 1, wherein the transmission further comprises a pair of park-lock gears, each park-lock gear being coupled to a corresponding one of the compound gears for rotation therewith.

15. An electric drive module comprising:
a housing assembly having a carrier housing and a pair of axle tubes, the carrier housing being disposed about an output axis and having a pair of housing members that are joined together across an interface that extends in a plane that is perpendicular to the output axis, each of the housing members having an axle tube mount, a first one of the housing members defining a first motor mount, each of the axle tubes being disposed in an associated one of the axle tube mounts and being fixedly coupled to a corresponding one of the housing members coaxially about the output axis;
a differential assembly received in the housing assembly, the differential assembly having a differential input member, which is rotatable about the output axis relative to the housing assembly, and a pair of differential output members that are rotatable about the output axis relative to the differential input member;
a first motor assembly having a first electric motor and a first inverter, the first electric motor being mounted to the first motor mount and extending from a first lateral side of the housing assembly, the first inverter being mounted to the first one of the housing members and being electrically coupled to the first electric motor;
a first transmission received at least partly in a second one of the housing members, the first transmission transmitting rotary power between the first electric motor and the differential input member; and
a first heat exchanger mounted on the housing assembly, the first heat exchanger being in fluid communication with a first cooling circuit that is configured to cool the first electric motor and the first inverter.

16. The electric drive module of claim 15, wherein the first inverter is mounted on the first one of the housing members.

17. The electric drive module of claim 15, further comprising a first coolant pump in fluid communication with the first heat exchanger and the first cooling circuit.

18. The electric drive module of claim 15, wherein the differential input member is a helical gear.

19. The electric drive module of claim 18, wherein a four-point angular contact bearing supports the differential input member for rotation relative to the housing assembly.

20. The electric drive module of claim 19, wherein the four-point angular contact bearing is received on a tubular segment of the housing assembly.

21. The electric drive module of claim 18, wherein a bearing race is formed on the differential input member.

22. The electric drive module of claim 15, wherein the differential assembly is an electronic locking differential assembly.

23. The electric drive module of claim 15, wherein the first electric motor is offset from the axle tubes such that a motor output shaft axis of the first electric motor is parallel to the output axis and disposed outside the axle tubes.

24. The electric drive module of claim 15, further comprising:
a second motor assembly having a second electric motor and a second inverter, the second electric motor being mounted to a first motor mount that is formed on a second one of the housing members, the second electric motor extending from a second lateral side of the housing assembly that is opposite the first lateral side, the second inverter being mounted to the second one of the housing members and being electrically coupled to the second electric motor;

a second transmission received at least partly in the first one of the housing members, the second transmission transmitting rotary power between the second electric motor and the differential input member; and a second heat exchanger mounted on the housing assembly, the second heat exchanger being in fluid communication with a second cooling circuit that is configured to cool the second electric motor and the second inverter.

25. The electric drive module of claim 24, wherein the second inverter is mounted on the second one of the housing members.

26. The electric drive module of claim 24, further comprising a coolant pump in fluid communication with the second heat exchanger and the second cooling circuit.

27. The electric drive module of claim 24, wherein the second electric motor is offset from the axle tubes such that a motor output shaft axis of the second electric motor is parallel to the output axis and disposed outside the axle tubes.

* * * * *